D

(12) United States Patent
Robinson et al.

(10) Patent No.: US 10,401,638 B2
(45) Date of Patent: Sep. 3, 2019

(54) OPTICAL STACK FOR IMAGING DIRECTIONAL BACKLIGHTS

(71) Applicant: RealD Spark, LLC, Beverly Hills, CA (US)

(72) Inventors: Michael G. Robinson, Boulder, CO (US); Graham J. Woodgate, Henley-on-Thames (GB)

(73) Assignee: RealD Spark, LLC, Beverly Hills, CA (US)

( * ) Notice: Subject to any disclaimer, the term of this patent is extended or adjusted under 35 U.S.C. 154(b) by 0 days.

(21) Appl. No.: 15/860,853

(22) Filed: Jan. 3, 2018

(65) Prior Publication Data
US 2018/0196275 A1   Jul. 12, 2018

Related U.S. Application Data

(60) Provisional application No. 62/442,303, filed on Jan. 4, 2017.

(51) Int. Cl.
G02B 27/26 (2006.01)
F21V 8/00 (2006.01)

(52) U.S. Cl.
CPC .......... *G02B 27/26* (2013.01); *G02B 6/0048* (2013.01); *G02B 6/0055* (2013.01); *G02B 6/0056* (2013.01); *G02B 6/0068* (2013.01)

(58) Field of Classification Search
CPC .............................. G02B 6/0056; G02B 27/26
See application file for complete search history.

(56) References Cited

U.S. PATENT DOCUMENTS

| 1,128,979 A | 2/1915 | Hess |
| 1,970,311 A | 8/1934 | Ives |

(Continued)

FOREIGN PATENT DOCUMENTS

| CN | 1142869 A | 2/1997 |
| CN | 1377453 A | 10/2002 |

(Continued)

OTHER PUBLICATIONS

PCT/US2018/012205 International search report and written opinion of international searching authority dated Apr. 27, 2018.

(Continued)

*Primary Examiner* — Sean P Gramling
(74) *Attorney, Agent, or Firm* — Penny L. Lowry; Neil G. J. Mothew

(57) ABSTRACT

An imaging directional backlight apparatus including a waveguide, a light source array, for providing large area directed illumination from localized light sources. The waveguide may include a stepped structure, in which the steps may further include extraction features optically hidden to guided light, propagating in a first forward direction. Returning light propagating in a second backward direction may be refracted, diffracted, or reflected by the features to provide discrete illumination beams exiting from the top surface of the waveguide. A rear reflector is arranged to receive light transmitted by the features and to provide polarization recirculation. Viewing windows are formed through imaging individual light sources and hence defines the relative positions of system elements and ray paths. Retarder stack arrangements are provided to increase the efficiency of polarization recirculation, reduce the visibility to damage and to reduce color changes with viewing angle.

16 Claims, 34 Drawing Sheets

(56) References Cited

U.S. PATENT DOCUMENTS

| | | |
|---|---|---|
| 2,133,121 A | 10/1938 | Stearns |
| 2,247,969 A | 7/1941 | Lemuel |
| 2,480,178 A | 8/1949 | Zinberg |
| 2,810,905 A | 10/1957 | Barlow |
| 3,409,351 A | 11/1968 | Winnek |
| 3,715,154 A | 2/1973 | Bestenreiner |
| 4,057,323 A | 11/1977 | Ward |
| 4,528,617 A | 7/1985 | Blackington |
| 4,542,958 A | 9/1985 | Young |
| 4,804,253 A | 2/1989 | Stewart |
| 4,807,978 A | 2/1989 | Grinberg et al. |
| 4,829,365 A | 5/1989 | Eichenlaub |
| 4,914,553 A | 4/1990 | Hamada et al. |
| 5,050,946 A | 9/1991 | Hathaway et al. |
| 5,278,608 A | 1/1994 | Taylor et al. |
| 5,347,644 A | 9/1994 | Sedlmayr |
| 5,349,419 A | 9/1994 | Taguchi et al. |
| 5,459,592 A | 10/1995 | Shibatani et al. |
| 5,466,926 A | 11/1995 | Sasano et al. |
| 5,510,831 A | 4/1996 | Mayhew |
| 5,528,720 A | 6/1996 | Winston et al. |
| 5,581,402 A | 12/1996 | Taylor |
| 5,588,526 A | 12/1996 | Fantone et al. |
| 5,697,006 A | 12/1997 | Taguchi et al. |
| 5,703,667 A | 12/1997 | Ochiai |
| 5,727,107 A | 3/1998 | Umemoto et al. |
| 5,771,066 A | 6/1998 | Barnea |
| 5,796,451 A | 8/1998 | Kim |
| 5,808,792 A | 9/1998 | Woodgate et al. |
| 5,875,055 A | 2/1999 | Morishima et al. |
| 5,896,225 A | 4/1999 | Chikazawa |
| 5,903,388 A | 5/1999 | Sedlmayr |
| 5,933,276 A | 8/1999 | Magee |
| 5,956,001 A | 9/1999 | Sumida et al. |
| 5,959,664 A | 9/1999 | Woodgate |
| 5,969,850 A | 10/1999 | Harrold et al. |
| 5,971,559 A | 10/1999 | Ishikawa et al. |
| 6,008,484 A | 12/1999 | Woodgate et al. |
| 6,014,164 A | 1/2000 | Woodgate et al. |
| 6,023,315 A | 2/2000 | Harrold et al. |
| 6,055,013 A | 4/2000 | Woodgate et al. |
| 6,061,179 A | 5/2000 | Inoguchi et al. |
| 6,061,489 A | 5/2000 | Ezra et al. |
| 6,064,424 A | 5/2000 | Berkel et al. |
| 6,075,557 A | 6/2000 | Holliman et al. |
| 6,094,216 A | 7/2000 | Taniguchi et al. |
| 6,108,059 A | 8/2000 | Yang |
| 6,118,584 A | 9/2000 | Berkel et al. |
| 6,128,054 A | 10/2000 | Schwarzenberger |
| 6,172,723 B1 | 1/2001 | Inoue et al. |
| 6,199,995 B1 | 3/2001 | Umemoto et al. |
| 6,224,214 B1 | 5/2001 | Martin et al. |
| 6,232,592 B1 | 5/2001 | Sugiyama |
| 6,256,447 B1 | 7/2001 | Laine |
| 6,262,786 B1 | 7/2001 | Perlo et al. |
| 6,295,109 B1 | 9/2001 | Kubo et al. |
| 6,302,541 B1 | 10/2001 | Grossmann |
| 6,305,813 B1 | 10/2001 | Lekson et al. |
| 6,373,637 B1 | 4/2002 | Gulick et al. |
| 6,377,295 B1 | 4/2002 | Woodgate et al. |
| 6,422,713 B1 | 7/2002 | Fohl et al. |
| 6,456,340 B1 | 9/2002 | Margulis |
| 6,464,365 B1 | 10/2002 | Gunn et al. |
| 6,476,850 B1 | 11/2002 | Erbey |
| 6,654,156 B1 | 11/2003 | Crossland et al. |
| 6,663,254 B2 | 12/2003 | Ohsumi |
| 6,724,452 B1 | 4/2004 | Takeda et al. |
| 6,731,355 B2 | 5/2004 | Miyashita |
| 6,736,512 B2 | 5/2004 | Balogh |
| 6,798,406 B1 | 9/2004 | Jones et al. |
| 6,801,243 B1 | 10/2004 | Berkel |
| 6,816,158 B1 | 11/2004 | Lemelson et al. |
| 6,825,985 B2 | 11/2004 | Brown et al. |
| 6,847,488 B2 | 1/2005 | Travis |
| 6,859,240 B1 | 2/2005 | Brown et al. |
| 6,867,828 B2 | 3/2005 | Taira et al. |
| 7,001,058 B2 | 2/2006 | Inditsky |
| 7,058,252 B2 | 6/2006 | Woodgate et al. |
| 7,091,931 B2 | 8/2006 | Yoon |
| 7,101,048 B2 | 9/2006 | Travis |
| 7,136,031 B2 | 11/2006 | Lee et al. |
| 7,215,391 B2 | 5/2007 | Kuan et al. |
| 7,215,475 B2 | 5/2007 | Woodgate et al. |
| 7,227,567 B1 | 6/2007 | Beck et al. |
| 7,239,293 B2 | 7/2007 | Perlin et al. |
| 7,365,908 B2 | 4/2008 | Dolgoff |
| 7,375,886 B2 | 5/2008 | Lipton et al. |
| 7,410,286 B2 | 8/2008 | Travis |
| 7,430,358 B2 | 9/2008 | Qi et al. |
| 7,492,346 B2 | 2/2009 | Manabe et al. |
| 7,524,053 B2 | 4/2009 | Lipton |
| 7,528,893 B2 | 5/2009 | Schultz et al. |
| 7,545,429 B2 | 6/2009 | Travis |
| 7,614,777 B2 | 11/2009 | Koganezawa et al. |
| 7,750,981 B2 | 7/2010 | Shestak et al. |
| 7,750,982 B2 | 7/2010 | Nelson et al. |
| 7,771,102 B2 | 8/2010 | Iwasaki |
| 7,798,698 B2 | 9/2010 | Segawa |
| 7,798,699 B2 | 9/2010 | Laitinen et al. |
| 7,864,253 B2 | 1/2011 | Tajiri |
| 8,016,475 B2 | 9/2011 | Travis |
| 8,223,296 B2 | 7/2012 | Lee et al. |
| 8,556,491 B2 | 10/2013 | Lee |
| 8,684,588 B2 | 4/2014 | Ajichi et al. |
| 8,760,762 B1 | 6/2014 | Kelly et al. |
| 8,926,112 B2 | 1/2015 | Uchiike et al. |
| 8,942,434 B1 | 1/2015 | Karakotsios et al. |
| 9,197,884 B2 | 11/2015 | Lee et al. |
| 2001/0001566 A1 | 5/2001 | Moseley et al. |
| 2001/0050686 A1 | 12/2001 | Allen |
| 2002/0018299 A1 | 2/2002 | Daniell |
| 2002/0113866 A1 | 8/2002 | Taniguchi et al. |
| 2003/0117790 A1 | 6/2003 | Lee et al. |
| 2003/0133191 A1 | 7/2003 | Morita et al. |
| 2003/0137821 A1 | 7/2003 | Gotoh et al. |
| 2004/0021809 A1 | 2/2004 | Sumiyoshi et al. |
| 2004/0042233 A1 | 3/2004 | Suzuki et al. |
| 2004/0046709 A1 | 3/2004 | Yoshino |
| 2004/0066480 A1 | 4/2004 | Yoshida et al. |
| 2004/0108971 A1 | 6/2004 | Waldern et al. |
| 2004/0109303 A1 | 6/2004 | Olczak |
| 2004/0135741 A1 | 7/2004 | Tomisawa et al. |
| 2004/0170011 A1 | 9/2004 | Kim et al. |
| 2004/0263968 A1 | 12/2004 | Kobayashi et al. |
| 2004/0263969 A1 | 12/2004 | Lipton et al. |
| 2005/0007753 A1 | 1/2005 | Hees et al. |
| 2005/0094295 A1 | 5/2005 | Yamashita et al. |
| 2005/0110980 A1 | 5/2005 | Maehara et al. |
| 2005/0135116 A1 | 6/2005 | Epstein et al. |
| 2005/0180167 A1 | 8/2005 | Hoelen et al. |
| 2005/0190180 A1 | 9/2005 | Jin et al. |
| 2005/0190345 A1 | 9/2005 | Dubin et al. |
| 2005/0237488 A1 | 10/2005 | Yamasaki et al. |
| 2005/0254127 A1 | 11/2005 | Evans et al. |
| 2005/0264717 A1 | 12/2005 | Chien et al. |
| 2005/0276071 A1 | 12/2005 | Sasagawa et al. |
| 2005/0280637 A1 | 12/2005 | Ikeda et al. |
| 2006/0002678 A1 | 1/2006 | Weber et al. |
| 2006/0012845 A1 | 1/2006 | Edwards |
| 2006/0056166 A1 | 3/2006 | Yeo et al. |
| 2006/0114664 A1 | 6/2006 | Sakata et al. |
| 2006/0132423 A1 | 6/2006 | Travis |
| 2006/0139447 A1 | 6/2006 | Unkrich |
| 2006/0152931 A1 | 7/2006 | Holman |
| 2006/0158729 A1 | 7/2006 | Vissenberg et al. |
| 2006/0176912 A1 | 8/2006 | Anikitchev |
| 2006/0203200 A1 | 9/2006 | Koide |
| 2006/0215129 A1 | 9/2006 | Alasaarela et al. |
| 2006/0215244 A1 | 9/2006 | Yosha et al. |
| 2006/0221642 A1 | 10/2006 | Daiku |
| 2006/0227427 A1 | 10/2006 | Dolgoff |
| 2006/0244918 A1 | 11/2006 | Cossairt et al. |
| 2006/0250580 A1 | 11/2006 | Silverstein et al. |
| 2006/0262376 A1 | 11/2006 | Mather et al. |

(56) References Cited

U.S. PATENT DOCUMENTS

| | | |
|---|---|---|
| 2006/0267040 A1 | 11/2006 | Baek et al. |
| 2006/0269213 A1 | 11/2006 | Hwang et al. |
| 2006/0284974 A1 | 12/2006 | Lipton et al. |
| 2006/0291053 A1 | 12/2006 | Robinson et al. |
| 2006/0291243 A1 | 12/2006 | Niioka et al. |
| 2007/0008406 A1 | 1/2007 | Shestak et al. |
| 2007/0013624 A1 | 1/2007 | Bourhill |
| 2007/0025680 A1 | 2/2007 | Winston et al. |
| 2007/0035706 A1 | 2/2007 | Margulis |
| 2007/0035829 A1 | 2/2007 | Woodgate et al. |
| 2007/0035964 A1 | 2/2007 | Olczak |
| 2007/0081110 A1 | 4/2007 | Lee |
| 2007/0085105 A1 | 4/2007 | Beeson et al. |
| 2007/0109400 A1 | 5/2007 | Woodgate et al. |
| 2007/0109401 A1 | 5/2007 | Lipton et al. |
| 2007/0115551 A1 | 5/2007 | Spilman et al. |
| 2007/0115552 A1 | 5/2007 | Robinson et al. |
| 2007/0153160 A1 | 7/2007 | Lee et al. |
| 2007/0188667 A1 | 8/2007 | Schwerdtner |
| 2007/0189701 A1 | 8/2007 | Chakmakjian et al. |
| 2007/0223252 A1 | 9/2007 | Lee et al. |
| 2007/0279554 A1 | 12/2007 | Kowarz et al. |
| 2007/0279727 A1 | 12/2007 | Gandhi et al. |
| 2008/0055221 A1 | 3/2008 | Yabuta et al. |
| 2008/0079662 A1 | 4/2008 | Saishu et al. |
| 2008/0084519 A1 | 4/2008 | Brigham et al. |
| 2008/0128728 A1 | 6/2008 | Nemchuk et al. |
| 2008/0225205 A1 | 9/2008 | Travis |
| 2008/0259012 A1 | 10/2008 | Fergason |
| 2008/0259643 A1 | 10/2008 | Ijzerman et al. |
| 2008/0291359 A1 | 11/2008 | Miyashita |
| 2008/0297431 A1 | 12/2008 | Yuuki et al. |
| 2008/0297459 A1 | 12/2008 | Sugimoto et al. |
| 2008/0304282 A1 | 12/2008 | Mi et al. |
| 2008/0316303 A1 | 12/2008 | Chiu et al. |
| 2008/0316768 A1 | 12/2008 | Travis |
| 2009/0016057 A1 | 1/2009 | Rinko |
| 2009/0040426 A1 | 2/2009 | Mather et al. |
| 2009/0067156 A1 | 3/2009 | Bonnett et al. |
| 2009/0109705 A1 | 4/2009 | Pakhchyan et al. |
| 2009/0128735 A1 | 5/2009 | Larson et al. |
| 2009/0135623 A1 | 5/2009 | Kunimochi |
| 2009/0140656 A1 | 6/2009 | Kohashikawa et al. |
| 2009/0160757 A1 | 6/2009 | Robinson |
| 2009/0167651 A1 | 7/2009 | Benitez et al. |
| 2009/0168459 A1 | 7/2009 | Holman et al. |
| 2009/0174840 A1 | 7/2009 | Lee et al. |
| 2009/0190072 A1 | 7/2009 | Nagata et al. |
| 2009/0190079 A1 | 7/2009 | Saitoh |
| 2009/0207629 A1 | 8/2009 | Fujiyama et al. |
| 2009/0225380 A1 | 9/2009 | Schwerdtner et al. |
| 2009/0278936 A1 | 11/2009 | Pastoor et al. |
| 2009/0290203 A1 | 11/2009 | Schwerdtner |
| 2009/0315915 A1 | 12/2009 | Dunn et al. |
| 2010/0002169 A1 | 1/2010 | Kuramitsu et al. |
| 2010/0033558 A1 | 2/2010 | Horie et al. |
| 2010/0034987 A1 | 2/2010 | Fujii et al. |
| 2010/0040280 A1 | 2/2010 | McKnight |
| 2010/0053771 A1 | 3/2010 | Travis et al. |
| 2010/0053938 A1 | 3/2010 | Kim et al. |
| 2010/0091093 A1 | 4/2010 | Robinson |
| 2010/0091254 A1 | 4/2010 | Travis et al. |
| 2010/0103649 A1 | 4/2010 | Hamada |
| 2010/0165598 A1 | 7/2010 | Chen et al. |
| 2010/0177387 A1 | 7/2010 | Travis et al. |
| 2010/0182542 A1 | 7/2010 | Nakamoto et al. |
| 2010/0188438 A1 | 7/2010 | Kang |
| 2010/0188602 A1 | 7/2010 | Feng |
| 2010/0214135 A1 | 8/2010 | Bathiche et al. |
| 2010/0220260 A1 | 9/2010 | Sugita et al. |
| 2010/0231498 A1 | 9/2010 | Large et al. |
| 2010/0271838 A1 | 10/2010 | Yamaguchi |
| 2010/0277575 A1 | 11/2010 | Ismael et al. |
| 2010/0278480 A1 | 11/2010 | Vasylyev |
| 2010/0289870 A1 | 11/2010 | Leister |
| 2010/0295920 A1 | 11/2010 | McGowan |
| 2010/0295930 A1 | 11/2010 | Ezhov |
| 2010/0300608 A1 | 12/2010 | Emerton et al. |
| 2010/0309296 A1 | 12/2010 | Harrold et al. |
| 2010/0321953 A1 | 12/2010 | Coleman et al. |
| 2010/0328438 A1 | 12/2010 | Ohyama et al. |
| 2011/0013417 A1 | 1/2011 | Saccomanno et al. |
| 2011/0019112 A1 | 1/2011 | Dolgoff |
| 2011/0032483 A1 | 2/2011 | Hruska et al. |
| 2011/0032724 A1 | 2/2011 | Kinoshita |
| 2011/0043142 A1 | 2/2011 | Travis et al. |
| 2011/0044056 A1 | 2/2011 | Travis et al. |
| 2011/0044579 A1 | 2/2011 | Travis et al. |
| 2011/0051237 A1 | 3/2011 | Hasegawa et al. |
| 2011/0115997 A1 | 5/2011 | Kim |
| 2011/0187635 A1 | 8/2011 | Lee et al. |
| 2011/0188120 A1 | 8/2011 | Tabirian et al. |
| 2011/0199459 A1 | 8/2011 | Barenbrug et al. |
| 2011/0211142 A1 | 9/2011 | Kashiwagi et al. |
| 2011/0216266 A1 | 9/2011 | Travis |
| 2011/0221998 A1 | 9/2011 | Adachi et al. |
| 2011/0228183 A1 | 9/2011 | Harnagishi |
| 2011/0235359 A1 | 9/2011 | Liu et al. |
| 2011/0242150 A1 | 10/2011 | Song et al. |
| 2011/0242277 A1 | 10/2011 | Do et al. |
| 2011/0242298 A1 | 10/2011 | Bathiche et al. |
| 2011/0255303 A1 | 10/2011 | Nichol et al. |
| 2011/0267563 A1 | 11/2011 | Shimizu |
| 2011/0285927 A1 | 11/2011 | Schultz et al. |
| 2011/0292321 A1 | 12/2011 | Travis et al. |
| 2011/0310232 A1 | 12/2011 | Wilson et al. |
| 2012/0002136 A1 | 1/2012 | Nagata et al. |
| 2012/0002295 A1 | 1/2012 | Dobschal et al. |
| 2012/0008067 A1 | 1/2012 | Mun et al. |
| 2012/0013720 A1 | 1/2012 | Kadowaki et al. |
| 2012/0056971 A1 | 3/2012 | Kumar et al. |
| 2012/0062991 A1 | 3/2012 | Mich et al. |
| 2012/0063166 A1 | 3/2012 | Panagotacos et al. |
| 2012/0081920 A1 | 4/2012 | Ie et al. |
| 2012/0086776 A1 | 4/2012 | Lo |
| 2012/0092435 A1 | 4/2012 | Wohlert |
| 2012/0106193 A1 | 5/2012 | Kim et al. |
| 2012/0127573 A1 | 5/2012 | Robinson et al. |
| 2012/0154450 A1 | 6/2012 | Aho et al. |
| 2012/0162966 A1 | 6/2012 | Kim et al. |
| 2012/0169838 A1 | 7/2012 | Sekine |
| 2012/0206050 A1 | 8/2012 | Spero |
| 2012/0219180 A1 | 8/2012 | Mehra |
| 2012/0243204 A1 | 9/2012 | Robinson |
| 2012/0243261 A1 | 9/2012 | Yamamoto et al. |
| 2012/0293721 A1 | 11/2012 | Ueyama |
| 2012/0314145 A1 | 12/2012 | Robinson |
| 2012/0327101 A1 | 12/2012 | Blixt et al. |
| 2012/0327172 A1 | 12/2012 | El-Saban et al. |
| 2013/0101253 A1 | 4/2013 | Popovich et al. |
| 2013/0107340 A1 | 5/2013 | Wong et al. |
| 2013/0127861 A1 | 5/2013 | Gollier |
| 2013/0135588 A1 | 5/2013 | Popovich et al. |
| 2013/0156265 A1 | 6/2013 | Hennessy |
| 2013/0169701 A1 | 7/2013 | Whitehead et al. |
| 2013/0230136 A1 | 9/2013 | Sakaguchi et al. |
| 2013/0235561 A1 | 9/2013 | Etienne et al. |
| 2013/0265625 A1 | 10/2013 | Fäcke et al. |
| 2013/0294684 A1 | 11/2013 | Lipton et al. |
| 2013/0307831 A1 | 11/2013 | Robinson et al. |
| 2013/0307946 A1 | 11/2013 | Robinson et al. |
| 2013/0308185 A1* | 11/2013 | Robinson ............ G02B 27/225 359/465 |
| 2013/0308339 A1 | 11/2013 | Woodgate et al. |
| 2013/0321599 A1 | 12/2013 | Harrold et al. |
| 2013/0328866 A1 | 12/2013 | Woodgate et al. |
| 2013/0335821 A1 | 12/2013 | Robinson et al. |
| 2014/0009508 A1 | 1/2014 | Woodgate et al. |
| 2014/0016354 A1 | 1/2014 | Lee et al. |
| 2014/0022619 A1 | 1/2014 | Woodgate et al. |
| 2014/0036361 A1 | 2/2014 | Woodgate et al. |
| 2014/0041205 A1 | 2/2014 | Robinson et al. |
| 2014/0043323 A1 | 2/2014 | Sumi |
| 2014/0098558 A1 | 4/2014 | Vasylyev |

(56) References Cited

U.S. PATENT DOCUMENTS

| | | | |
|---|---|---|---|
| 2014/0126238 A1 | 5/2014 | Kao et al. | |
| 2014/0152781 A1 | 6/2014 | Nam et al. | |
| 2014/0240344 A1 | 8/2014 | Tomono et al. | |
| 2014/0240828 A1* | 8/2014 | Robinson | G02B 27/26 359/465 |
| 2014/0267584 A1 | 9/2014 | Atzpadin et al. | |
| 2014/0340728 A1 | 11/2014 | Taheri | |
| 2014/0368602 A1 | 12/2014 | Woodgate et al. | |
| 2015/0116212 A1 | 4/2015 | Freed et al. | |
| 2015/0160404 A1 | 6/2015 | Robinson et al. | |
| 2015/0177447 A1 | 6/2015 | Woodgate et al. | |
| 2015/0268479 A1 | 9/2015 | Woodgate et al. | |
| 2015/0334365 A1 | 11/2015 | Tsubaki et al. | |
| 2015/0339512 A1 | 11/2015 | Son et al. | |

FOREIGN PATENT DOCUMENTS

| | | |
|---|---|---|
| CN | 1454329 A | 11/2003 |
| CN | 1466005 A | 1/2004 |
| CN | 1487332 A | 4/2004 |
| CN | 1696788 A | 11/2005 |
| CN | 1826553 A | 8/2006 |
| CN | 1900785 A | 1/2007 |
| CN | 1908753 A | 2/2007 |
| CN | 101029975 A | 9/2007 |
| CN | 101049028 A | 10/2007 |
| CN | 101114080 A | 1/2008 |
| CN | 101142823 A | 3/2008 |
| CN | 101266338 A | 9/2008 |
| CN | 102147079 A | 8/2011 |
| EP | 0653891 A1 | 5/1995 |
| EP | 08300984 A2 | 3/1998 |
| EP | 0860729 A2 | 8/1998 |
| EP | 0939273 A1 | 9/1999 |
| EP | 1394593 A1 | 3/2004 |
| EP | 2219067 A1 | 8/2010 |
| EP | 2451180 A2 | 5/2012 |
| GB | 2405542 | 2/2005 |
| JP | H10142556 A | 5/1998 |
| JP | 2003215705 A | 7/2003 |
| JP | 2005181914 A | 7/2005 |
| JP | 2006010935 A | 1/2006 |
| JP | 2007094035 A | 4/2007 |
| JP | 2007109255 A | 4/2007 |
| JP | 2007273288 A | 10/2007 |
| JP | 2008204874 A | 9/2008 |
| JP | 2010160527 A | 7/2010 |
| JP | 2012060607 A | 3/2012 |
| JP | 2013015619 | 1/2013 |
| KR | 20090932304 | 12/2009 |
| KR | 20110006773 A | 1/2011 |
| KR | 20110017918 A | 2/2011 |
| KR | 20120049890 A | 5/2012 |
| WO | 1994006249 A1 | 3/1994 |
| WO | 1995020811 A1 | 8/1995 |
| WO | 1995027915 A1 | 10/1995 |
| WO | 1998021620 A1 | 5/1998 |
| WO | 1999011074 A1 | 3/1999 |
| WO | 2001061241 A1 | 8/2001 |
| WO | 2007111436 A1 | 10/2007 |
| WO | 2011020962 A1 | 2/2011 |
| WO | 2012158574 A1 | 11/2012 |

OTHER PUBLICATIONS

3M™ ePrivacy Filter software professional version; http://www.cdw.com/shop/products/3M-ePrivacy-Filter-software-professional-version/3239412.aspx?cm_mmc=ShoppingFeeds-_-ChannelIntelligence-_-Software-_-3239412_3MT%20ePrivacy%20Filter%20software%20professional%20version_3MF-EPFPRO&cpncode=37-7582919&srccode=cii_10191459#PO; Copyright 2007-2016.

Bahadur, "Liquid crystals applications and uses," World Scientific, vol. 1, pp. 178 (1990).

Beato: "Understanding Comfortable stereography", Dec. 31, 2011 (Dec. 31, 2011), XP055335952, Retrieved from the Internet: URL:http://64.17.134.112/Affonso Beato/Understanding Comfortable Stereography.html [retrieved-on Jan. 17, 2017].

Braverman: "The 3D Toolbox : News", Aug. 13, 2010 (Aug. 13, 2010), XP055336081, Retrieved from the Internet: URL:http://www.dashwood3d.com/blog/the-3d-toolbox/ [retrieved on Jan. 17, 2017].

Cootes et al., "Active Appearance Models", IEEE Trans. Pattern Analysis and Machine Intelligence, 23(6):681-685, 2001.

Cootes et al., "Active Shape Models—Their Training and Application" Computer Vision and Image Understanding 61(1):38-59 Jan. 1995.

Dalal et al., "Histogram of Oriented Gradients for Human Detection", Computer Vision and Pattern Recognition, pp. 886-893, 2005.

Drucker et al., "Support Vector Regression Machines", Advances in Neural Information Processing Systems 9, pp. 155-161, NIPS 1996.

Ho, "Random Decision Forests", Proceedings of the 3rd International Conference on Document Analysis and Recognition, Montreal, QC, pp. 278-282, Aug. 14-16, 1995.

Ian Sexton et al: "Stereoscopic and autostereoscopic display-systems",—IEEE Signal Processing Magazine, May 1, 1999 (May 1, 1999), pp. 85-99, XP055305471, Retrieved from the Internet: RL:http://ieeexplore.ieee.org/iel5/79/16655/00768575.pdf [retrieved on Sep. 26, 2016].

Kalantar, et al. "Backlight Unit With Double Surface Light Emission," J. Soc. Inf. Display, vol. 12, Issue 4, pp. 379-387 (Dec. 2004).

Kononenko et al., "Learning to Look Up: Realtime Monocular Gaze Correction Using Machine Learning", Computer Vision and Pattern Recognition, pp. 4667-4675, 2015.

Languy et al., "Performance comparison of four kinds of flat nonimaging Fresnel lenses made of polycarbonates and polymethyl methacrylate for concentrated photovoltaics", Optics Letters, 36, pp. 2743-2745.

Lipton, "Stereographics: Developers' Handbook", Stereographic Developers Handbook, Jan. 1, 1997, XP002239311, p. 42-49.

Lipton: "Stereoscopic Composition Lenny Lipton", Feb. 15, 2009 (Feb. 15, 2009), XP055335930, Retrieved from the Internet: URL:https://lennylipton.wordpress.com/2009/02/15/stereoscopic-composition/ [retrieved on Jan. 17, 2017].

Lowe, "Distinctive Image Features from Scale-Invariant Keypoints", International Journal of Computer Vision 60 (2), pp. 91-110, 2004.

Lucio et al: "RGBD Camera Effects", Aug. 1, 2012 (Aug. 1, 2012), XP055335831, SIBGRAPI—Conference on Graphics, Patterns and Images Retrieved from the Internet: URL:https://www.researchgate.net/profile/Leandro Cruz/publication/233398182 RGBD Camera Effects/links/0912f50a2922010eb2000000.pdf [retrieved on Jan. 17, 2017].

Marjanovic, M.,"Interlace, Interleave, and Field Dominance," http://www.mir.com/DMG/interl.html, pp. 1-5 (2001).

Ozuysal et al., "Fast Keypoint recognition in Ten Lines of Code", Computer Vision and Pattern Recognition, pp. 1-8, 2007.

Tabiryan et al., "The Promise of Diffractive Waveplates," Optics and Photonics News, vol. 21, Issue 3, pp. 40-45 (Mar. 2010).

Travis, et al. "Backlight for view-sequential autostereo 3D", Microsoft E&DD Applied Sciences, (date unknown), 25 pages.

Travis, et al. "Collimated light from a waveguide for a display," Optics Express, vol. 17, No. 22, pp. 19714-19719 (2009).

Viola and Jones, "Rapid Object Detection using a Boosted Cascade of Simple Features", pp. 1-9 CVPR 2001.

Williams S P et al., "New Computational Control Techniques and Increased Understanding for Stereo 3-D Displays", Proceedings of SPIE, SPIE, US, vol. 1256, Jan. 1, 1990, XP000565512, p. 75, 77, 79.

Zach et al., "A Duality Based Approach for Realtime TV-L1 Optical Flow", Pattern Recognition (Proc. DAGM), 2007, pp. 214-223.

\* cited by examiner

OPTICAL STACK FOR IMAGING DIRECTIONAL BACKLIGHTS

TECHNICAL FIELD

This disclosure generally relates to illumination of light modulation devices, and more specifically relates to light guides for providing large area illumination from localized light sources for use in 2D, 3D, and/or autostereoscopic display devices.

BACKGROUND

Spatially multiplexed autostereoscopic displays typically align a parallax component such as a lenticular screen or parallax barrier with an array of images arranged as at least first and second sets of pixels on a spatial light modulator, for example an LCD. The parallax component directs light from each of the sets of pixels into different respective directions to provide first and second viewing windows in front of the display. An observer with an eye placed in the first viewing window can see a first image with light from the first set of pixels; and with an eye placed in the second viewing window can see a second image, with light from the second set of pixels.

Such displays have reduced spatial resolution compared to the native resolution of the spatial light modulator and further, the structure of the viewing windows is determined by the pixel aperture shape and parallax component imaging function. Gaps between the pixels, for example for electrodes, typically produce non-uniform viewing windows. Undesirably such displays exhibit image flicker as an observer moves laterally with respect to the display and so limit the viewing freedom of the display. Such flicker can be reduced by defocusing the optical elements; however such defocusing results in increased levels of image cross talk and increases visual strain for an observer. Such flicker can be reduced by adjusting the shape of the pixel aperture, however such changes can reduce display brightness and can compromise addressing electronics in the spatial light modulator.

BRIEF SUMMARY

According to the present disclosure, a directional illumination apparatus may include an imaging directional backlight for directing light, an illuminator array for providing light to the imaging directional backlight. The imaging directional backlight may include a waveguide for guiding light. The waveguide may include a first light guiding surface and a second light guiding surface, opposite the first light guiding surface.

Display backlights in general employ waveguides and edge emitting sources. Certain imaging directional backlights have the additional capability of directing the illumination through a display panel into viewing windows. An imaging system may be formed between multiple sources and the respective window images. One example of an imaging directional backlight is an optical valve that may employ a folded optical system and hence may also be an example of a folded imaging directional backlight. Light may propagate substantially without loss in one direction through the optical valve while counter-propagating light may be extracted by reflection off tilted facets as described in U.S. Pat. No. 9,519,153, which is herein incorporated by reference in its entirety.

Directional backlights provide illumination through a waveguide with directions within the waveguide imaged to viewing windows. Diverging light from light sources at the input end and propagating within the waveguide is provided with reduced divergence, and typically collimated, by a curved reflecting mirror at a reflecting end of the waveguide and is imaged towards a viewing window by means of curved light extraction features or a lens such as a Fresnel lens. For the on-axis viewing window, the collimated light is substantially parallel to the edges of a rectangular shaped waveguide and so light is output across the entire area of the waveguide towards the viewing window. For off-axis positions, the direction of the collimated light is not parallel to the edges of a rectangular waveguide but is inclined at a non-zero angle. Thus a non-illuminated (or void) outer portion (that may be triangular in shape) is formed between one edge of the collimated beam and the respective edge of the waveguide. No light is directed to the respective viewing window from within the outer portion and the display will appear dark in this region. It would be desirable to reduce the appearance of the dark outer portions for off-axis viewing positions so that more of the area of the waveguide can be used to illuminate a spatial light modulator, advantageously reducing system size and cost.

In general with this and related imaging directional backlight systems, not all the backlight area may be useable due to vignetting at high angles. Modification of the system may overcome this limitation by introducing light into regions that are void. Such modified illumination apparatus embodiments may lead to increased brightness, local independent illumination and directional capabilities.

According to a first aspect of the present disclosure there is provided a directional display device comprising: a waveguide comprising first and second, opposed guide surfaces for guiding light along the waveguide and an input surface extending between the first and second guide surfaces; an array of light sources disposed at different input positions along the input surface of the waveguide and arranged to input light into the waveguide, the waveguide further comprising a reflective end for reflecting the input light from the light sources back along the waveguide, the second guide surface being arranged to deflect the reflected input light through the first guide surface as output light, and the waveguide being arranged to image the light sources in a lateral direction so that the output light from the light sources is directed into respective optical windows in output directions that are distributed in dependence on the input positions of the light sources; a transmissive spatial light modulator arranged to receive the output light and arranged to modulate a first polarization component of the output light having a first polarization state; a reflective polarizer disposed between the first guide surface of the waveguide and the spatial light modulator and arranged to transmit the first polarization component and to reflect a second polarization component of the output light having a second polarization state orthogonal to the first polarization state as rejected light; and a rear reflector disposed behind the second guide surface arranged to reflect the rejected light for supply back to the spatial light modulator, the rear reflector comprising a linear array of pairs of reflective corner facets extending in a predetermined direction perpendicular to the normal to spatial light modulator so that the rear reflector converts the polarization state of the rejected light that has a double reflection from a pair of corner facets into an orthogonal polarization state; one or more correction retarders comprising birefringent material disposed between the reflective polarizer and the rear reflector, the one or more correction retarders being arranged to provide a net effect of relatively shifting the phase of the first and second polarization components incident thereon in a direction normal to the spatial light modulator by half a wavelength, the birefringent material of the one or more correction retarder having a slow axis extending in a direction perpendicular to the predetermined direction.

Advantageously the luminance in the direction perpendicular to the predetermined direction can be increased and display efficiency increased. Further color changes with viewing angle may be reduced, and visibility of Moiré and damage to optical components may be reduced.

The one or more correction retarders may be a single correction retarder. Advantageously cost may be reduced.

The correction retarder may be disposed between the waveguide and the rear reflector. Advantageously the correction retarder may reduce damage between the rear reflector and the waveguide.

The correction retarder may be disposed between the reflective polarizer and the waveguide. Advantageously the correction retarder may be attached to the spatial light modulator to reduce damage and increase retarder flatness, minimizing image mura.

The one or more correction retarders may be plural correction retarders. Advantageously the tuning of color and luminance efficiency may be optimized. The plural correction retarders may include a correction retarder disposed between the waveguide and the rear reflector and a correction retarder disposed between the reflective polarizer and the waveguide. Advantageously flatness of retarders may be optimized and damage between rear reflector and waveguide reduced.

The directional display device may further comprise an adjustment retarder disposed between the reflective polarizer and the rear reflector and may be arranged to adjust the polarization state of the second polarization component. Advantageously efficient polarization recirculation may be achieved in displays with input polarizers at electric vector transmission direction angles different from 45 degrees, for example in plane switching liquid crystal displays. Image contrast and viewing angle in wide mode of operation can be increased.

The predetermined direction may be the lateral direction. The second polarization component may be linearly polarized on reflection at the rear reflector in a direction at an angle of 45° to the predetermined direction. The first guide surface may be arranged to guide light by total internal reflection, and the second guide surface may comprise light extraction features and intermediate regions between the light extraction features, the light extraction features being oriented to reflect light guided through the waveguide in directions allowing exit through the first guide surface as output light and the intermediate regions being arranged to direct light through the waveguide without extracting it. The extraction facets may be curved and have positive optical power in the lateral direction between sides of the waveguide that extend between the first and second guide surfaces. The reflective end may have positive optical power in the lateral direction extending between sides of the waveguide that extend between the first and second guide surfaces. The pairs of reflective corner facets may be curved and have optical power in the predetermined direction. The input surface is an end of the waveguide opposite to the reflective end. The input surface may be a surface of a side of the waveguide extending away from the reflective end.

According to a second aspect of the present disclosure there is provided a directional display apparatus comprising: a directional display device according to the first aspect; and a control system arranged to control the light sources.

Any of the aspects of the present disclosure may be applied in any combination.

Embodiments herein may provide an autostereoscopic display that provides wide angle viewing which may allow for directional viewing and conventional 2D compatibility. The wide angle viewing mode may be for observer tracked autostereoscopic 3D display, observer tracked 2D display (for example for privacy or power saving applications), for wide viewing angle 2D display or for wide viewing angle stereoscopic 3D display. Further, embodiments may provide a controlled illuminator for the purposes of an efficient autostereoscopic display. Such components can be used in directional backlights, to provide directional displays including autostereoscopic displays. Additionally, embodiments may relate to a directional backlight apparatus and a directional display which may incorporate the directional backlight apparatus. Such an apparatus may be used for autostereoscopic displays, privacy displays, multi-user displays and other directional display applications that may achieve for example power savings operation and/or high luminance operation.

Embodiments herein may provide an autostereoscopic display with large area and thin structure. Further, as will be described, the optical valves of the present disclosure may achieve thin optical components with large back working distances. Such components can be used in directional backlights, to provide directional displays including autostereoscopic displays. Further, embodiments may provide a controlled illuminator for the purposes of an efficient autostereoscopic display.

Embodiments of the present disclosure may be used in a variety of optical systems. The embodiment may include or work with a variety of projectors, projection systems, optical components, displays, microdisplays, computer systems, processors, self-contained projector systems, visual and/or audiovisual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

Directional backlights offer control over the illumination emanating from substantially the entire output surface controlled typically through modulation of independent LED light sources arranged at the input aperture side of an optical waveguide. Controlling the emitted light directional distribution can achieve single person viewing for a security function, where the display can only be seen by a single viewer from a limited range of angles; high electrical efficiency, where illumination is primarily provided over a small angular directional distribution; alternating left and right eye viewing for time sequential stereoscopic and autostereoscopic display; and low cost.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which.

DETAILED DESCRIPTION

Figure 1A:
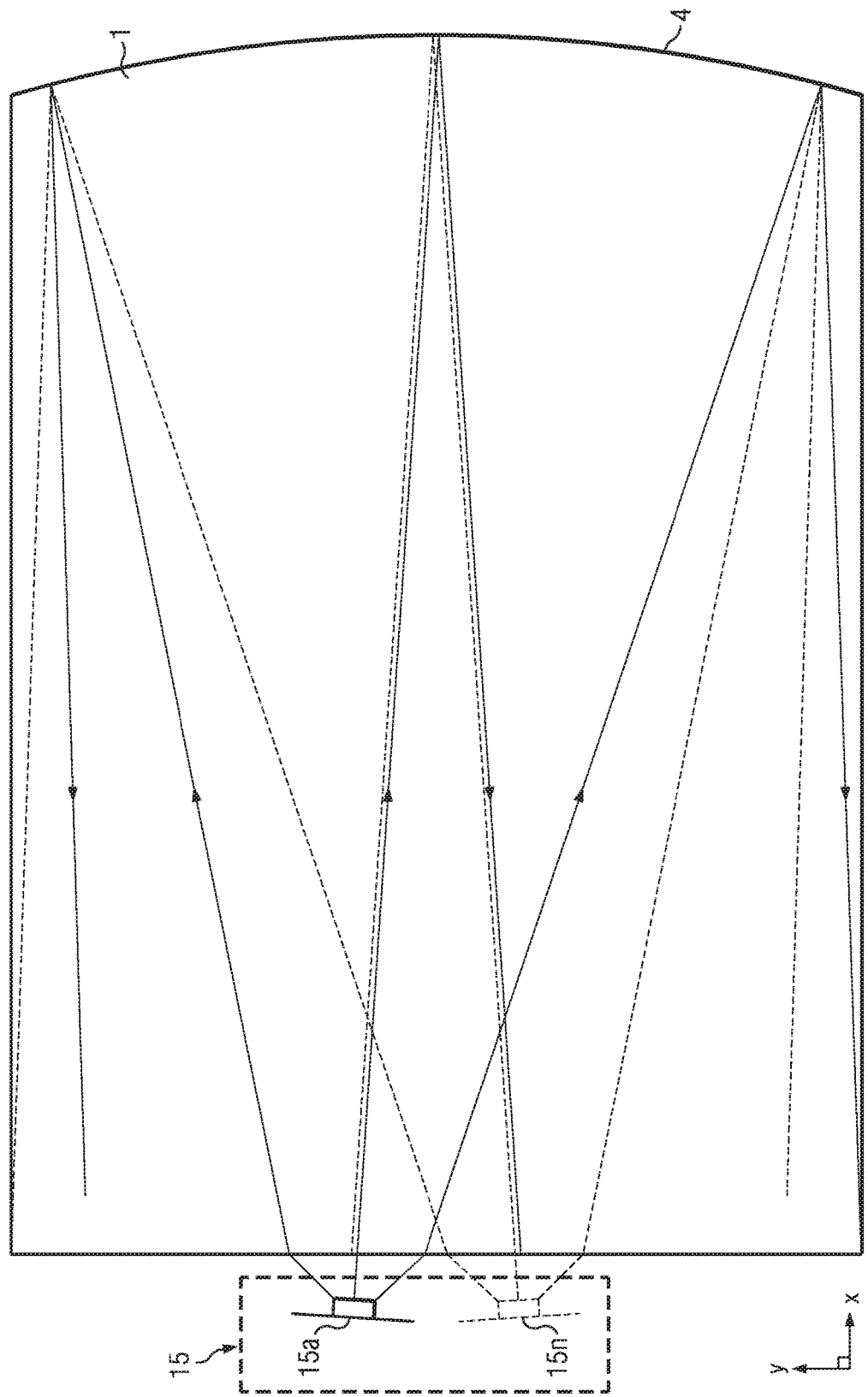
FIG. 1A is a schematic diagram illustrating a front view of light propagation in one embodiment of a directional display device, in accordance with the present disclosure.

Time multiplexed autostereoscopic displays can advantageously improve the spatial resolution of autostereoscopic display by directing light from all of the pixels of a spatial light modulator to a first viewing window in a first time slot, and all of the pixels to a second viewing window in a second time slot. Thus an observer with eyes arranged to receive light in first and second viewing windows will see a full resolution image across the whole of the display over multiple time slots. Time multiplexed displays can advantageously achieve directional illumination by directing an illuminator array through a substantially transparent time multiplexed spatial light modulator using directional optical elements, wherein the directional optical elements substantially form an image of the illuminator array in the window plane.

The uniformity of the viewing windows may be advantageously independent of the arrangement of pixels in the spatial light modulator. Advantageously, such displays can provide observer tracking displays which have low flicker, with low levels of cross talk for a moving observer.

To achieve high uniformity in the window plane, it is desirable to provide an array of illumination elements that have a high spatial uniformity. The illuminator elements of the time sequential illumination system may be provided, for example, by pixels of a spatial light modulator with size approximately 100 micrometers in combination with a lens array. However, such pixels suffer from similar difficulties as for spatially multiplexed displays. Further, such devices may have low efficiency and higher cost, requiring additional display components.

High window plane uniformity can be conveniently achieved with macroscopic illuminators, for example, an array of LEDs in combination with homogenizing and diffusing optical elements that are typically of size 1 mm or greater. However, the increased size of the illuminator elements means that the size of the directional optical elements increases proportionately. For example, a 16 mm wide illuminator imaged to a 65 mm wide viewing window may require a 200 mm back working distance. Thus, the increased thickness of the optical elements can prevent useful application, for example, to mobile displays, or large area displays.

Addressing the aforementioned shortcomings, optical valves as described in commonly-owned U.S. Pat. No. 9,519,153 advantageously can be arranged in combination with fast switching transmissive spatial light modulators to achieve time multiplexed autostereoscopic illumination in a thin package while providing high resolution images with flicker free observer tracking and low levels of cross talk. Described is a one dimensional array of viewing positions, or windows, that can display different images in a first, typically horizontal, direction, but contain the same images when moving in a second, typically vertical, direction.

Conventional non-imaging display backlights commonly employ optical waveguides and have edge illumination from light sources such as LEDs. However, it should be appreciated that there are many fundamental differences in the function, design, structure, and operation between such conventional non-imaging display backlights and the imaging directional backlights discussed in the present disclosure.

Generally, for example, in accordance with the present disclosure, imaging directional backlights are arranged to direct the illumination from multiple light sources through a display panel to respective multiple viewing windows in at least one axis. Each viewing window is substantially formed as an image in at least one axis of a light source by the imaging system of the imaging directional backlight. An imaging system may be formed between multiple light sources and the respective window images. In this manner, the light from each of the multiple light sources is substantially not visible for an observer's eye outside of the respective viewing window.

In contradistinction, conventional non-imaging backlights or light guiding plates (LGPs) are used for illumination of 2D displays. See, e.g., Kälil Käläntär et al., *Backlight Unit With Double Surface Light Emission*, J. Soc. Inf. Display, Vol. 12, Issue 4, pp. 379-387 (December 2004). Non-imaging backlights are typically arranged to direct the illumination from multiple light sources through a display panel into a substantially common viewing zone for each of the multiple light sources to achieve wide viewing angle and high display uniformity. Thus non-imaging backlights do not form viewing windows. In this manner, the light from each of the multiple light sources may be visible for an observer's eye at substantially all positions across the viewing zone. Such conventional non-imaging backlights may have some directionality, for example, to increase screen gain compared to Lambertian illumination, which may be provided by brightness enhancement films such as BEF™ from 3M. However, such directionality may be substantially the same for each of the respective light sources. Thus, for these reasons and others that should be apparent to persons of ordinary skill, conventional non-imaging backlights are different to imaging directional backlights. Edge lit non-imaging backlight illumination structures may be used in liquid crystal display systems such as those seen in 2D Laptops, Monitors and TVs. Light propagates from the edge of a lossy waveguide which may include sparse features; typically local indentations in the surface of the guide which cause light to be lost regardless of the propagation direction of the light.

As used herein, an optical valve is an optical structure that may be a type of light guiding structure or device referred to as, for example, a light valve, an optical valve directional backlight, and a valve directional backlight ("v-DBL"). In the present disclosure, optical valve is different to a spatial light modulator (even though spatial light modulators may be sometimes generally referred to as a "light valve" in the art). One example of an imaging directional backlight is an optical valve that may employ a folded optical system. Light may propagate substantially without loss in one direction through the optical valve, may be incident on an imaging reflector, and may counter-propagate such that the light may be extracted by reflection off tilted light extraction features, and directed to viewing windows as described in U.S. Pat. No. 9,519,153, which is herein incorporated by reference in its entirety.

Additionally, as used herein, a stepped waveguide imaging directional backlight may be at least one of an optical valve. A stepped waveguide is a waveguide for an imaging directional backlight comprising a waveguide for guiding light, further comprising: a first light guiding surface; and a second light guiding surface, opposite the first light guiding surface, further comprising a plurality of light guiding features interspersed with a plurality of extraction features arranged as steps.

In operation, light may propagate within an exemplary optical valve in a first direction from an input surface to a reflective side and may be transmitted substantially without loss. Light may be reflected at the reflective side and propagates in a second direction substantially opposite the first direction. As the light propagates in the second direction, the light may be incident on light extraction features, which are operable to redirect the light outside the optical valve. Stated differently, the optical valve generally allows light to propagate in the first direction and may allow light to be extracted while propagating in the second direction.

The optical valve may achieve time sequential directional illumination of large display areas. Additionally, optical elements may be employed that are thinner than the back working distance of the optical elements to direct light from macroscopic illuminators to a window plane. Such displays may use an array of light extraction features arranged to extract light counter propagating in a substantially parallel waveguide.

Thin imaging directional backlight implementations for use with LCDs have been proposed and demonstrated by 3M, for example U.S. Pat. No. 7,528,893; by Microsoft, for example U.S. Pat. No. 7,970,246 which may be referred to herein as a "wedge type directional backlight;" by RealD, for example U.S. Pat. No. 9,519,153 which may be referred to herein as an "optical valve" or "optical valve directional backlight," all of which are herein incorporated by reference in their entirety.

The present disclosure provides stepped waveguide imaging directional backlights in which light may reflect back and forth between the internal faces of, for example, a stepped waveguide which may include a first side and a first set of features. As the light travels along the length of the stepped waveguide, the light may not substantially change angle of incidence with respect to the first side and first set of surfaces and so may not reach the critical angle of the medium at these internal faces. Light extraction may be advantageously achieved by a second set of surfaces (the step "risers") that are inclined to the first set of surfaces (the step "treads"). Note that the second set of surfaces may not be part of the light guiding operation of the stepped waveguide, but may be arranged to provide light extraction from the structure. By contrast, a wedge type imaging directional backlight may allow light to guide within a wedge profiled waveguide having continuous internal surfaces. The optical valve is thus not a wedge type imaging directional backlight.

Figure 1B:
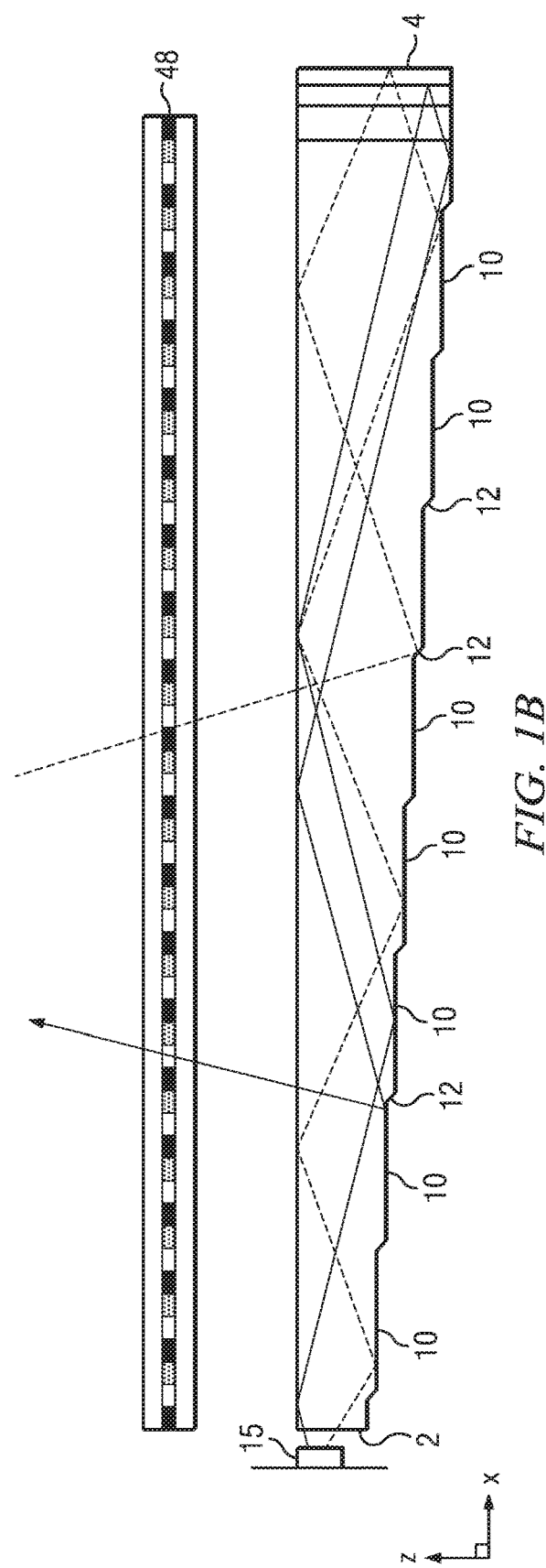
FIG. 1B is a schematic diagram illustrating a side view of light propagation in one embodiment of the directional display device of FIG. 1A, in accordance with the present disclosure.

FIG. 1A is a schematic diagram illustrating a front view of light propagation in one embodiment of a directional display device, and FIG. 1B is a schematic diagram illustrating a side view of light propagation in the directional display device of FIG. 1A.

FIG. 1A illustrates a front view in the xy plane of a directional backlight of a directional display device, and includes an illuminator array 15 which may be used to illuminate a stepped waveguide 1. Illuminator array 15 includes illuminator elements 15a through illuminator element 15n (where n is an integer greater than one). In one example, the stepped waveguide 1 of FIG. 1A may be a stepped, display sized waveguide 1. Illumination elements 15a through 15n are light sources that may be light emitting diodes (LEDs). Although LEDs are discussed herein as illuminator elements 15a-15n, other light sources may be used such as, but not limited to, diode sources, semiconductor sources, laser sources, local field emission sources, organic emitter arrays, and so forth. Additionally, FIG. 1B illustrates a side view in the xz plane, and includes illuminator array 15, SLM 48, extraction features 12, guiding features 10, and stepped waveguide 1, arranged as shown. The side view provided in FIG. 1B is an alternative view of the front view shown in FIG. 1A. Accordingly, the illuminator array 15 of FIGS. 1A and 1B corresponds to one another and the stepped waveguide 1 of FIGS. 1A and 1B may correspond to one another.

Further, in FIG. 1B, the stepped waveguide 1 may have an input end 2 that is thin and a reflective end 4 that is thick. Thus the waveguide 1 extends between the input end 2 that receives input light and the reflective end 4 that reflects the input light back through the waveguide 1. The length of the input end 2 in a lateral direction across the waveguide is greater than the height of the input end 2. The illuminator elements 15a-15n are disposed at different input positions in a lateral direction across the input end 2.

The waveguide 1 has first and second, opposed guide surfaces extending between the input end 2 and the reflective end 4 for guiding light forwards and back along the waveguide 1. The second guide surface has a plurality of light extraction features 12 facing the reflective end 4 and arranged to reflect at least some of the light guided back through the waveguide 1 from the reflective end from different input positions across the input end in different directions through the first guide surface that are dependent on the input position.

In this example, the light extraction features 12 are reflective facets, although other reflective features could be used. The light extraction features 12 do not guide light through the waveguide, whereas the intermediate regions of the second guide surface intermediate the light extraction features 12 guide light without extracting it. Those regions of the second guide surface are planar and may extend parallel to the first guide surface, or at a relatively low inclination. The light extraction features 12 extend laterally to those regions so that the second guide surface has a stepped shape which may include the light extraction features 12 and intermediate regions. The light extraction features 12 are oriented to reflect light from the light sources, after reflection from the reflective end 4, through the first guide surface.

The light extraction features 12 are arranged to direct input light from different input positions in the lateral direction across the input end in different directions relative to the first guide surface that are dependent on the input position. As the illumination elements 15a-15n are arranged at different input positions, the light from respective illumination elements 15a-15n is reflected in those different directions. In this manner, each of the illumination elements 15a-15n directs light into a respective optical window in output directions distributed in the lateral direction in dependence on the input positions. The lateral direction across the input end 2 in which the input positions are distributed corresponds with regard to the output light to a lateral direction to the normal to the first guide surface. The lateral directions as defined at the input end 2 and with regard to the output light remain parallel in this embodiment where the deflections at the reflective end 4 and the first guide surface are generally orthogonal to the lateral direction. Under the control of a control system, the illuminator elements 15a-15n may be selectively operated to direct light into a selectable optical window. The optical windows may be used individually or in groups as viewing windows.

The SLM 48 extends across the waveguide and modulates the light output therefrom. Although the SLM 48 may a liquid crystal display (LCD), this is merely by way of example and other spatial light modulators or displays may be used including LCOS, DLP devices, and so forth, as this illuminator may work in reflection. In this example, the SLM 48 is disposed across the first guide surface of the waveguide and modulates the light output through the first guide surface after reflection from the light extraction features 12.

The operation of a directional display device that may provide a one dimensional array of viewing windows is illustrated in front view in FIG. 1A, with its side profile shown in FIG. 1B. In operation, in FIGS. 1A and 1B, light may be emitted from an illuminator array 15, such as an array of illuminator elements 15a through 15n, located at different positions, y, along the surface of thin end side 2, x=0, of the stepped waveguide 1. The light may propagate along +x in a first direction, within the stepped waveguide 1, while at the same time, the light may fan out in the xy plane and upon reaching the far curved end side 4, may substantially or entirely fill the curved end side 4. While propagating, the light may spread out to a set of angles in the xz plane up to, but not exceeding the critical angle of the guide material. The extraction features 12 that link the guiding features 10 of the bottom side of the stepped waveguide 1 may have a tilt angle greater than the critical angle and hence may be missed by substantially all light propagating along +x in the first direction, ensuring the substantially lossless forward propagation.

Continuing the discussion of FIGS. 1A and 1B, the curved end side 4 of the stepped waveguide 1 may be made reflective, typically by being coated with a reflective material such as, for example, silver, although other reflective techniques may be employed. Light may therefore be redirected in a second direction, back down the guide in the direction of −x and may be substantially collimated in the xy or display plane. The angular spread may be substantially preserved in the xz plane about the principal propagation direction, which may allow light to hit the riser edges and reflect out of the guide. In an embodiment with approximately 45 degree tilted extraction features 12, light may be effectively directed approximately normal to the xy display plane with the xz angular spread substantially maintained relative to the propagation direction. This angular spread may be increased when light exits the stepped waveguide 1 through refraction, but may be decreased somewhat dependent on the reflective properties of the extraction features 12.

In some embodiments with uncoated extraction features 12, reflection may be reduced when total internal reflection (TIR) fails, squeezing the xz angular profile and shifting off normal. However, in other embodiments having silver coated or metallized extraction features, the increased angular spread and central normal direction may be preserved. Continuing the description of the embodiment with silver coated extraction features, in the xz plane, light may exit the stepped waveguide 1 approximately collimated and may be directed off normal in proportion to the y-position of the respective illuminator element 15a-15n in illuminator array 15 from the input edge center. Having independent illuminator elements 15a-15n along the input edge 2 then enables light to exit from the entire first light directing side 6 and propagate at different external angles, as illustrated in FIG. 1A.

Figure 2A:
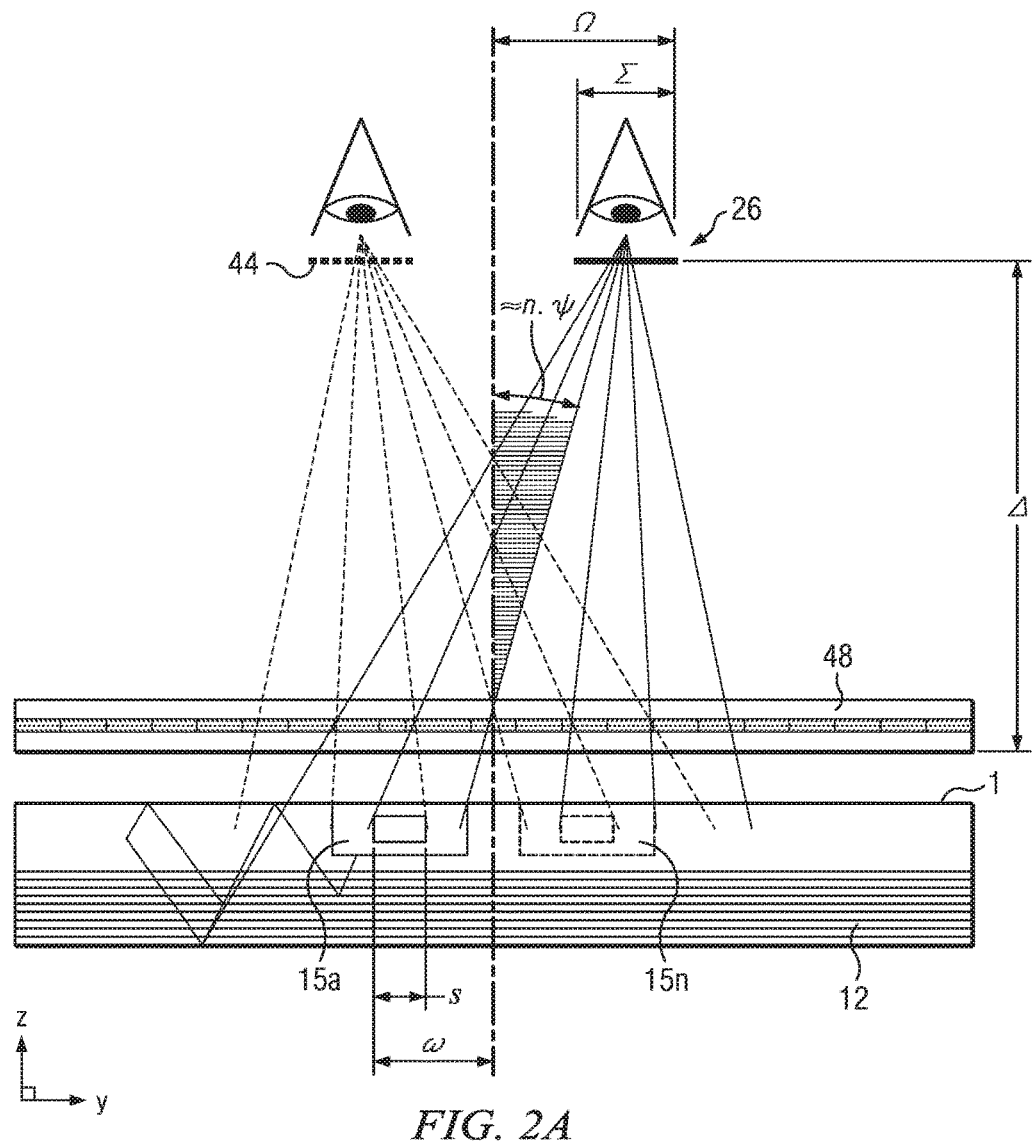
FIG. 2A is a schematic diagram illustrating in a top view of light propagation in another embodiment of a directional display device, in accordance with the present disclosure.
Figure 2B:
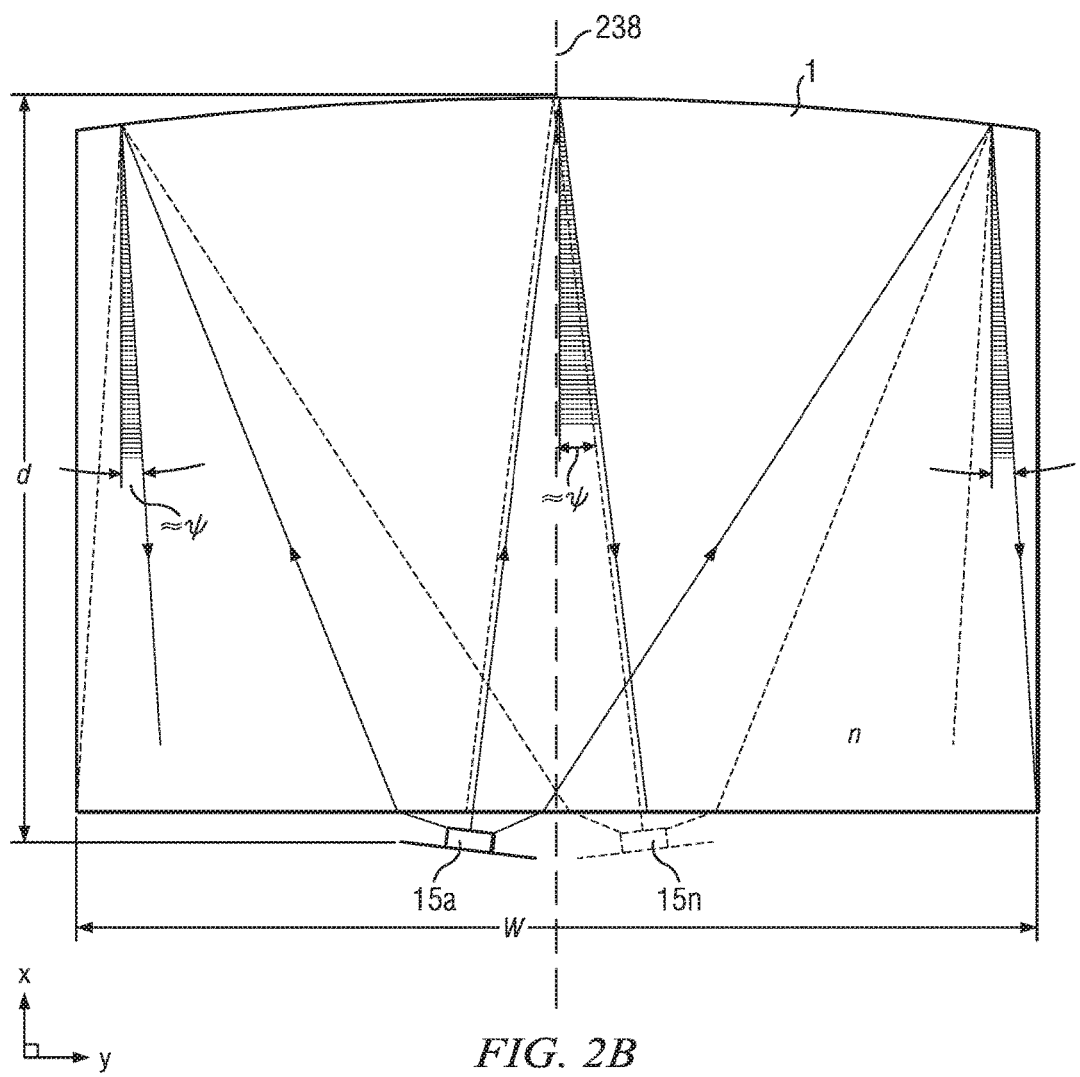
FIG. 2B is a schematic diagram illustrating light propagation in a front view of the directional display device of FIG. 2A, in accordance with the present disclosure.
Figure 2C:
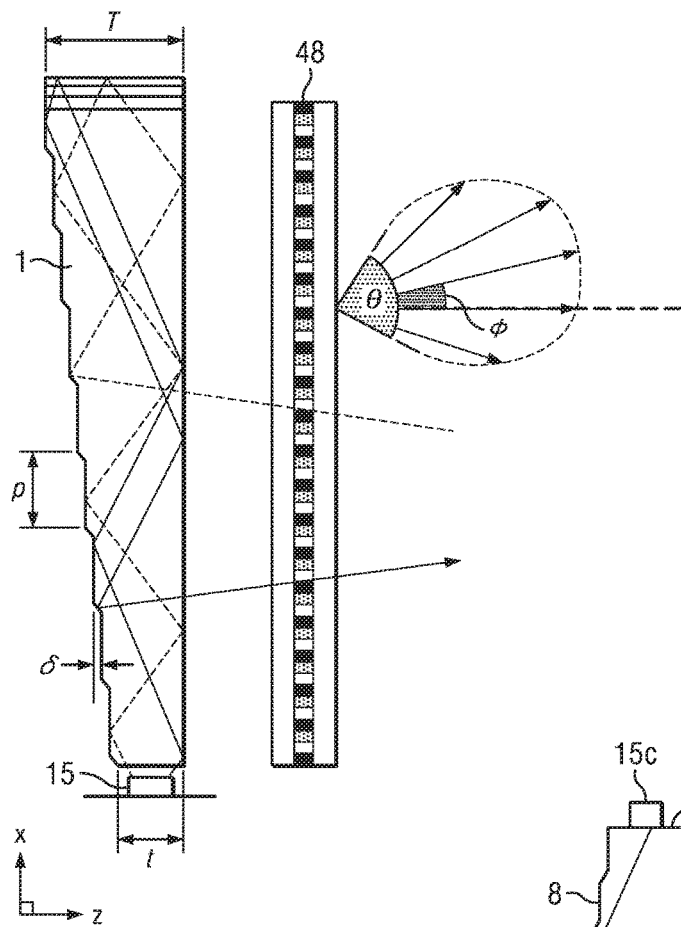
FIG. 2C is a schematic diagram illustrating light propagation in a side view of the directional display device of FIG. 2A, in accordance with the present disclosure.

Illuminating a spatial light modulator (SLM) 48 such as a fast liquid crystal display (LCD) panel with such a device may achieve autostereoscopic 3D as shown in top view or yz-plane viewed from the illuminator array 15 end in FIG. 2A, front view in FIG. 2B and side view in FIG. 2C. FIG. 2A is a schematic diagram illustrating in a top view, propagation of light in a directional display device, FIG. 2B is a schematic diagram illustrating in a front view, propagation of light in a directional display device, and FIG. 2C is a schematic diagram illustrating in side view propagation of light in a directional display device. As illustrated in FIGS. 2A, 2B, and 2C, a stepped waveguide 1 may be located behind a fast (e.g., greater than 100 Hz) LCD panel SLM 48 that displays sequential right and left eye images. In synchronization, specific illuminator elements 15a through 15n of illuminator array 15 (where n is an integer greater than one) may be selectively turned on and off, providing illuminating light that enters right and left eyes substantially independently by virtue of the system's directionality. In the simplest case, sets of illuminator elements of illuminator array 15 are turned on together, providing a one dimensional viewing window 26 or an optical pupil with limited width in the horizontal direction, but extended in the vertical direction, in which both eyes horizontally separated may view a left eye image, and another viewing window 44 in which a right eye image may primarily be viewed by both eyes, and a central position in which both the eyes may view different images. In this way, 3D may be viewed when the head of a viewer is approximately centrally aligned. Movement to the side away from the central position may result in the scene collapsing onto a 2D image.

The reflective end 4 may have positive optical power in the lateral direction across the waveguide 1. In other words, the reflective end may have positive optical power in a direction extending between sides of the waveguide that extend between the first and second guide surfaces and between the input end and the reflective end. The light extraction features 12 may have positive optical power in a direction between sides of the waveguide that extend between the first and second guide surfaces 6, 8 and between the input end 2 and the reflective end.

The waveguide 1 may further comprising a reflective end 4 for reflecting input light from the light sources back along the waveguide 1, the second guide surface 8 being arranged to deflect the reflected input light through the first guide surface 6 as output light, and the waveguide 1 being arranged to image the light sources 15a-n so that the output light from the light sources is directed into respective optical windows 26a-n in output directions that are distributed laterally in dependence on the input positions of the light sources.

In embodiments in which typically the reflective end 4 has positive optical power, the optical axis may be defined with reference to the shape of the reflective end 4, for example being a line that passes through the center of curvature of the reflective end 4 and coincides with the axis of reflective symmetry of the end 4 about the x-axis. In the case that the reflecting surface 4 is flat, the optical axis may be similarly defined with respect to other components having optical power, for example the light extraction features 12 if they are curved, or the Fresnel lens 62 described below. The optical axis 238 is typically coincident with the mechanical axis of the waveguide 1. In the present embodiments that typically comprise a substantially cylindrical reflecting surface at end 4, the optical axis 238 is a line that passes through the center of curvature of the surface at end 4 and coincides with the axis of reflective symmetry of the side 4 about the x-axis. The optical axis 238 is typically coincident with the mechanical axis of the waveguide 1. The cylindrical reflecting surface at end 4 may typically comprise a spherical profile to optimize performance for on-axis and off-axis viewing positions. Other profiles may be used.

Figure 3:
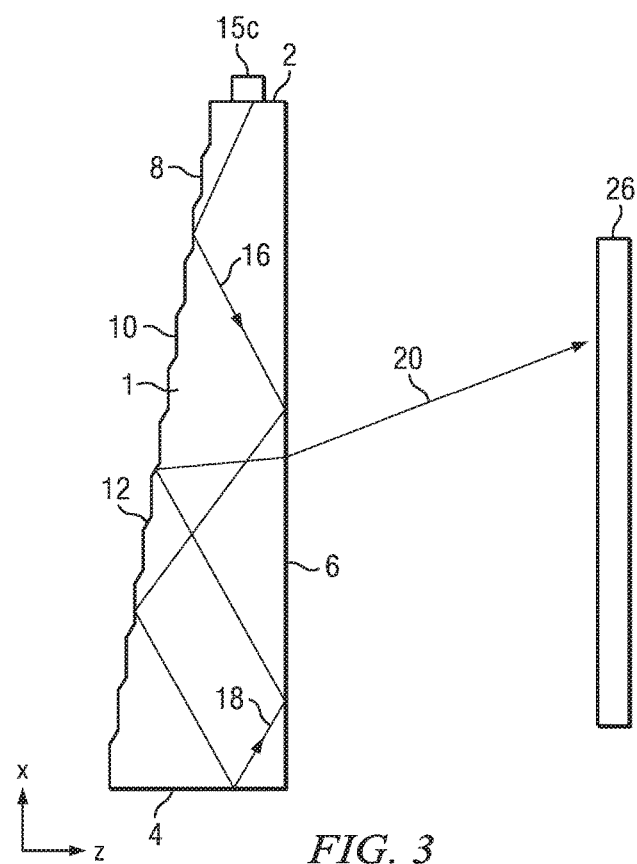
FIG. 3 is a schematic diagram illustrating in a side view of a directional display device, in accordance with the present disclosure.

FIG. 3 is a schematic diagram illustrating in side view a directional display device. Further, FIG. 3 illustrates additional detail of a side view of the operation of a stepped waveguide 1, which may be a transparent material. The stepped waveguide 1 may include an illuminator input side 2, a reflective side 4, a first light directing side 6 which may be substantially planar, and a second light directing side 8 which includes guiding features 10 and light extraction features 12. In operation, light rays 16 from an illuminator element 15c of an illuminator array 15 (not shown in FIG. 3), that may be an addressable array of LEDs for example, may be guided in the stepped waveguide 1 by means of total internal reflection by the first light directing side 6 and total internal reflection by the guiding feature 10, to the reflective side 4, which may be a mirrored surface. Although reflective side 4 may be a mirrored surface and may reflect light, it may in some embodiments also be possible for light to pass through reflective side 4.

Continuing the discussion of FIG. 3, light ray 18 reflected by the reflective side 4 may be further guided in the stepped waveguide 1 by total internal reflection at the reflective side 4 and may be reflected by extraction features 12. Light rays 18 that are incident on extraction features 12 may be substantially deflected away from guiding modes of the stepped waveguide 1 and may be directed, as shown by ray 20, through the side 6 to an optical pupil that may form a viewing window 26 of an autostereoscopic display. The width of the viewing window 26 may be determined by at least the size of the illuminator, output design distance and optical power in the side 4 and extraction features 12. The height of the viewing window may be primarily determined by the reflection cone angle of the extraction features 12 and the illumination cone angle input at the input side 2. Thus each viewing window 26 represents a range of separate output directions with respect to the surface normal direction of the spatial light modulator 48 that intersect with a plane at the nominal viewing distance.

Figure 4A:
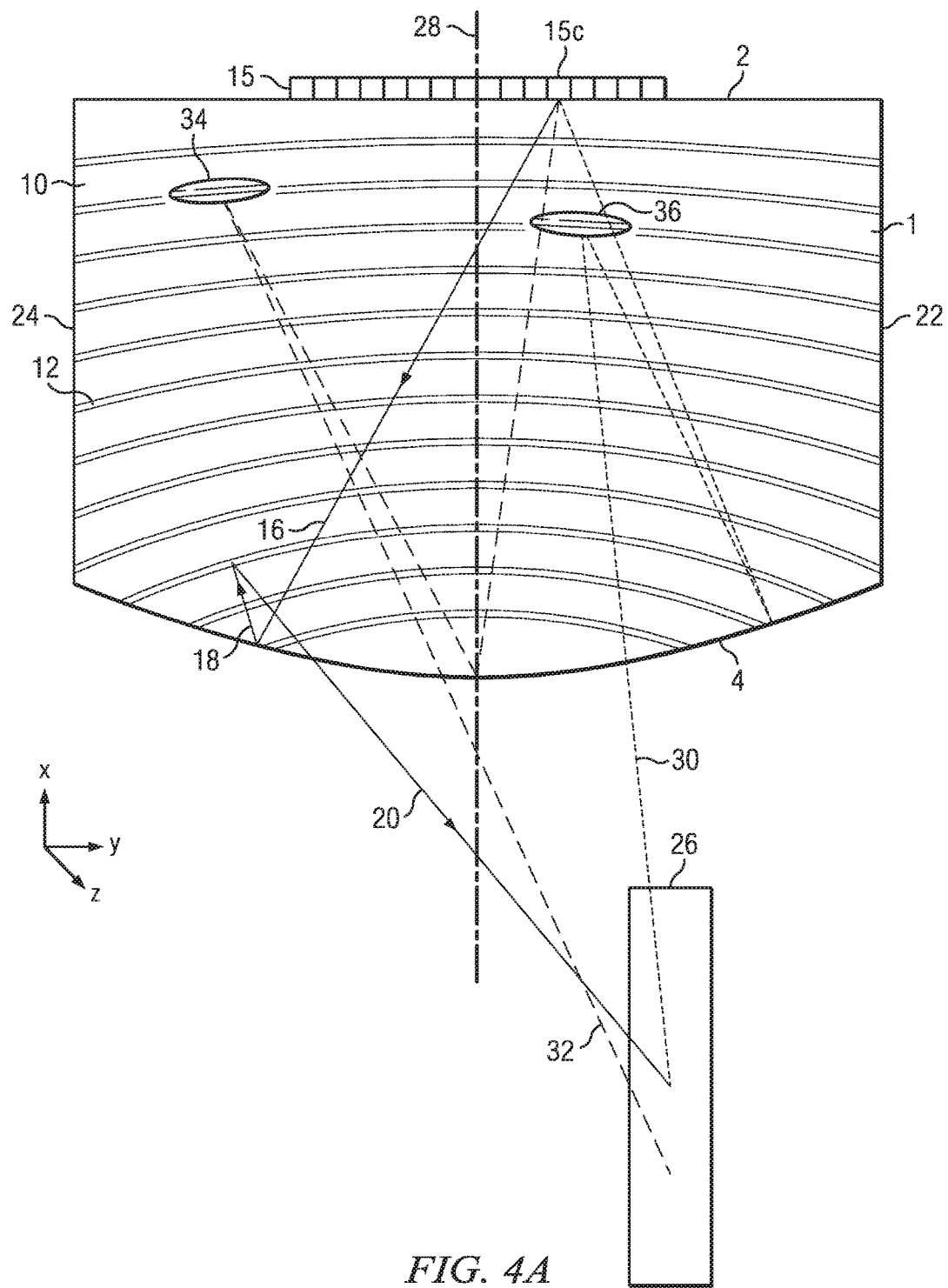
FIG. 4A is schematic diagram illustrating in a front view, generation of a viewing window in a directional display device including curved light extraction features, in accordance with the present disclosure.

FIG. 4A is a schematic diagram illustrating in front view a directional display device which may be illuminated by a first illuminator element and including curved light extraction features. Further, FIG. 4A shows in front view further guiding of light rays from illuminator element 15c of illuminator array 15, in the stepped waveguide 1. Each of the output rays are directed towards the same viewing window 26 from the respective illuminator 14. Thus light ray 30 may intersect the ray 20 in the window 26, or may have a different height in the window as shown by ray 32. Additionally, in various embodiments, sides 22, 24 of the waveguide 1 may be transparent, mirrored, or blackened surfaces. Continuing the discussion of FIG. 4A, light extraction features 12 may be elongate, and the orientation of light extraction features 12 in a first region 34 of the light directing side 8 (light directing side 8 shown in FIG. 3, but not shown in FIG. 4A) may be different to the orientation of light extraction features 12 in a second region 36 of the light directing side 8.

Figure 4B:
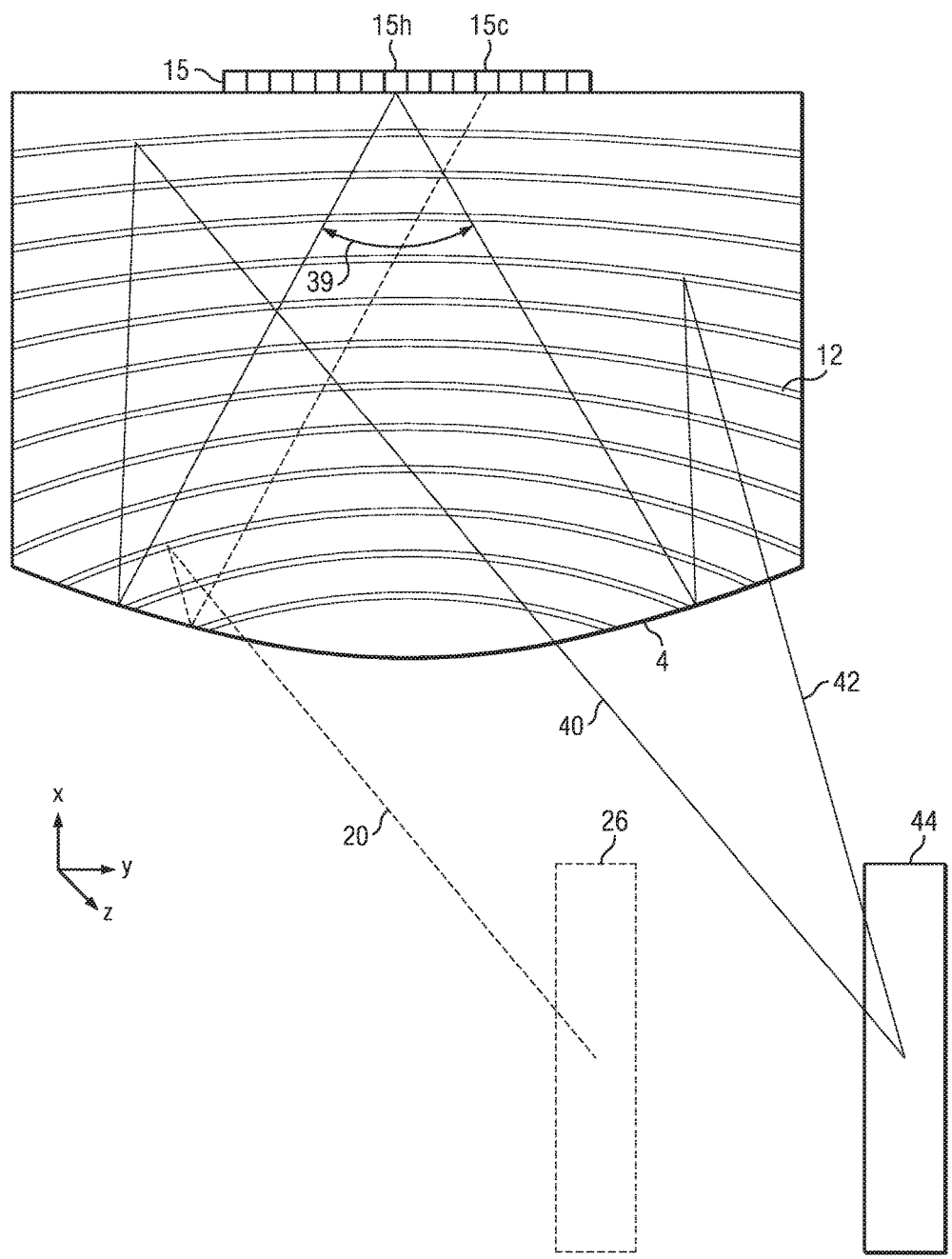
FIG. 4B is a schematic diagram illustrating in a front view, generation of a first and a second viewing window in a directional display device including curved light extraction features, in accordance with the present disclosure.

FIG. 4B is a schematic diagram illustrating in front view an optical valve which may illuminated by a second illuminator element. Further, FIG. 4B shows the light rays 40, 42 from a second illuminator element 15h of the illuminator array 15. The curvature of the reflective end on the side 4 and the light extraction features 12 cooperatively produce a second viewing window 44 laterally separated from the viewing window 26 with light rays from the illuminator element 15h.

Advantageously, the arrangement illustrated in FIG. 4B may provide a real image of the illuminator element 15c at a viewing window 26 in which the real image may be formed by cooperation of optical power in reflective side 4 and optical power which may arise from different orientations of elongate light extraction features 12 between regions 34 and 36, as shown in FIG. 4A. The arrangement of FIG. 4B may achieve improved aberrations of the imaging of illuminator element 15c to lateral positions in viewing window 26. Improved aberrations may achieve an extended viewing freedom for an autostereoscopic display while achieving low cross talk levels.

Figure 5:
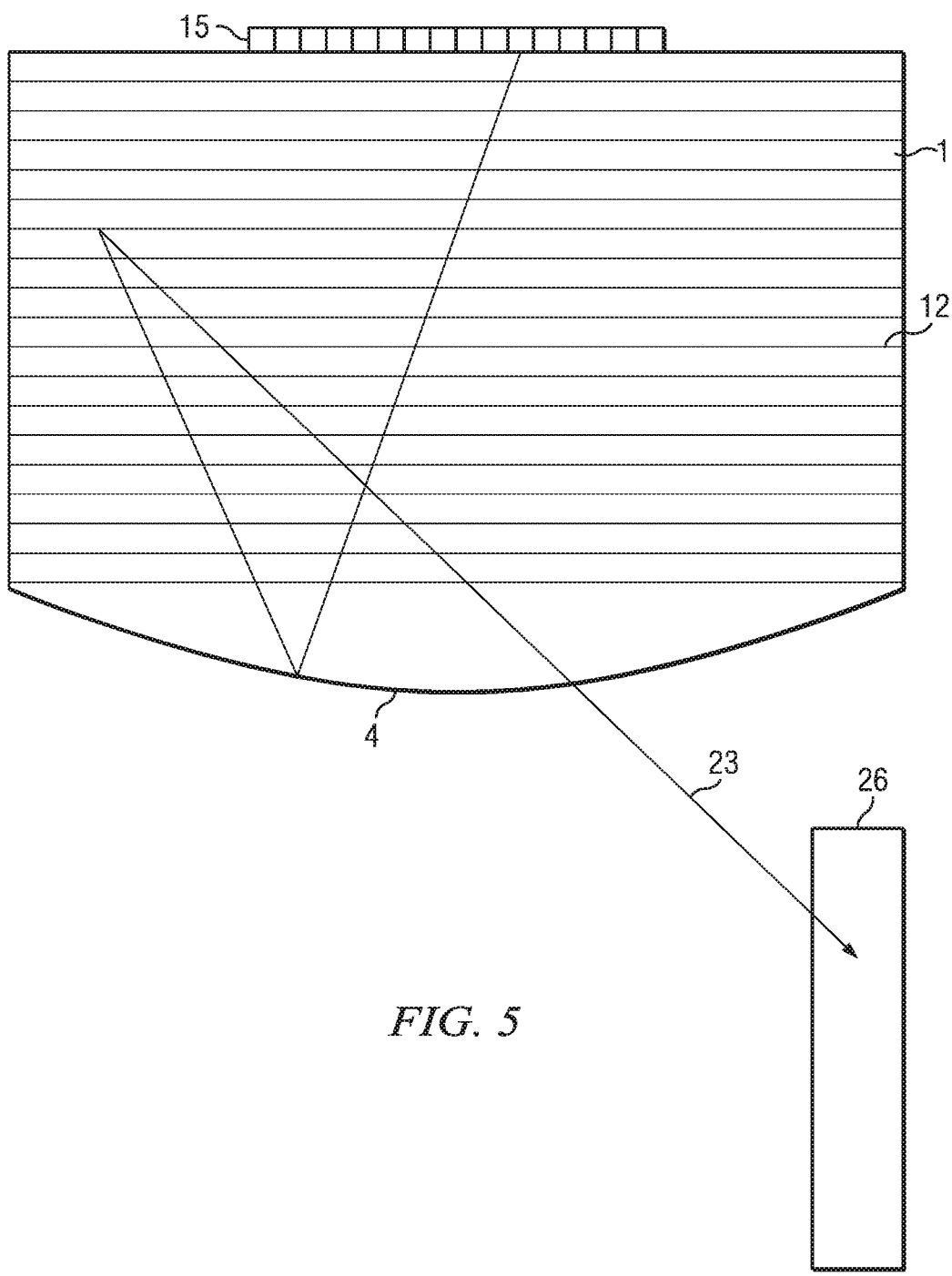
FIG. 5 is a schematic diagram illustrating generation of a first viewing window in a directional display device including linear light extraction features, in accordance with the present disclosure.

FIG. 5 is a schematic diagram illustrating in front view an embodiment of a directional display device having substantially linear light extraction features. Further, FIG. 5 shows a similar arrangement of components to FIG. 1 (with corresponding elements being similar), with one of the differences being that the light extraction features 12 are substantially linear and parallel to each other. Advantageously, such an arrangement may provide substantially uniform illumination across a display surface and may be more convenient to manufacture than the curved extraction features of FIG. 4A and FIG. 4B.

Figure 6A:
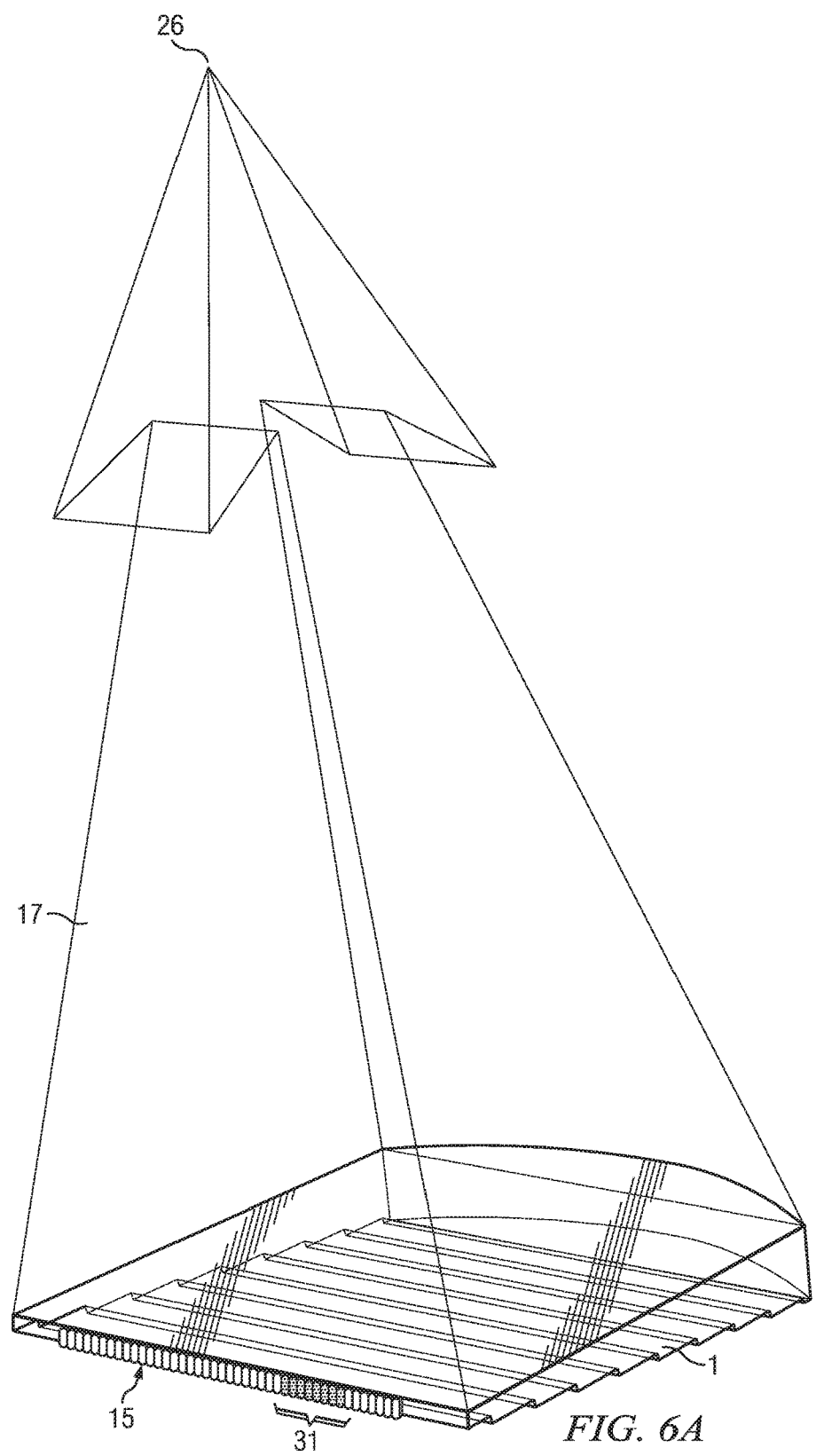
FIG. 6A is a schematic diagram illustrating one embodiment of the generation of a first viewing window in a time multiplexed directional display device in a first time slot, in accordance with the present disclosure.
Figure 6B:
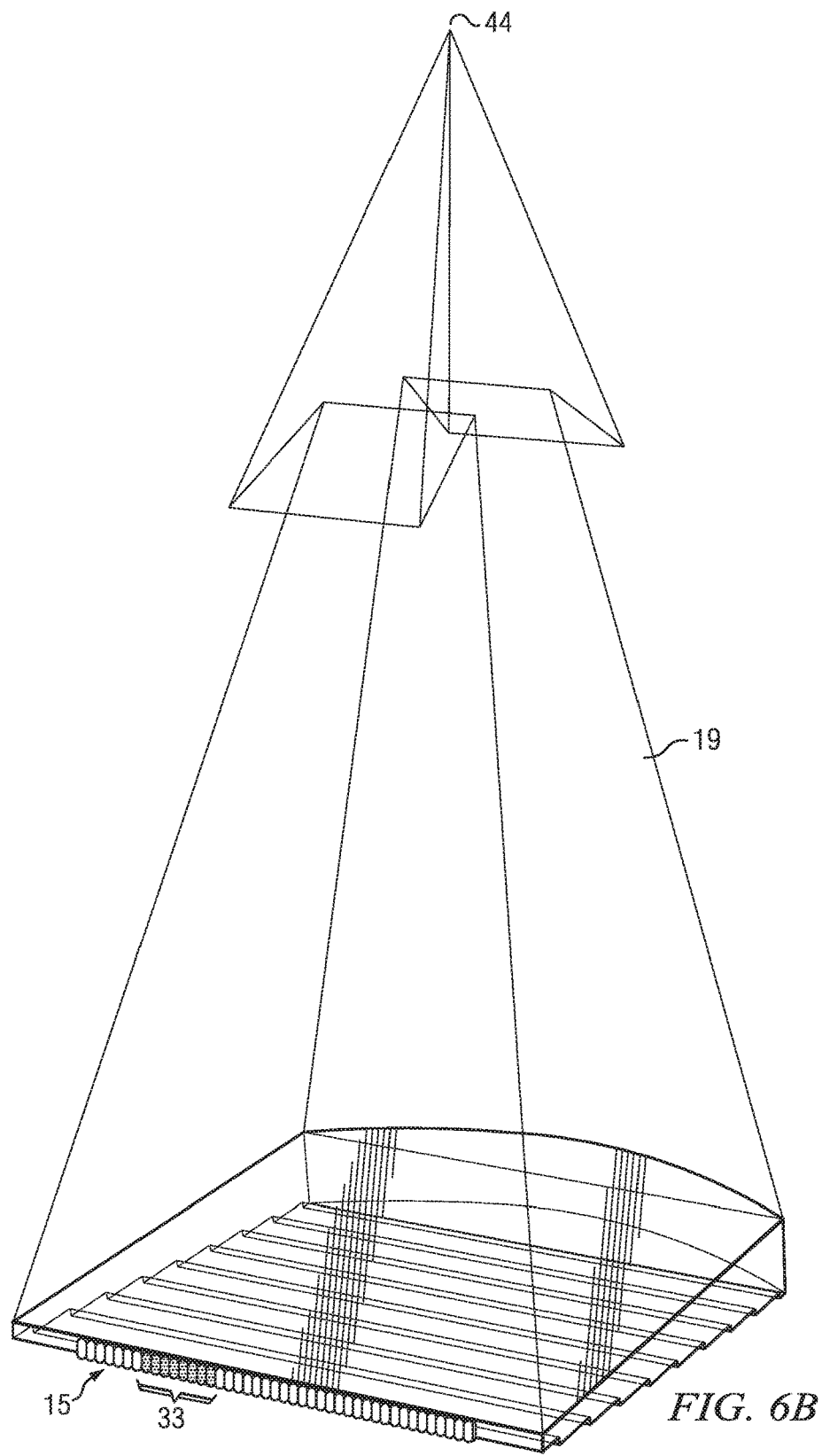
FIG. 6B is a schematic diagram illustrating another embodiment of the generation of a second viewing window in a time multiplexed directional display device in a second time slot, in accordance with the present disclosure.
Figure 6C:
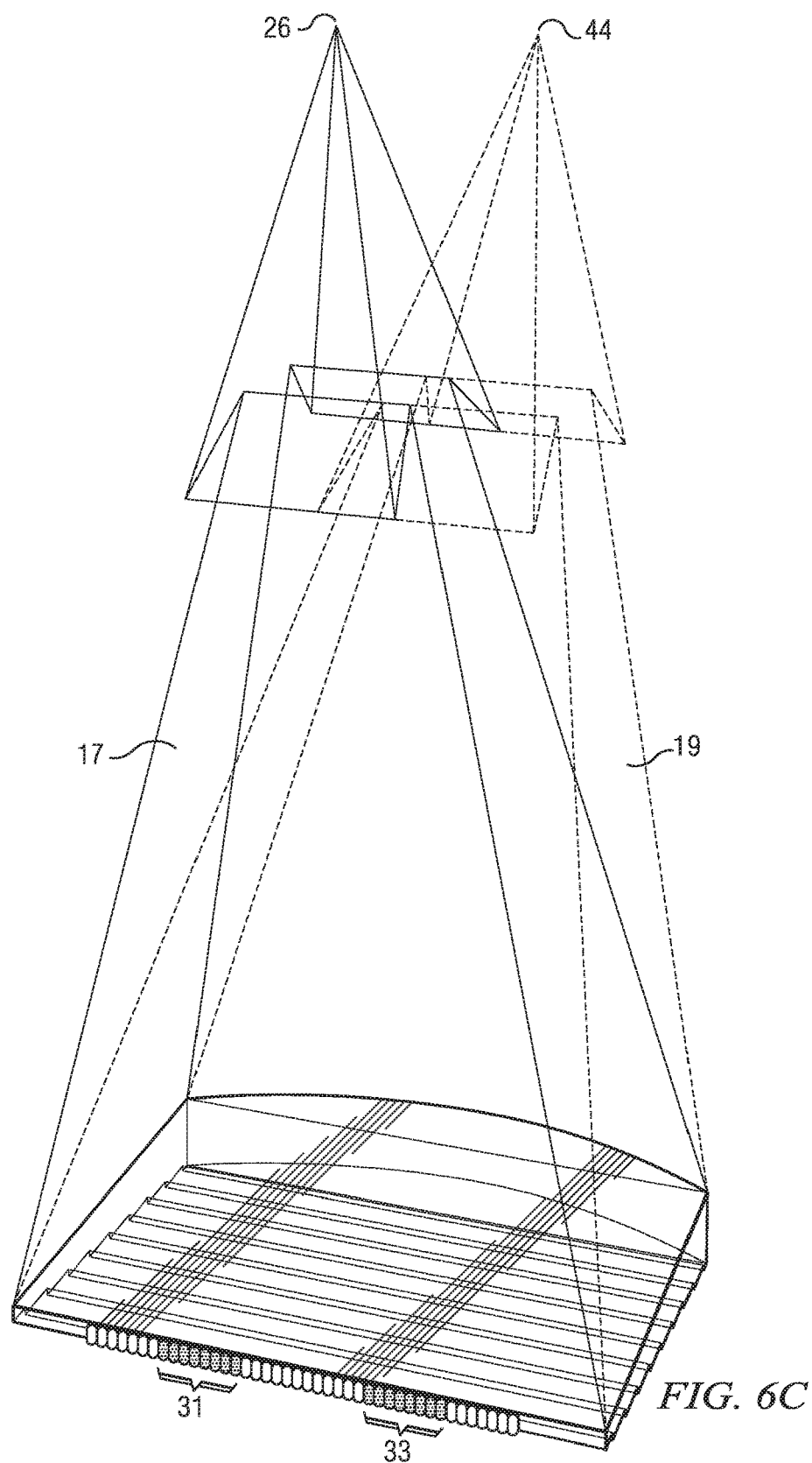
FIG. 6C is a schematic diagram illustrating another embodiment of the generation of a first and a second viewing window in a time multiplexed directional display device, in accordance with the present disclosure.

FIG. 6A is a schematic diagram illustrating one embodiment of the generation of a first viewing window in a time multiplexed imaging directional display device in a first time slot, FIG. 6B is a schematic diagram illustrating another embodiment of the generation of a second viewing window in a time multiplexed imaging directional backlight apparatus in a second time slot, and FIG. 6C is a schematic diagram illustrating another embodiment of the generation of a first and a second viewing window in a time multiplexed imaging directional display device. Further, FIG. 6A shows schematically the generation of illumination window 26 from stepped waveguide 1. Illuminator element group 31 in illuminator array 15 may provide a light cone 17 directed towards a viewing window 26. FIG. 6B shows schematically the generation of illumination window 44. Illuminator element group 33 in illuminator array 15 may provide a light cone 19 directed towards viewing window 44. In cooperation with a time multiplexed display, windows 26 and 44 may be provided in sequence as shown in FIG. 6C. If the image on a spatial light modulator 48 (not shown in FIGS. 6A, 6B, 6C) is adjusted in correspondence with the light direction output, then an autostereoscopic image may be achieved for a suitably placed viewer. Similar operation can be achieved with all the directional backlights described herein. Note that illuminator element groups 31, 33 each include one or more illumination elements from illumination elements 15a to 15n, where n is an integer greater than one.

Figure 7:
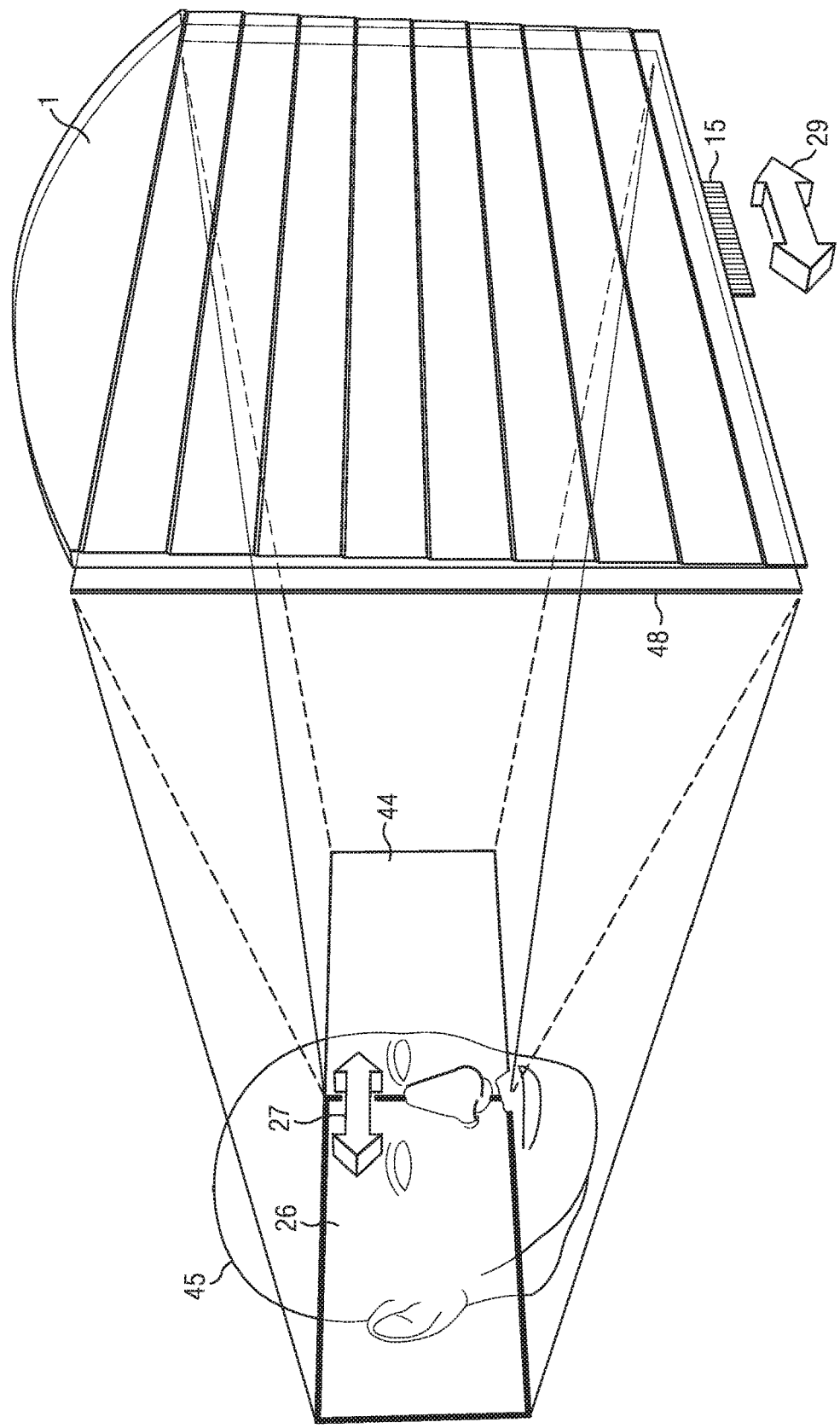
FIG. 7 is a schematic diagram illustrating an observer tracking autostereoscopic directional display device, in accordance with the present disclosure.

FIG. 7 is a schematic diagram illustrating one embodiment of an observer tracking autostereoscopic directional display device. As shown in FIG. 7, selectively turning on and off illuminator elements 15a to 15n along axis 29 provides for directional control of viewing windows. The head 45 position may be monitored with a camera, motion sensor, motion detector, or any other appropriate optical, mechanical or electrical means, and the appropriate illuminator elements of illuminator array 15 may be turned on and off to provide substantially independent images to each eye irrespective of the head 45 position. The head tracking system (or a second head tracking system) may provide monitoring of more than one head 45, 47 (head 47 not shown in FIG. 7) and may supply the same left and right eye images to each viewers' left and right eyes providing 3D to all viewers. Again similar operation can be achieved with all the directional backlights described herein.

Figure 8:
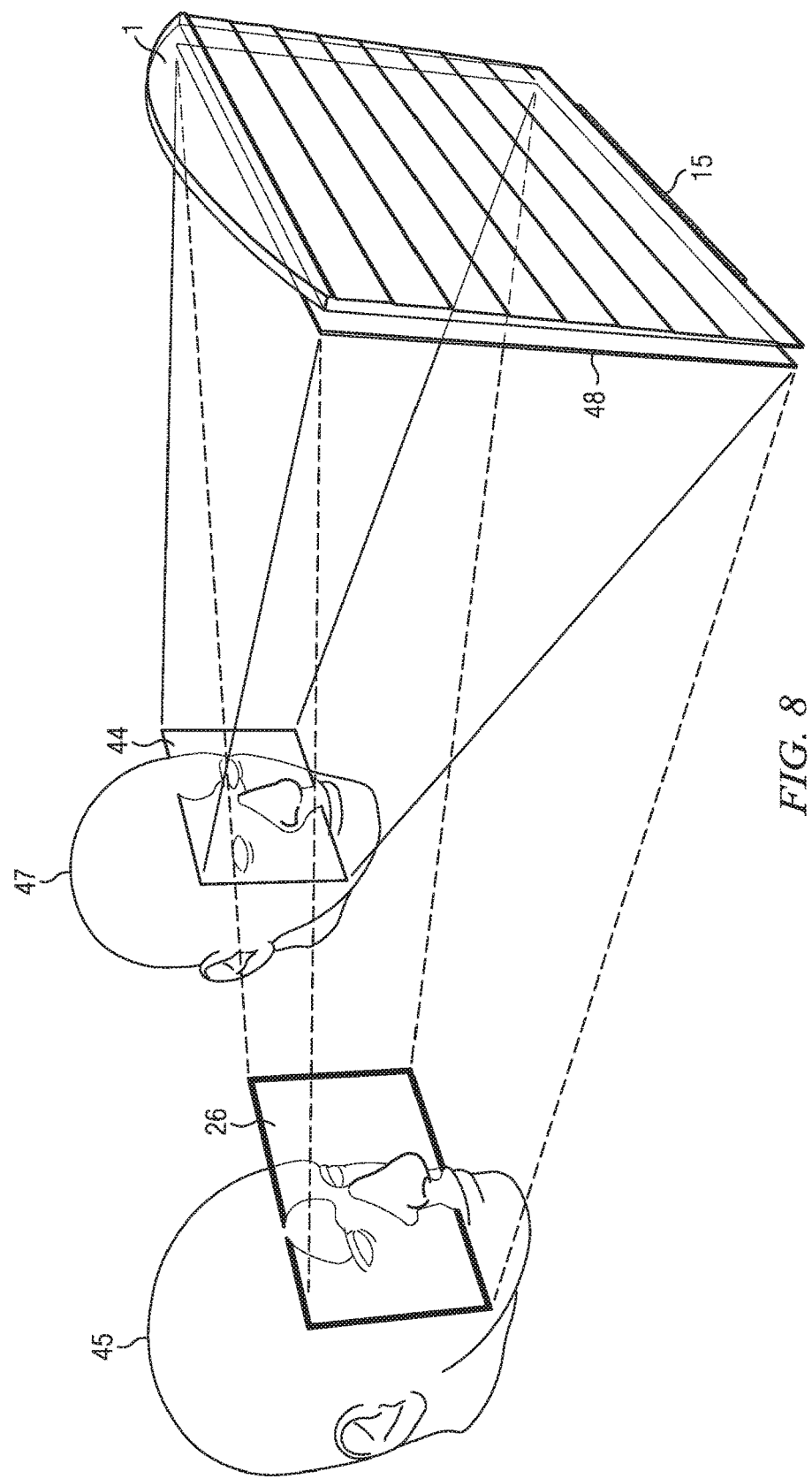
FIG. 8 is a schematic diagram illustrating a multi-viewer directional display device, in accordance with the present disclosure.

FIG. 8 is a schematic diagram illustrating one embodiment of a multi-viewer directional display device as an example including an imaging directional backlight. As shown in FIG. 8, at least two 2D images may be directed towards a pair of viewers 45, 47 so that each viewer may watch a different image on the spatial light modulator 48. The two 2D images of FIG. 8 may be generated in a similar manner as described with respect to FIG. 7 in that the two images would be displayed in sequence and in synchronization with sources whose light is directed toward the two viewers. One image is presented on the spatial light modulator 48 in a first phase, and a second image is presented on the spatial light modulator 48 in a second phase different from the first phase. In correspondence with the first and second phases, the output illumination is adjusted to provide first and second viewing windows 26, 44 respectively. An observer with both eyes in window 26 will perceive a first image while an observer with both eyes in window 44 will perceive a second image.

Figure 9:
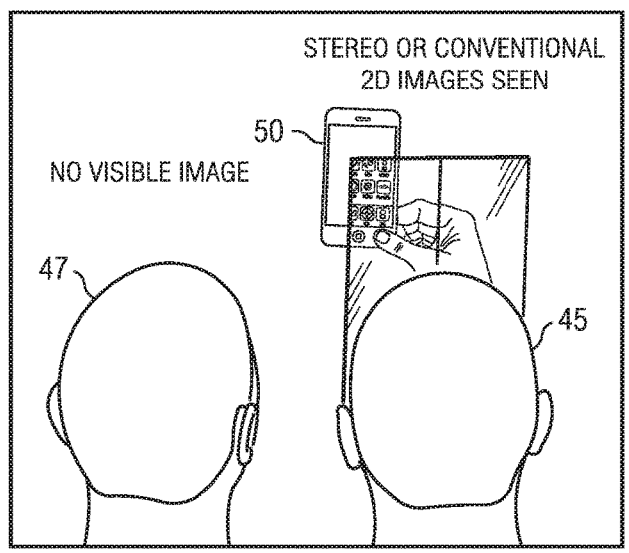
FIG. 9 is a schematic diagram illustrating a privacy directional display device, in accordance with the present disclosure.

FIG. 9 is a schematic diagram illustrating a privacy directional display device which includes an imaging directional backlight. 2D display systems may also utilize directional backlighting for security and efficiency purposes in which light may be primarily directed at the eyes of a first viewer 45 as shown in FIG. 9. Further, as illustrated in FIG. 9, although first viewer 45 may be able to view an image on device 50, light is not directed towards second viewer 47. Thus second viewer 47 is prevented from viewing an image on device 50. Each of the embodiments of the present disclosure may advantageously provide autostereoscopic, dual image or privacy display functions.

Figure 10:
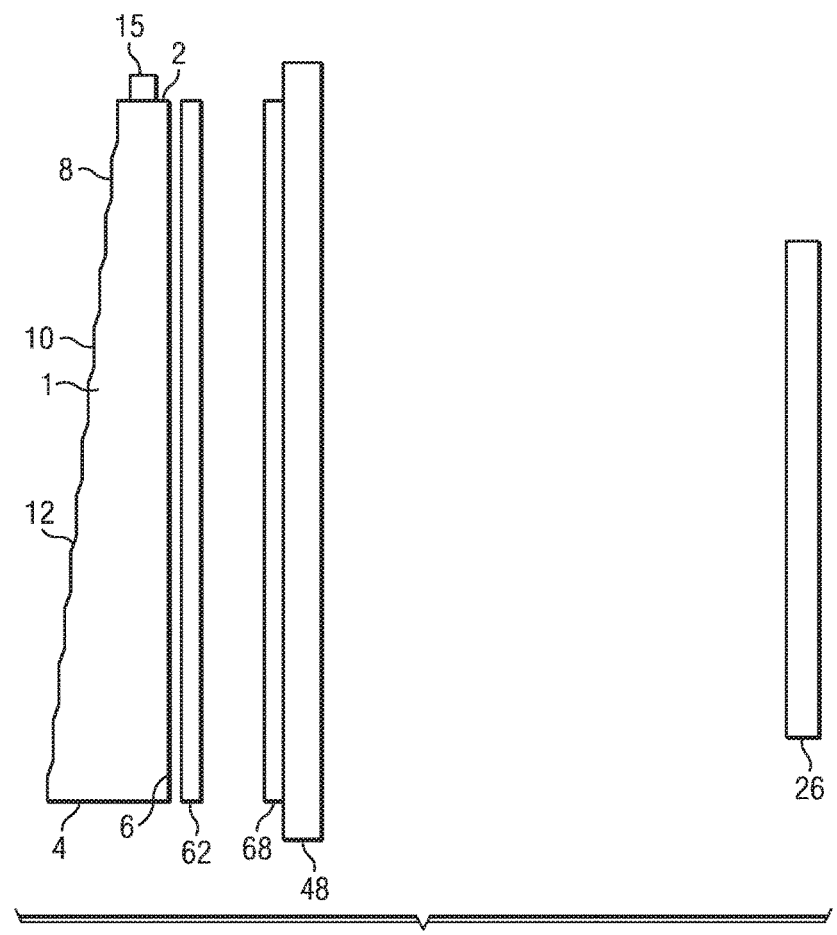
FIG. 10 is a schematic diagram illustrating in side view, the structure of a time multiplexed directional display device, in accordance with the present disclosure.

FIG. 10 is a schematic diagram illustrating in side view the structure of a time multiplexed directional display device as an example including an imaging directional backlight. Further, FIG. 10 shows in side view an autostereoscopic directional display device, which may include the stepped waveguide 1 and a Fresnel lens 62 arranged to provide the viewing window 26 in a window plane 106 at a nominal viewing distance from the spatial light modulator for a substantially collimated output across the stepped waveguide 1 output surface. A vertical diffuser 68 may be arranged to extend the height of the window 26 further. The light may then be imaged through the spatial light modulator 48. The illuminator array 15 may include light emitting diodes (LEDs) that may, for example, be phosphor converted blue LEDs, or may be separate RGB LEDs. Alternatively, the illuminator elements in illuminator array 15 may include a uniform light source and spatial light modulator arranged to provide separate illumination regions. Alternatively the illuminator elements may include laser light source(s). The laser output may be directed onto a diffuser by means of scanning, for example, using a galvo or MEMS scanner. In one example, laser light may thus be used to provide the appropriate illuminator elements in illuminator array 15 to provide a substantially uniform light source with the appropriate output angle, and further to provide reduction in speckle. Alternatively, the illuminator array 15 may be an array of laser light emitting elements. Additionally in one example, the diffuser may be a wavelength converting phosphor, so that illumination may be at a different wavelength to the visible output light.

A further wedge type directional backlight is generally discussed by U.S. Pat. No. 7,660,047 which is herein incorporated by reference in its entirety. The wedge type directional backlight and optical valve further process light beams in different ways. In the wedge type waveguide, light input at an appropriate angle will output at a defined position on a major surface, but light rays will exit at substantially the same angle and substantially parallel to the major surface. By comparison, light input to a stepped waveguide of an optical valve at a certain angle may output from points across the first side, with output angle determined by input angle. Advantageously, the stepped waveguide of the optical valve may not require further light re-direction films to extract light towards an observer and angular non-uniformities of input may not provide non-uniformities across the display surface.

There will now be described some waveguides, directional backlights and directional display devices that are based on and incorporate the structures of FIGS. 1 to 10 above. Except for the modifications and/or additional features which will now be described, the above description applies equally to the following waveguides, directional backlights and display devices, but for brevity will not be repeated. The waveguides described below may be incorporated into a directional backlight or a directional display device as described above. Similarly, the directional backlights described below may be incorporated into a directional display device as described above.

Figure 11:
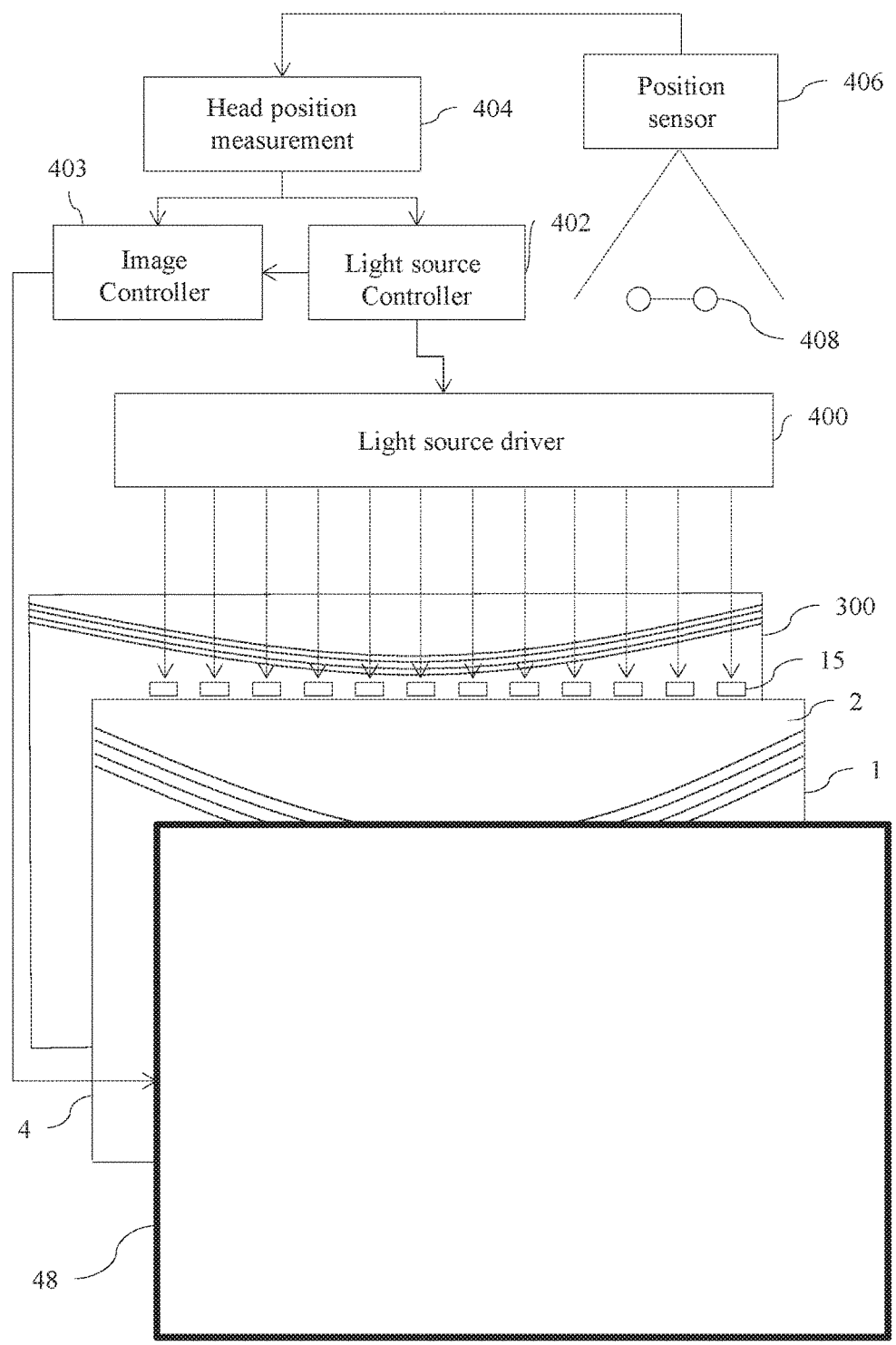
FIG. 11 is a schematic diagram illustrating a directional display apparatus comprising a directional display device and a control system, in accordance with the present disclosure.

FIG. 11 is a schematic diagram illustrating a directional display apparatus comprising a directional display device and a control system. The arrangement and operation of the control system will now be described and may be applied, with changes as necessary, to each of the display devices disclosed herein. The directional backlight comprises a waveguide 1 and an array 15 of illumination elements 15*a*-15*n* arranged as described above. The control system is arranged to selectively operate the illumination elements 15*a*-15*n* to direct light into selectable viewing windows.

The reflective end 4 converges the reflected light. Fresnel lens 62 may be arranged to cooperate with reflective end 4 to achieve viewing windows at a viewing plane. Transmissive spatial light modulator 48 may be arranged to receive the light from the directional backlight. The image displayed on the SLM 48 may be presented in synchronization with the illumination of the light sources of the array 15.

The control system may comprise a sensor system arranged to detect the position of the observer 99 relative to the display device 100. The sensor system comprises a position sensor 406, such as a camera arranged to determine the position of an observer 408; and a head position measurement system 404 that may for example comprise a computer vision image processing system. The position sensor 406 may comprise known sensors including those comprising cameras and image processing units arranged to detect the position of observer faces. Position sensor 406 may further comprise a stereo sensor arranged to improve the measure of longitudinal position compared to a monoscopic camera. Alternatively position sensor 406 may comprise measurement of eye spacing to give a measure of required placement of respective arrays of viewing windows from tiles of the directional display.

The control system may further comprise an illumination controller and an image controller 403 that are both supplied with the detected position of the observer supplied from the head position measurement system 404.

The illumination controller comprises an LED controller 402 arranged to determine which light sources of array 15 should be switched to direct light to respective eyes of observer 408 in cooperation with waveguide 1; and an LED driver 400 arranged to control the operation of light sources of light source array 15 by means of drive lines 407. The illumination controller 74 selects the illuminator elements 15 to be operated in dependence on the position of the observer detected by the head position measurement system 72, so that the viewing windows 26 into which light is directed are in positions corresponding to the left and right eyes of the observer 99. In this manner, the lateral output directionality of the waveguide 1 corresponds with the observer position.

The image controller 403 is arranged to control the SLM 48 to display images. To provide an autostereoscopic display, the image controller 403 and the illumination controller may operate as follows. The image controller 403 controls the SLM 48 to display temporally multiplexed left and right eye images and the LED controller 402 operates the light sources 15 to direct light into viewing windows in positions corresponding to the left and right eyes of an observer synchronously with the display of left and right eye images. In this manner, an autostereoscopic effect is achieved using a time division multiplexing technique. In one example, a single viewing window may be illuminated by operation of light source 409 (which may comprise one or more LEDs) by means of drive line 410 wherein other drive lines are not driven as described elsewhere.

The head position measurement system 404 detects the position of an observer relative to the display device 100. The LED controller 402 selects the light sources 15 to be operated in dependence on the position of the observer detected by the head position measurement system 404, so that the viewing windows into which light is directed are in positions corresponding to the left and right eyes of the observer. In this manner, the output directionality of the waveguide 1 may be achieved to correspond with the viewer position so that a first image may be directed to the observer's right eye in a first phase and directed to the observer's left eye in a second phase.

Thus a directional display apparatus may comprise a directional display device and a control system arranged to control the light sources 15*a-n*.

Figure 12A:
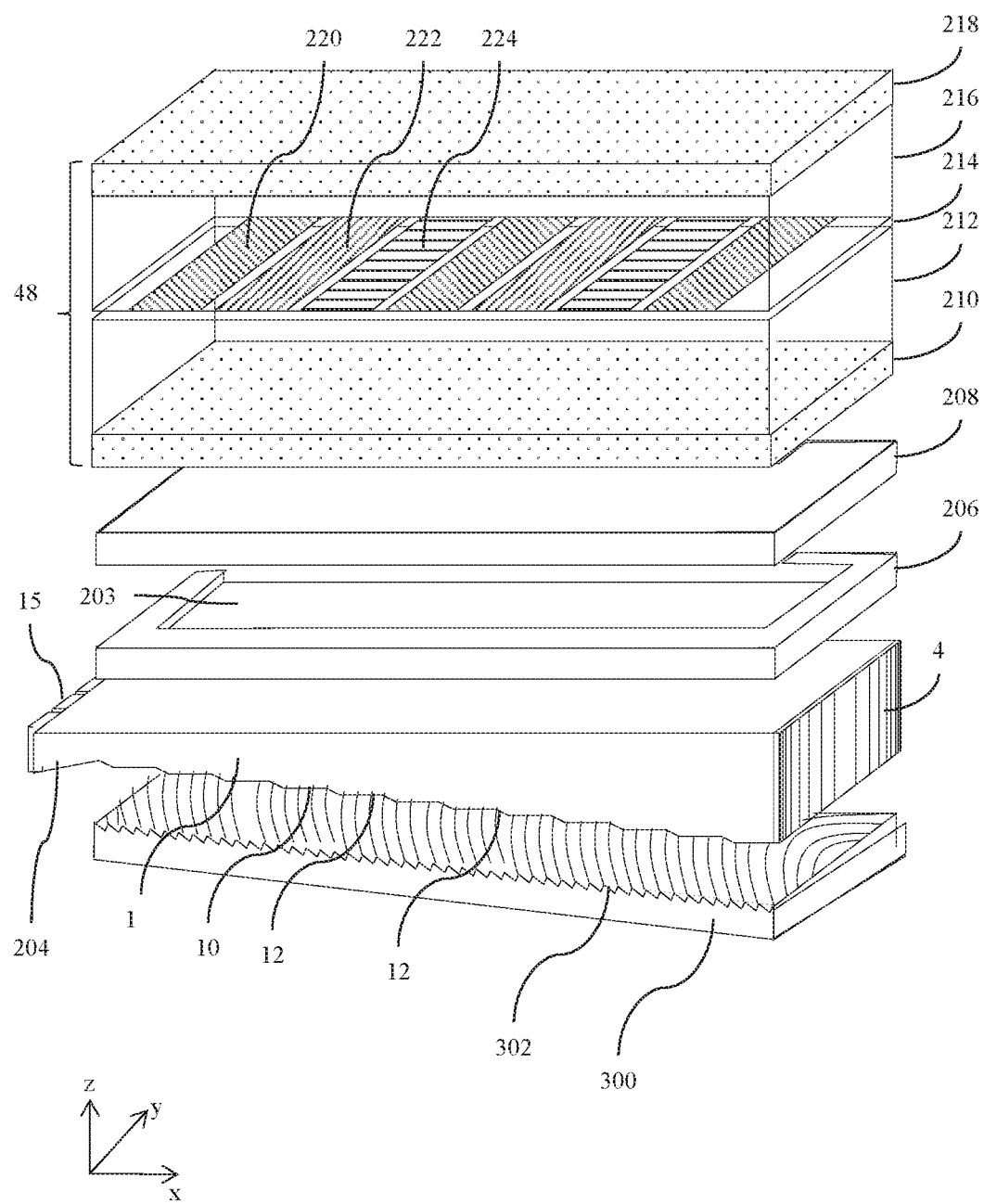
FIG. 12A is a schematic diagram illustrating a perspective view of a directional display apparatus optical stack comprising a directional waveguide with light input at a side that is opposite a reflective side, in accordance with the present disclosure.

FIG. 12A is a schematic diagram illustrating a perspective view of a directional display apparatus optical stack comprising a directional waveguide with light input at a side that is opposite a reflective side.

Reflective end 4 may be provided by a Fresnel mirror. Further taper region 204 may be arranged at the input to the waveguide 1 to increase input coupling efficiency from the light sources 15*a*-15*n* of the array of illuminator elements 15 and to increase illumination uniformity. Shading layer 206 with aperture 203 may be arranged to hide light scattering regions at the edge of the waveguide 1. Rear reflector 300 may comprise facets 302 that are curved and arranged to provide viewing windows from groups of optical windows provided by imaging light sources of the array 15 to the window plane. An optical stack 208 may comprise reflective polarizers, retarder layers and diffusers. Rear reflectors 300 and optical stack 208 are described further in U.S. Patent Publ. No. 2014-0240828, filed Feb. 21, 2014, entitled "Directional backlight" incorporated herein by reference in its entirety.

Spatial light modulator 48 may comprise a liquid crystal display that may comprise an input polarizer 210, TFT glass substrate 212, liquid crystal layer 214, color filter glass substrate 216 and output polarizer 218. Red pixels 220, green pixels 222 and blue pixels 224 may be arranged in an array at the liquid crystal layer 214. White, yellow, additional green or other color pixels (not shown) may be further arranged in the liquid crystal layer to increase transmission efficiency, color gamut or perceived image resolution.

Figure 12B:
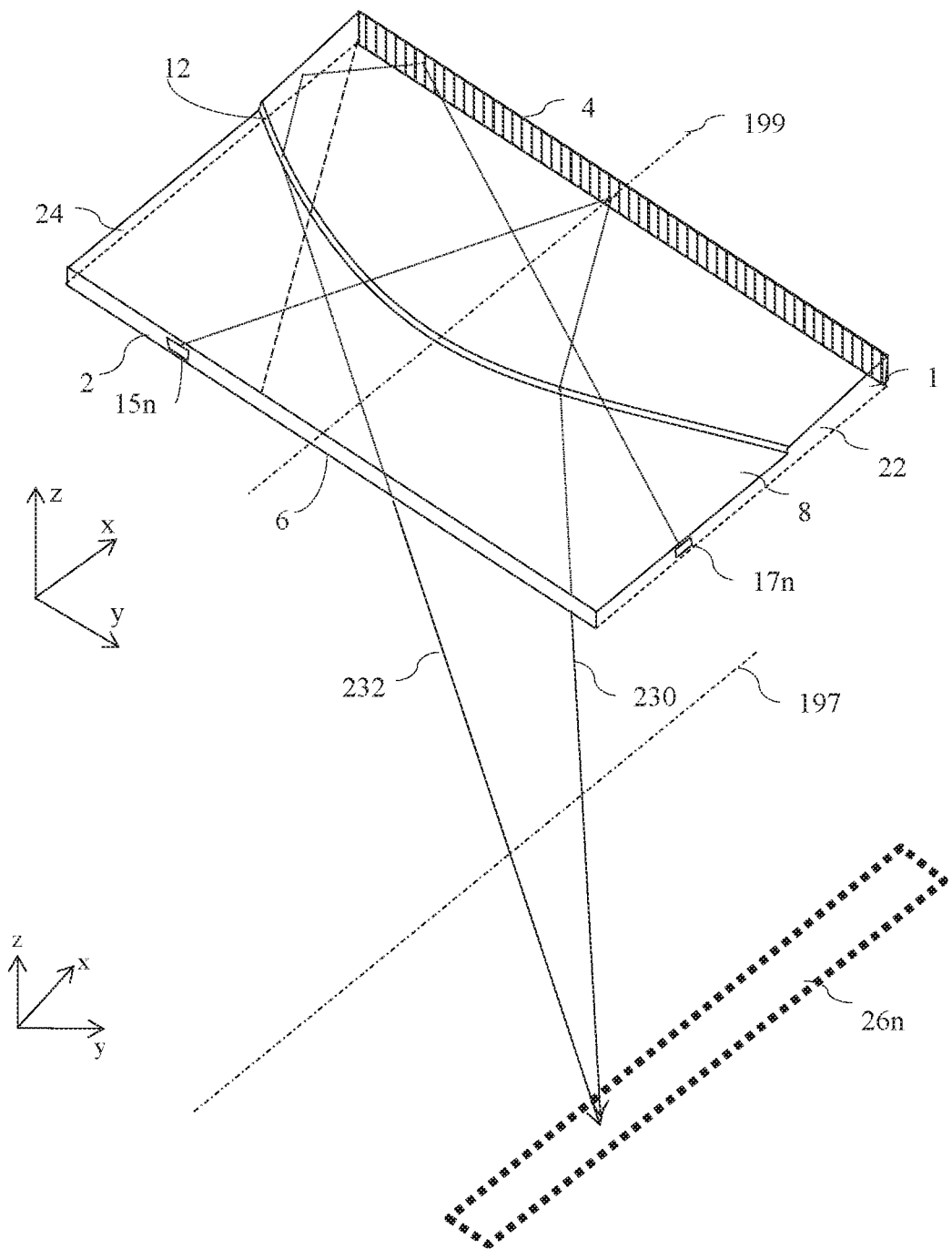
FIG. 12B is a schematic diagram illustrating a perspective view of the formation of optical windows by a directional display apparatus comprising a directional waveguide with light input at a side that is opposite a reflective side, in accordance with the present disclosure.

FIG. 12B is a schematic diagram illustrating a perspective view of the formation of optical windows by a directional display apparatus comprising a directional waveguide with light input at a side that is opposite a reflective side. The input surface 2 may thus be an end of the waveguide 1 may be opposite to the reflective end.

Figure 12C:
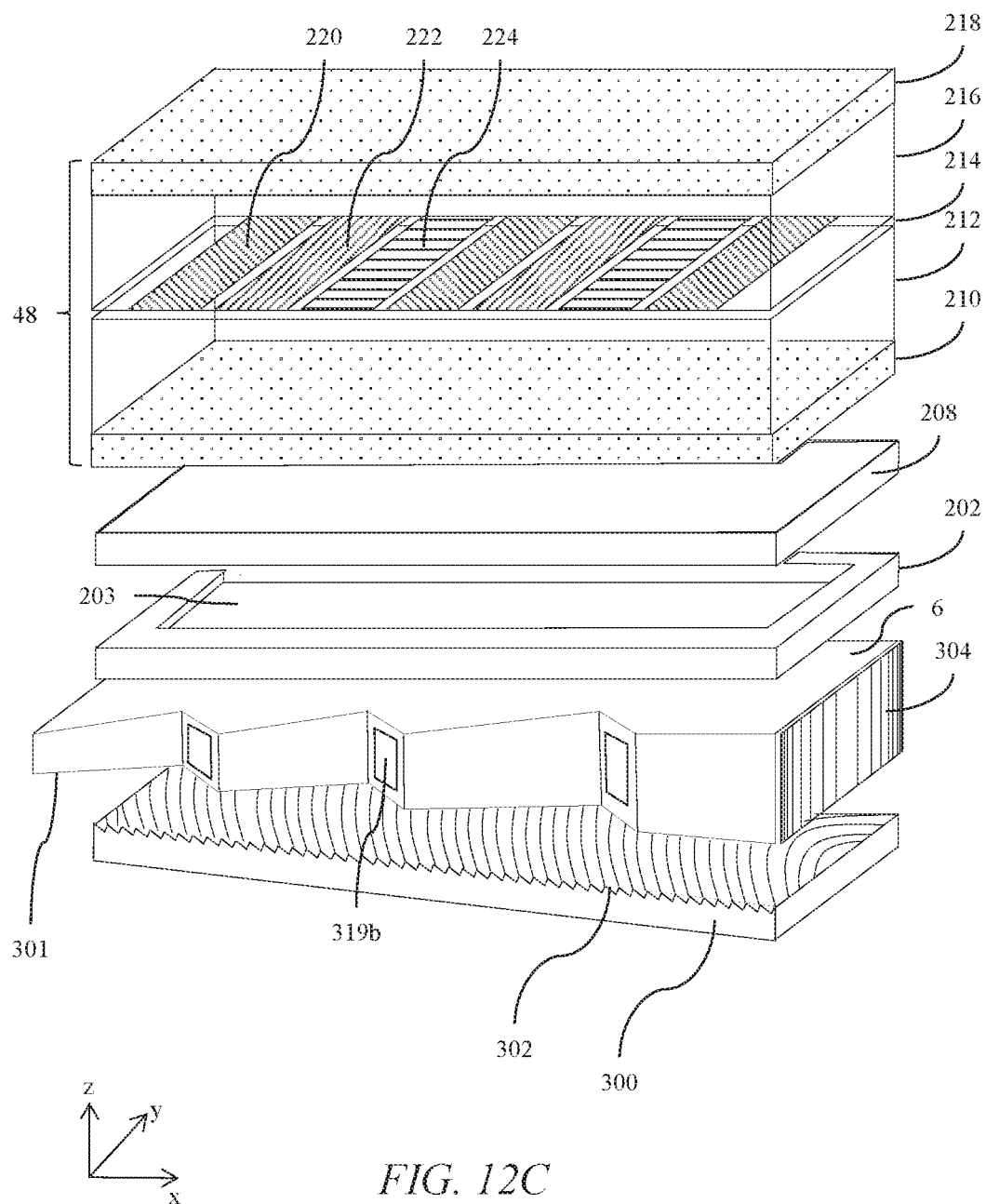
FIG. 12C is a schematic diagram illustrating a perspective view of a directional display apparatus optical stack comprising a directional waveguide with light input at a side that is adjacent a reflective side, in accordance with the present disclosure.

FIG. 12C is a schematic diagram illustrating a perspective view of a directional display apparatus optical stack comprising a directional waveguide with light input at a side that is adjacent a reflective side as described elsewhere in U.S. Patent Publ. No. 2016-0349444, entitled "Wide angle imaging directional backlights," filed May 26, 2016 and incorporated by reference herein in its entirety. Waveguide 301 comprises input sides 322, 324 with aligned light sources 317a-n and 319a-n on respective sides. End 302 opposite reflective end 304 may be arranged to be absorbing or reflective to provide low levels of cross talk or increased efficiency respectively.

Figure 12D:
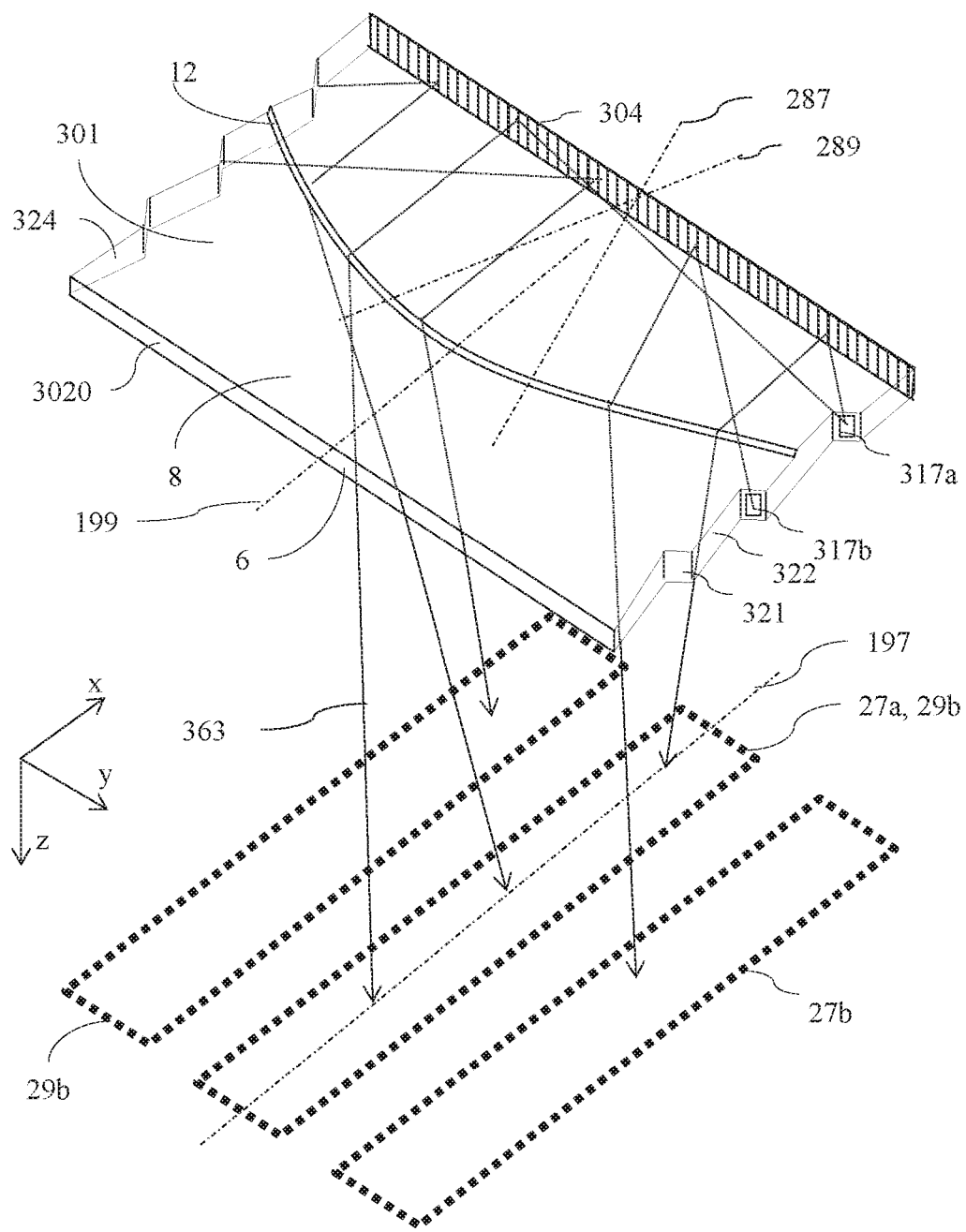
FIG. 12D is a schematic diagram illustrating a perspective view of the formation of optical windows by a directional display apparatus comprising a directional waveguide with light input at a side that is adjacent a reflective side, in accordance with the present disclosure.

FIG. 12D is a schematic diagram illustrating a perspective view of the formation of optical windows by a directional display apparatus comprising a directional waveguide with light input at a side that is adjacent a reflective side. Light sources 317a-n and 319a-n at input facets 321 are arranged to provide optical windows 27a-n and 29a-n respectively about an axis 197. Fresnel mirror 304 is arranged with first and second optical axes 287, 289. The input surface may thus be a side surface 322 of the waveguide 301 extending away from the reflective end 304 towards a thinner end 3020.

A directional backlight thus comprises a first guide surface 6 arranged to guide light by total internal reflection and the second guide surface 8 comprising a plurality of light extraction features 12 oriented to direct light guided along the waveguide 1, 301 in directions allowing exit through the first guide surface 6 as the output light and intermediate regions 10 between the light extraction features 12 that are arranged to guide light along the waveguide 1, 301.

Considering the arrangements of FIGS. 12A-D, the second guide surface 6 may have a stepped shape in which said light extraction features 12 are facets between the intermediate regions 10. The light extraction features 12 may have positive optical power in a direction between the side surfaces 22, 24 or 322, 324 of the waveguide 1, 301 that extend between the first and second guide surfaces 6,8. The reflective end 4, 304 may have positive optical power in a direction extending between the sides 22, 24 or 322, 324 of the reflective end 4, 304 that extend between the first and second guide surfaces 6, 8.

Thus all sides 2, 4, 6, 8, 22, 24 provide reflections to achieve uniform illumination and low cross talk in privacy mode of operation. If features are applied to many areas of the surface then non-uniformities may be provided due to the spatial location of the waveguide extraction loss at the features.

Thus a directional display device may comprise a waveguide wherein the input surface 322 is a surface of a side of the waveguide 1 extending away from the reflective end 304.

It would be desirable to optimize the efficiency of polarization recirculation in a directional display apparatus. The present disclosure relates to the propagation of polarized light in a directional backlight.

Figure 13:
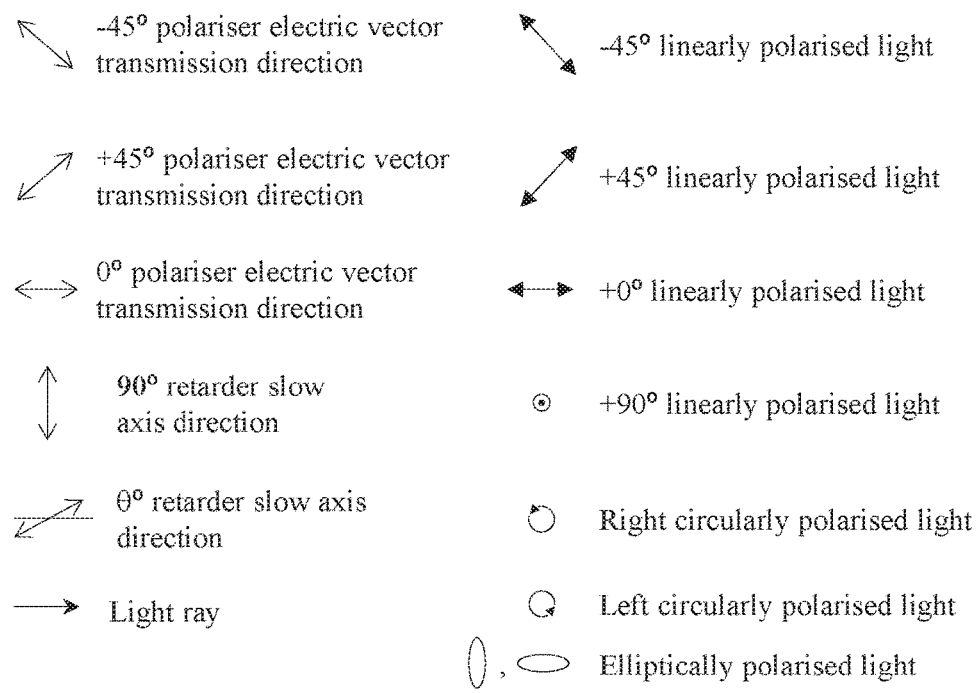
FIG. 13 is a key illustrating orientation of polarizer electric vectors, retarder slow axes, and polarization states for other figures in the present disclosure, in accordance with the present disclosure.

FIG. 13 is a key illustrating symbols that illustrate orientation of polarizer electric vectors, retarder slow axes, and polarization states, and direction of light ray propagation for other figures in the present disclosure unless otherwise stated. Said symbols are located on or adjacent to respective rays in the figures herein.

Figure 14A:
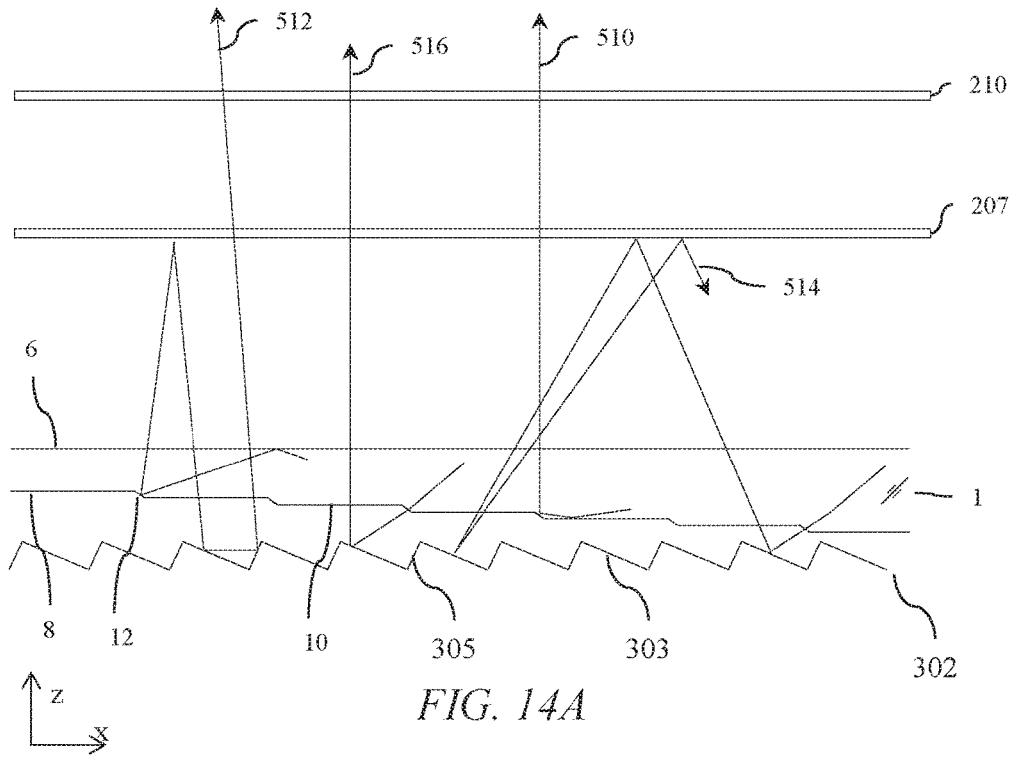
FIG. 14A is a schematic diagram illustrating a side view of light ray paths in a recirculating directional backlight, in accordance with the present disclosure.

FIG. 14A is a schematic diagram illustrating a side view of light ray paths in a recirculating directional backlight. The recirculation of polarized light from rear reflector 300 comprising surface 302 with reflective facets 303, 305 has been described in U.S. Pat. No. 9,235,057 and in U.S. Patent Publ. No. 2014-0240828, each of which is incorporated herein by reference in its entirety.

FIG. 14A describes the output of light rays that are reflected or transmitted by the light extraction features 12 after reflection from reflective end 4. Light ray 510 is transmitted by reflective polarizer 207 and by absorbing polarizer 210 that is aligned with polarizer 207 before incidence onto the liquid crystal layer 214. Similarly light ray 516 that was transmitted by the feature 12 and reflected by facet 303 of the rear reflector 300 is transmitted by reflective polarizer 207 and by absorbing polarizer 210 that is aligned with polarizer 207 before incidence onto the liquid crystal layer 214. Light ray 512 that was reflected by the reflective polarizer 207 is incidence on the facets 303, 305 of the rear reflector and subsequently transmitted through polarizers 207, 210. Thus light rays 510, 512, 516 may contribute to the light output of the directional display.

In another ray path 514 has a high angle from the normal direction in the vertical direction. Light ray 514 that is transmitted by feature 12 is reflected by reflective polarizer 207 and incident on facet 303, thereafter undergoing further reflections at the reflective polarizer 207, and thus does not contribute to the output light of the directional display.

The reflection of polarized light from a rear reflector will now be described.

Figure 14B:
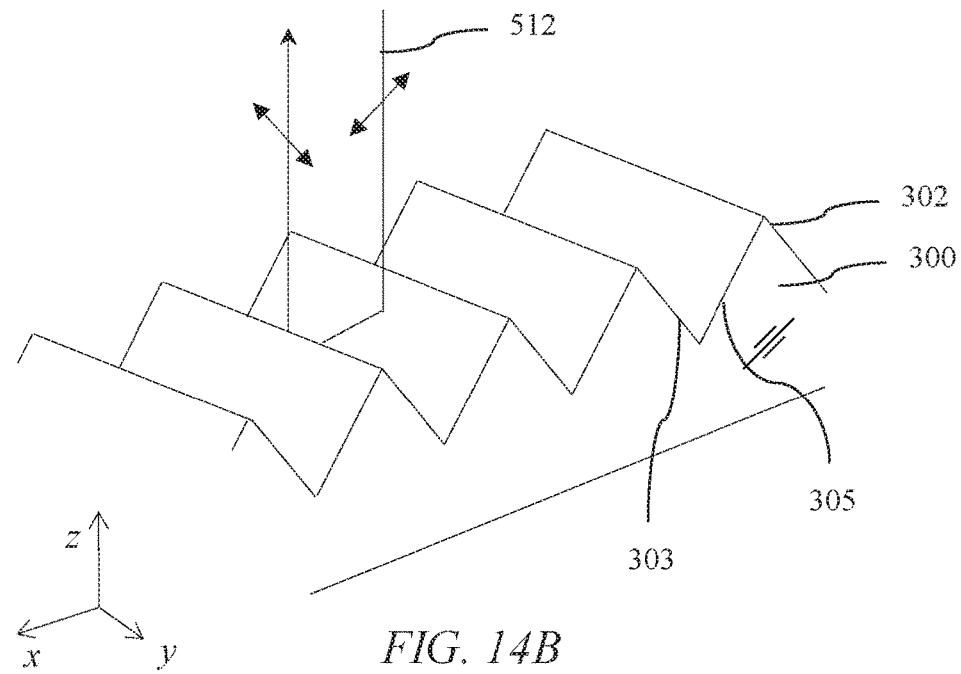
FIG. 14B and FIG. 14C are schematic diagrams illustrating perspective views of reflection of polarized light from a faceted rear reflector, in accordance with the present disclosure.
Figure 14C:
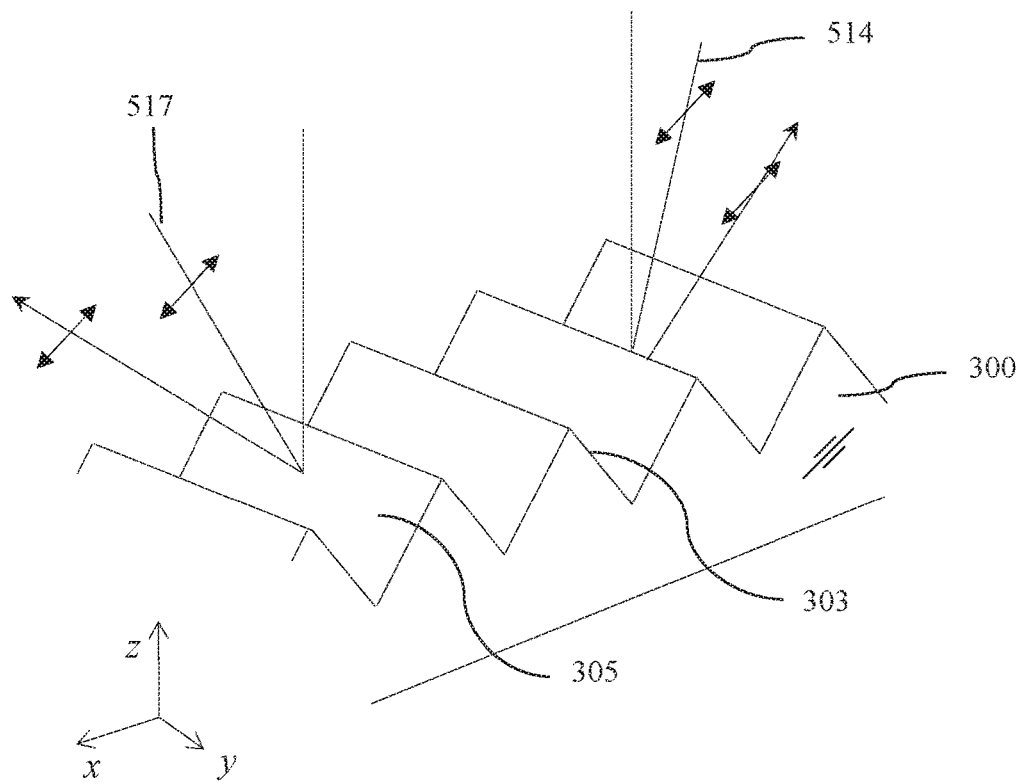

FIGS. 14B-C are schematic diagrams illustrating perspective views of reflection of polarized light from a faceted rear reflector. FIG. 14B illustrates linearly polarized light rays 512 that are incident on the linear rear reflector 300 with a polarization state of +45 degrees undergo a double reflection, with the polarization of the reflected light being rotated to −45 degrees. Such double reflection may advantageously achieve increased polarization recirculation efficiency as described in FIG. 14A.

FIG. 14C illustrates light rays 514, 517 that are incident on facets 303, 305 respectively of the rear reflector 300. Such rays are provided at an angle that reflection occurs at only one of the two facets 303, 305. Thus the incident polarization state is not rotated.

The propagation of polarized light in directional display, for example those comprising a faceted rear reflector 300 will now be described.

Figure 15A:
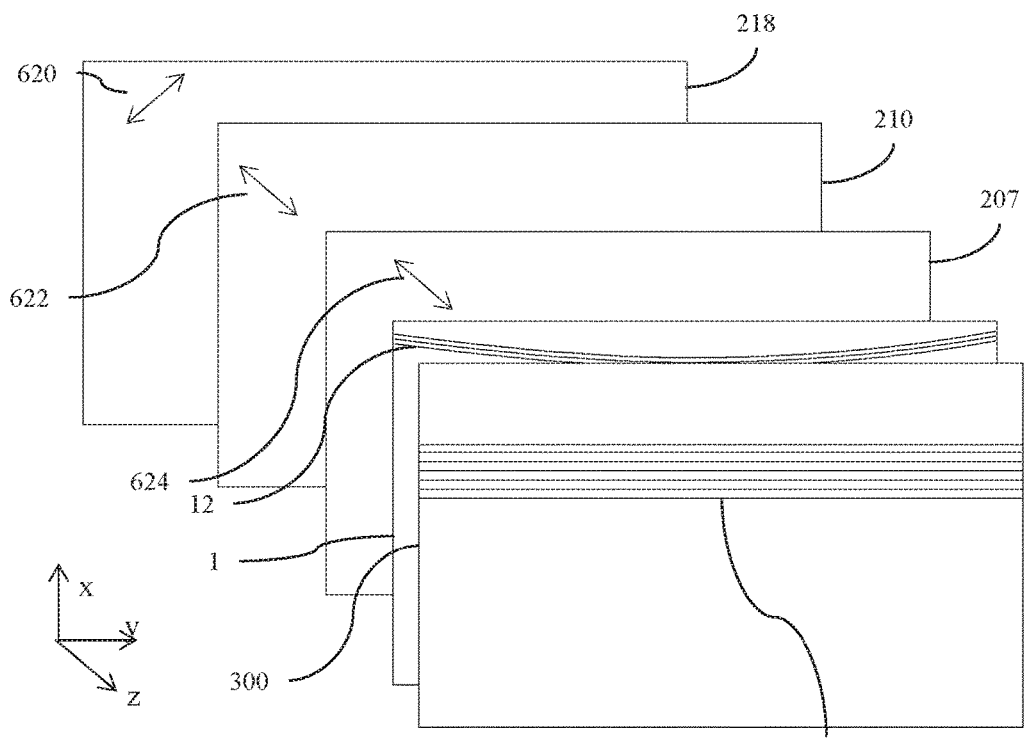
FIG. 15A is a schematic diagram illustrating in perspective front view a stack of polarization management components of a directional display apparatus comprising a twisted nematic liquid crystal spatial light modulator, in accordance with the present disclosure.

FIG. 15A is a schematic diagram illustrating in perspective front view a stack of polarization management components of a directional display apparatus comprising a twisted nematic liquid crystal spatial light modulator. Referring to the optical stack of FIG. 12A for example, output polarizer 218 may have an electric vector transmission direction 620 of +45 degrees, with input polarizer 210 having an electric vector transmission direction 622 of 45 degrees. Reflective polarizer 207 may have an electric vector transmission direction 624 that is aligned with the direction 622 of input polarizer 210.

Rear reflector 303, 305 may be arranged with facets 303, 305 that are elongate in the lateral direction (parallel to the y-axis). Alternatively and as described herein the facets 303, 305 may have a curvature about the z-axis. Said curvature may be arranged to provide control of window plane location that is matched to or different from the window plane location from the waveguide 1, as described in U.S. Patent Publ. No. 2017-0339398, filed May 18, 2017 and incorporated by reference herein in its entirety.

The propagation of polarization states in the arrangement of FIG. 15A will now be described.

Figure 15B:
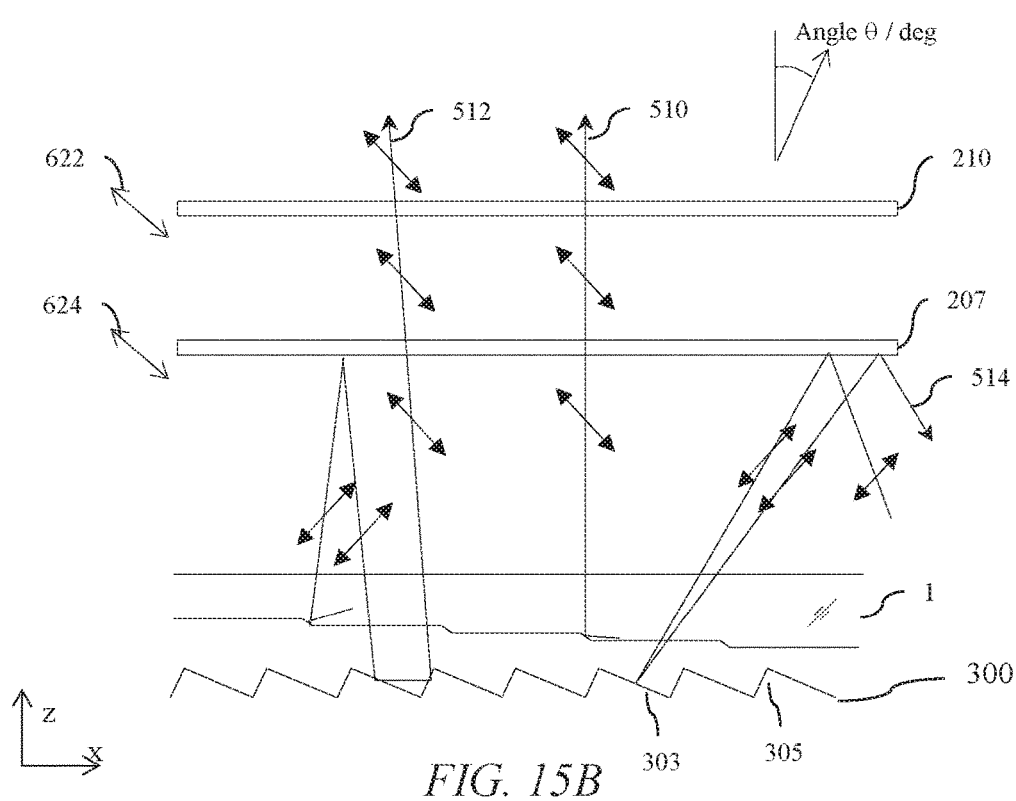
FIG. 15B is a schematic diagram illustrating in side view recirculated polarized light propagation in the directional display of FIG. 15A, in accordance with the present disclosure.

FIG. 15B is a schematic diagram illustrating in side view recirculated polarized light propagation in the directional display of FIG. 15A. Light ray 510 illustrates that light with −45 degrees linear polarization state is transmitted through the reflective polarizer 207 and input polarizer 210. Light ray 512 illustrates propagation of light from the waveguide 1 that has a +45 degrees polarization state. After reflection at the reflective polarizer 207 and rear reflector 300 surface 302, the polarization state is rotated to −45 degrees and transmitted through the input polarizer 210 of the LCD.

By comparison, light ray 514 is polarized with +45 degrees linear polarization state which is not rotated by the rear reflector 300 and thus continues to propagate between the reflective polarizer 207 and rear reflector 300 until it is lost in the system. Thus rays 514 at higher vertical angles than rays 510, 512 are not output from the system.

The propagation of polarized light in a directional display comprising an In Plane Switching (IPS) LCD will now be described.

Figure 16A:
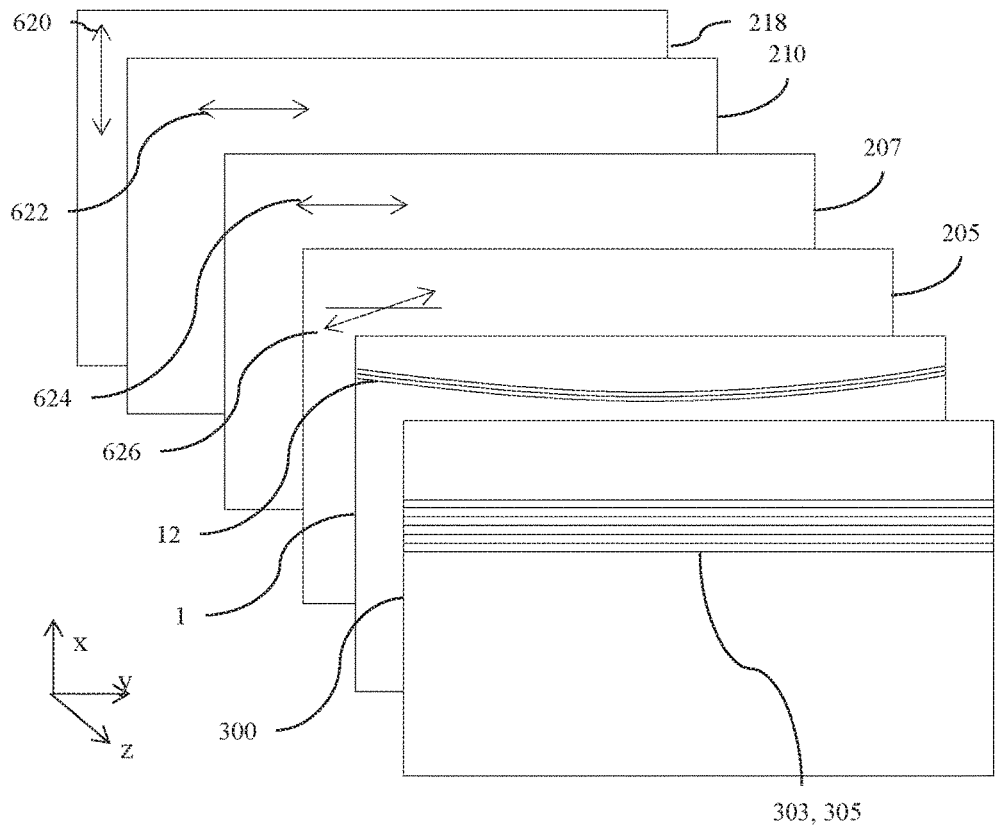
FIG. 16A is a schematic diagram illustrating in perspective front view a stack of polarization management components of a directional display apparatus comprising an in plane switching mode liquid crystal spatial light modulator, in accordance with the present disclosure.
Figure 16B:
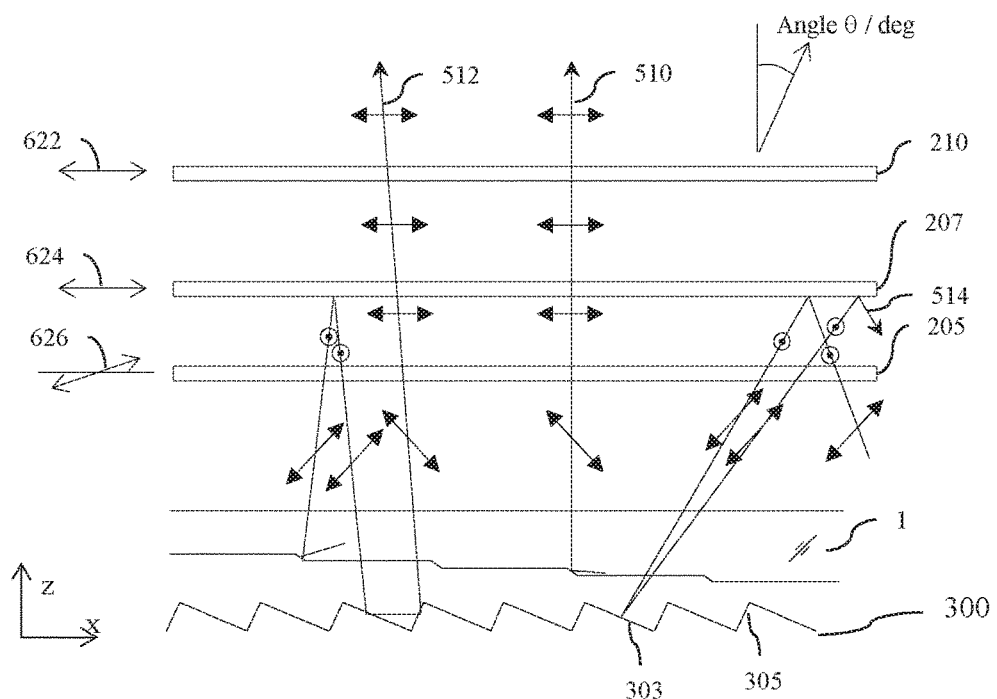
FIG. 16B is a schematic diagram illustrating in side view recirculated polarized light propagation in the directional display of FIG. 16A, in accordance with the present disclosure.

FIG. 16A is a schematic diagram illustrating in perspective front view a stack of polarization management components of a directional display apparatus comprising an in plane switching mode liquid crystal spatial light modulator and FIG. 16B is a schematic diagram illustrating in side view recirculated polarized light propagation in the directional display of FIG. 16A.

By way of comparison to the arrangement of FIG. 15A the output polarization electric vector direction 620 may be 90 degrees and the input polarizer direction 622 may be 0 degrees to a predetermined direction that is the lateral direction. To achieve polarization rotation at the rear reflector 300, a 45 degrees linear polarization state is provided by means of an adjustment retarder 205 disposed between the reflective polarizer 207 and the rear reflector 300. The adjustment retarder 205 may have a slow axis direction of 22.5 degrees or 67.5 degrees and may be a half wave retarder at a wavelength of 500 nm for example.

In operation, polarized light at +45 degrees from the waveguide propagating along ray 512 may be rotated to a 90 degrees linear polarization by adjustment retarder 205 before reflection by the reflective polarizer 207 and reflection from the rear reflector 300 to provide a −45 degrees polarization state. Said polarization state may be further rotated by the adjustment retarder 205 so that a 0 degrees linear polarization is provided to be transmitted through the reflective polarizer 207 and input polarizer 210.

Advantageously polarization recirculation is achieved in directional displays comprising an input polarizer that has an electric vector transmission axis that is not inclined at 45 degrees to the elongate facets of the rear reflector.

Figure 17:
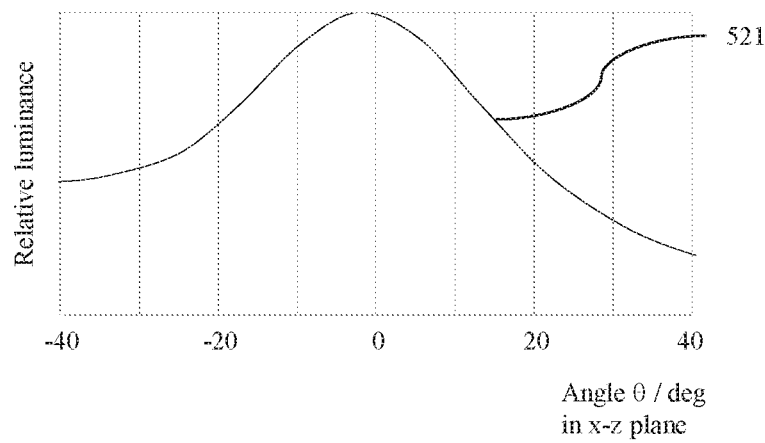
FIG. 17 is a schematic graph illustrating the variation in luminance in a vertical direction for a directional display comprising the optical stack of FIGS. 16A-B, in accordance with the present disclosure.

FIG. 17 is a schematic graph illustrating the variation in luminance profile 521 in a vertical direction for a directional display comprising the optical stack of FIGS. 16A-B in a display comprising rear reflector facet 303 angle of greater than 45 degrees from the z-direction, such that angle 305 is at an angle of less than 45 degrees to the z-direction.

Such facet angles desirably provide increased head on luminance and angular profile in the vertical direction for output light that is not recirculated, such that light at a positive angle θ has a lower luminance than light at a negative angle θ (as illustrated on FIGS. 15B and 16B). The facets 303, 305 of the rear reflector are not inclined at 45 degrees to the z-axis and may provide a recirculation efficiency that is greatest at an angle that is not the same as the z-direction.

The output luminance at an angle θ of greater than 0 degrees may have a lower luminance than those at an angle θ of less than 0 degrees.

It would be desirable to reduce the asymmetry of the profile 521 and provide more light in the vertical (look-down) direction.

Figure 18:
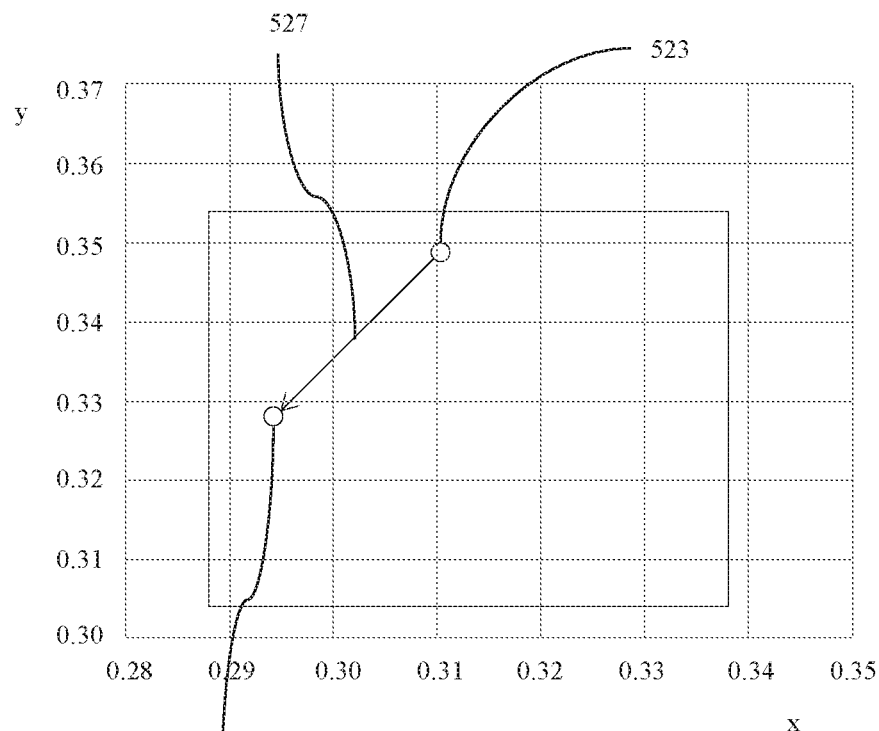
FIG. 18 is a schematic graph illustrating the variation in color in a vertical direction for a directional display comprising the optical stack of FIGS. 16A-B, in accordance with the present disclosure.

FIG. 18 is a schematic graph illustrating the variation in color in a vertical direction for a directional display comprising the optical stack of FIGS. 16A-B. CIE 1931 color xy coordinate 523 may be provided for on-axis viewing.

As will be described with reference to FIGS. 23A-D, the retardance of an adjustment retarder or correction retarder varies with thickness and thus with viewing angle. For off-axis light the retardance thus falls, and the wavelength at which a half wave retardation effect is provided changes. In the present illustrative embodiment of FIG. 16A, the shift 527 of color point 523 head on viewing to the color point 525 for 45 degrees off-axis (look-down) viewing may provide a noticeable color change, in this example providing a bluer color for look-down viewing.

It would be desirable to reduce color shifts in the vertical direction such that the display retains a similar color for different viewing locations.

Figure 19:
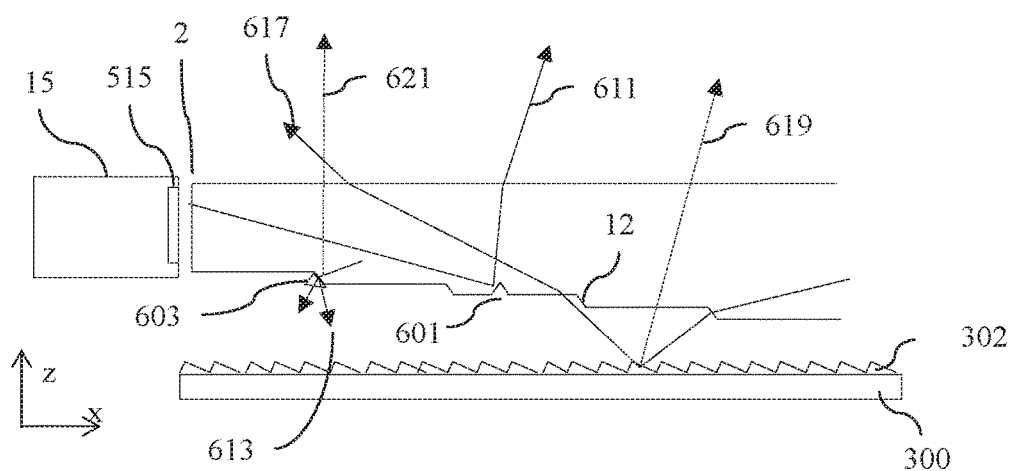
FIG. 19 is a schematic diagram illustrating in side view light propagation in a waveguide with surface damage, in accordance with the present disclosure.
Figure 20:
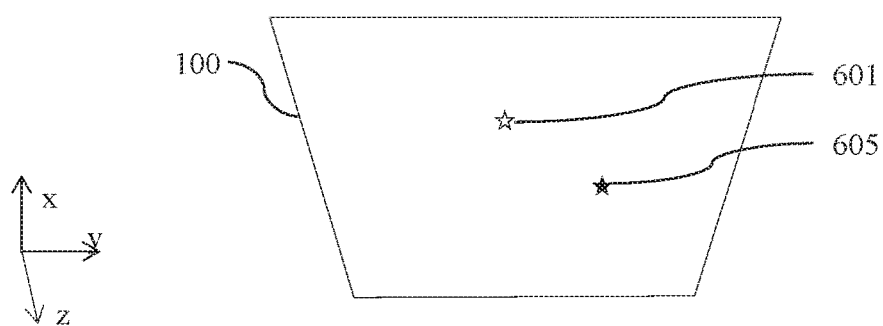
FIG. 20 is a schematic diagram illustrating in top down perspective view appearance of a damage defect, in accordance with the present disclosure.

FIG. 19 is a schematic diagram illustrating in side view light propagation in a waveguide with surface damage. FIG. 20 is a schematic diagram illustrating in top down perspective view appearance of damage defect on a display 100.

Light rays 611 may be scattered from defects 601, providing bright spots 601 for a viewer at a given viewing angle. Light rays 621 may be prevented by debris 603 at light extraction features 12, with light rays 613 scattered or absorbed. Thus a dark spot 605 may be provided by missing rays 621.

Such dark and bright spots may degrade the appearance of a visual image, it would be desirable to reduce or remove the visibility of such light rays. In particular, it would be desirable to increase the luminance of light rays 619 that may cover the appearance of defects and debris.

The visual quality degradations as described in FIGS. 17-20 may be improved by providing increased luminance for off-axis viewing positions in the vertical direction.

It would thus be desirable to achieve polarization recirculation of light that is incident on only one of the facets 303, 305 of the rear reflector 300.

Figure 21A:
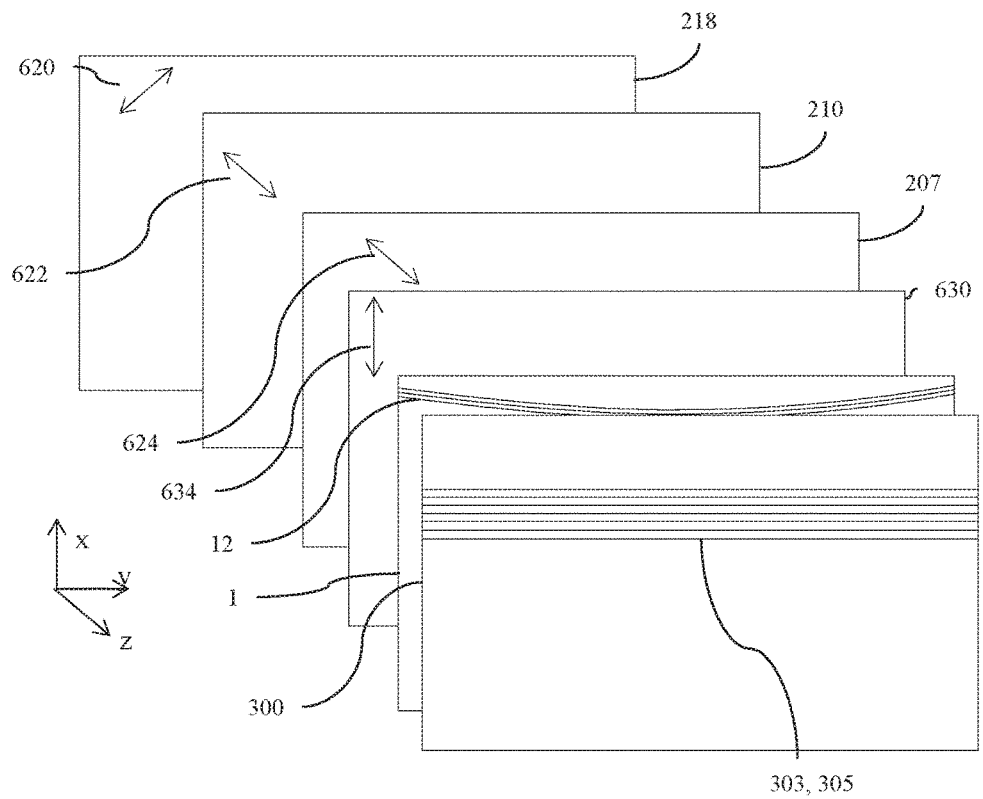
FIG. 21A is a schematic diagram illustrating in perspective front view a stack of polarization management components of a directional display apparatus comprising a twisted nematic mode liquid crystal spatial light modulator and a correction retarder, in accordance with the present disclosure.
Figure 21B:
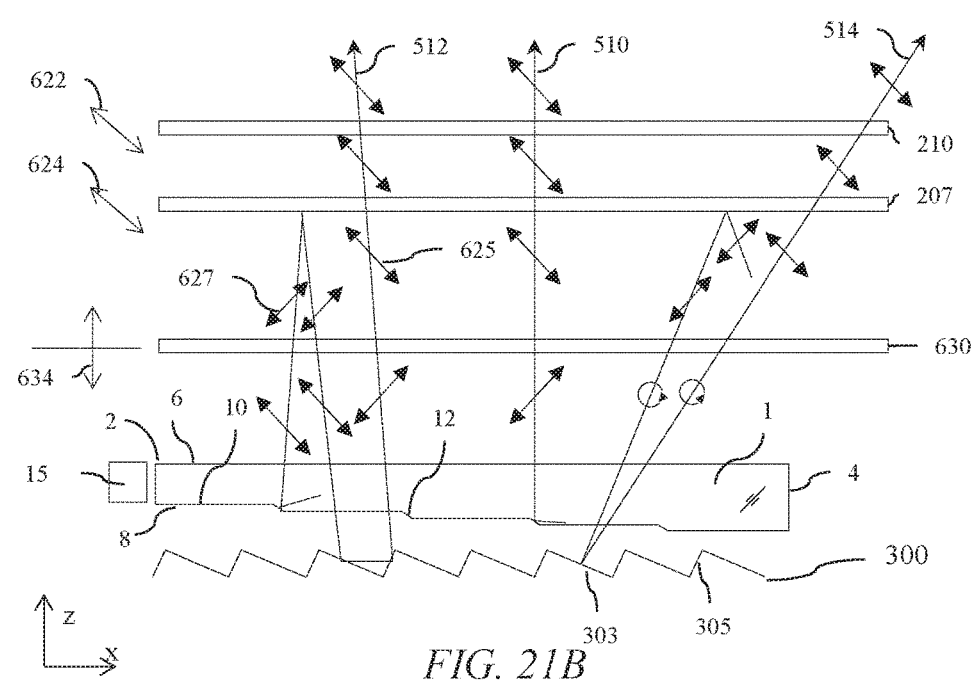
FIG. 21B is a schematic diagram illustrating in side view recirculated polarized light propagation in the directional display of FIG. 21A, in accordance with the present disclosure.

FIG. 21A is a schematic diagram illustrating in perspective front view a stack of polarization management components of a directional display apparatus comprising a twisted nematic mode liquid crystal spatial light modulator and a correction retarder. FIG. 21B is a schematic diagram illustrating in side view recirculated polarized light propagation in the directional display of FIG. 21A. FIG. 21A is similar in structure to FIG. 15A, further comprising a correction retarder 630 provided between the reflective polarizer 624 and rear reflector 300.

Figure 22A:
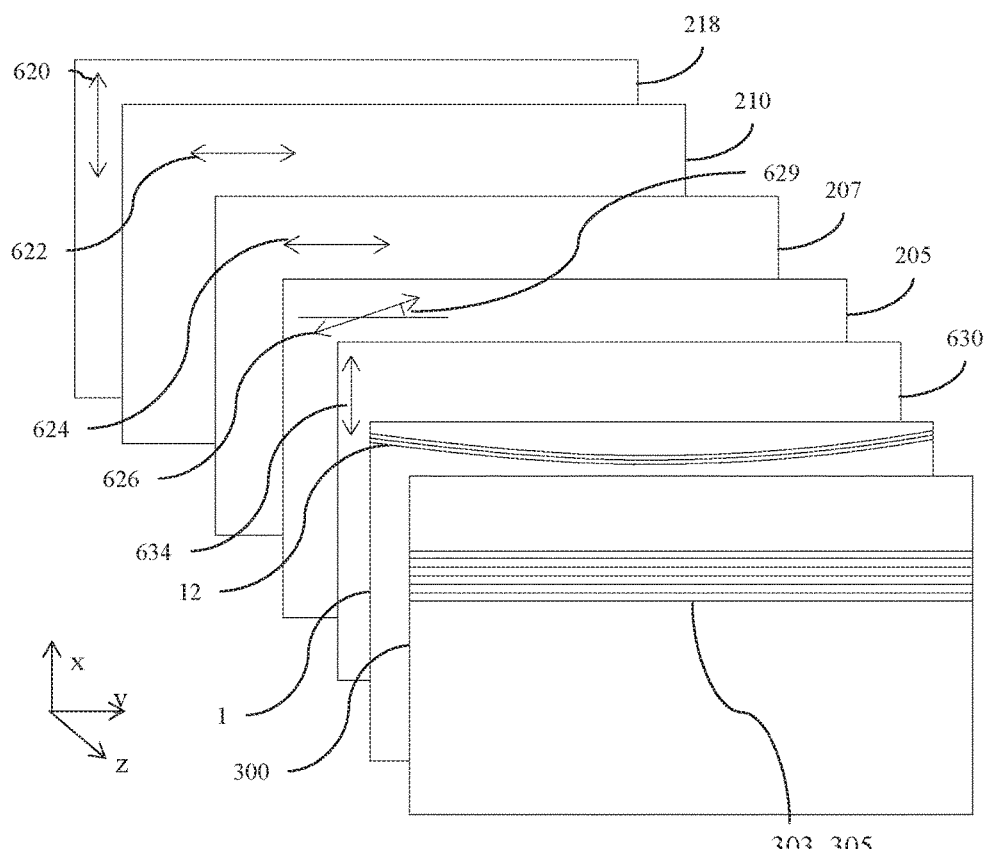
FIG. 22A is a schematic diagram illustrating in perspective front view a stack of polarization management components of a directional display apparatus comprising an in plane switching mode liquid crystal spatial light modulator and further comprising a compensation retarder, in accordance with the present disclosure.
Figure 22B:
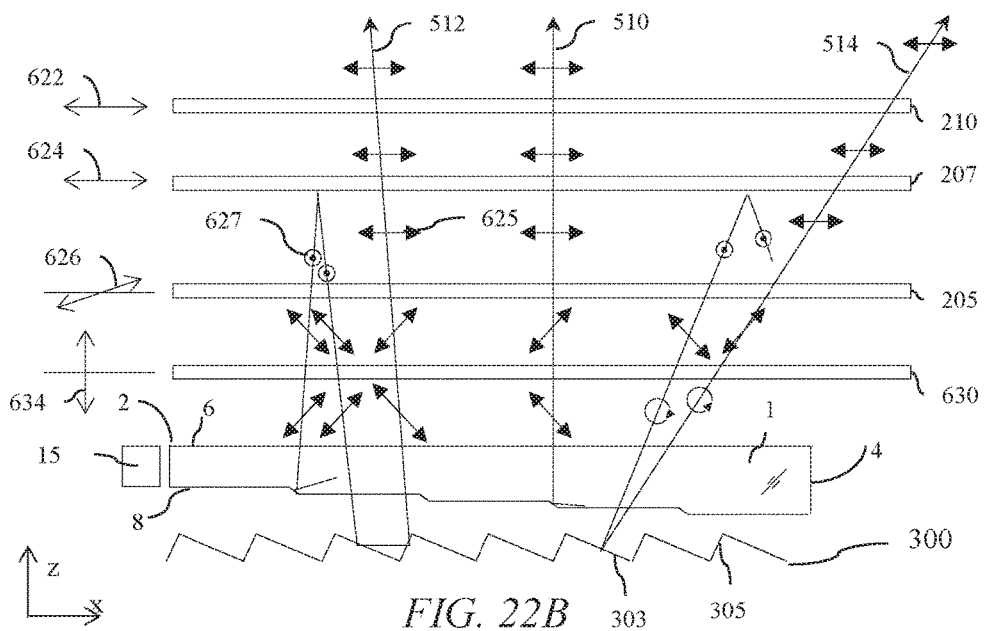
FIG. 22B is a schematic diagram illustrating in side view recirculated polarized light propagation in the directional display of FIG. 22A, in accordance with the present disclosure.

FIG. 22A is a schematic diagram illustrating in perspective front view a stack of polarization management components of a directional display apparatus comprising an in plane switching mode liquid crystal spatial light modulator and further comprising a compensation retarder and FIG. 22B is a schematic diagram illustrating in side view recirculated polarized light propagation in the directional display of FIG. 22A. FIG. 22A is similar in structure to FIG. 16A, further comprising a correction retarder 630 provided between the reflective polarizer 624 and rear reflector 300.

A directional display device may thus comprise a waveguide 1 comprising first and second, opposed guide surfaces 6, 8 for guiding light along the waveguide 1 and an input surface 2 extending between the first and second guide surfaces; an array 15 of light sources disposed at different input positions along the input surface 2 of the waveguide 1 and arranged to input light into the waveguide 1. The waveguide further comprises a reflective end 4 for reflecting the input light from the light sources 15 back along the waveguide 1, the second guide surface 6 being arranged to deflect the reflected input light through the first guide surface 8 as output light, and the waveguide 1 being arranged to image the light sources 15 in a lateral direction so that the output light from the light sources 15 is directed into respective optical windows 26 in output directions that are distributed in dependence on the input positions of the light sources.

A transmissive spatial light modulator is arranged to receive the output light and arranged to modulate a first polarization component 625 of the output light having a first polarization state. In this example, the first polarization component 625 is linearly polarized.

A reflective polarizer 207 is disposed between the first guide surface 6 of the waveguide 1 and the spatial light modulator and arranged to transmit the first polarization component 625 and to reflect a second polarization component 627 of the output light having a second polarization state orthogonal to the first polarization state as rejected light. In this example, the second polarization component 625 is linearly polarized on reflection at the reflective polarizer 207.

In FIGS. 21B and 22B the first polarization component 625 is transmitted by the reflective polarizer 207, for example along ray 510. In FIG. 21B the first polarization state is a linear polarization state at an angle of −45 degrees with respect to the lateral direction. In FIG. 22B the first polarization state is a linear polarization state at an angle of 0 degrees, that is parallel, with respect to the lateral direction.

A rear reflector 300 is disposed behind the second guide surface 8 and arranged to reflect the rejected light for supply back to the spatial light modulator, the rear reflector comprising a linear array of pairs of reflective corner facets extending in a predetermined direction perpendicular to the normal to spatial light modulator so that the rear reflector converts the polarization state of the rejected light that has a double reflection from a pair of corner facets into an orthogonal polarization state, so that it has the polarization state of the first polarization component on return to the reflective polarizer 207.

The directional display apparatus may further comprise an adjustment retarder 205 with slow axis angle 629 to the lateral direction. Adjustment retarder 205 is disposed between the reflective polarizer 207 and the rear reflector 300 and arranged to adjust the polarization state of the second polarization component. Angle 629 may be 22.5 degrees for example, such that the adjustment retarder 205 is a half wave retarder arranged to rotate linearly polarized light at an angle of 45 degrees to 0 degrees. FIG. 22B thus comprises an adjustment retarder 205 that rotates an incident +45 degrees linear polarization state to the first polarization at 0 degrees.

The directional display apparatus may further comprise one or more correction retarders 630 comprising birefringent material disposed between the reflective polarizer 207 and the rear reflector 300, the one or more correction retarders 630 being arranged to provide a net effect of relatively shifting the phase of the first and second polarization components 625, 627 incident thereon in a direction normal to the spatial light modulator 48 by half a wavelength. Thus the birefringence and the thickness of the retarder in the normal direction (parallel to the z-axis) for a given design wavelength may provide a half wave retarder.

The birefringent material of the one or more correction retarders may have a slow axis 634 extending in a direction perpendicular to the predetermined direction. As illustrated in FIGS. 22A-22B, the predetermined direction is the lateral direction, and thus the slow axis 634 extends in the x-axis direction. Further the one or more correction retarders 630 is a single correction retarder; and the correction retarder 630 is disposed between the reflective polarizer 207 and the waveguide 1.

Referring to FIGS. 21B and 22B, the rejected light of the second polarization component is linearly polarized on reflection at the rear reflector 300 in a direction at an angle of 45° to the predetermined direction. As illustrated in FIG. 14B, the polarization state is rotated by the elongate facets of the rear reflector, and thus the polarization state of the second polarization component 627 may be converted to an orthogonal polarization state polarization state. As a result, the second polarization component 627 has the same polarization state as the first polarization component 625 when it returns to the reflective polarizer 207.

Although in these examples, the second polarization component 627 is illustrated as having particular linear polarization states as it passes between the reflective polarizer 207 and the rear reflector 300, this is not limitative and the polarization state of the second polarization component 627 may be changed by the inclusion of retarders or other components as it passes between the reflective polarizer 207 and the rear reflector 300 as rejected light. For example, the second polarization component 627 may be converted to have a different linear polarization state or a circular polarization state at any given point between the reflective polarizer 207 and the rear reflector 300, provided that the polarization state of the second polarization component 627 is converted into the orthogonal polarization state at the rear reflector 300, and the second polarization component 627 has the same polarization state as the first polarization state 625 when it is returned to the reflective polarizer 207.

Similarly, in these examples the first polarization component 625 which is passed by the reflective polarizer 207 is a linear polarization state, alternatively the first polarization component 625 which is passed by the reflective polarizer 207 could have a circular polarization state, depending on the nature of the spatial light modulator 48. In that case, the second polarization component 627 would have a circular polarization state orthogonal to the polarization state of the first polarization component 625, on reflection at the reflective polarizer. Again, the polarization state of the second polarization component 627 may be changed, as discussed above.

The first guide surface 6 may be arranged to guide light by total internal reflection, and the second guide surface 8 may comprise light extraction features 12 and intermediate regions 10 between the light extraction features 12, the light extraction features 12 being oriented to reflect light guided through the waveguide 1 in directions allowing exit through the first guide surface 6 as output light and the intermediate regions 10 being arranged to direct light through the waveguide 1 without extracting it. The extraction facets 12 may be curved and have positive optical power in the lateral direction between sides 22, 24 of the waveguide 1 that extend between the first and second guide surfaces. The reflective end 4 may have positive optical power in the lateral direction extending between sides 22, 24 of the waveguide 1 that extend between the first and second guide surfaces 6, 8. As illustrated in FIG. 12A for example, the input surface 2 may be an end of the waveguide 1 opposite to the reflective end 4.

The operation of the correction retarder will now be described.

In FIGS. 23A-D of the present disclosure the key of FIG. 13 is not applied for convenience of explanation. The orientation of polarization states and retarder axis is illustrated in the perspective of the figure as will be further described herein.

Figure 23A:
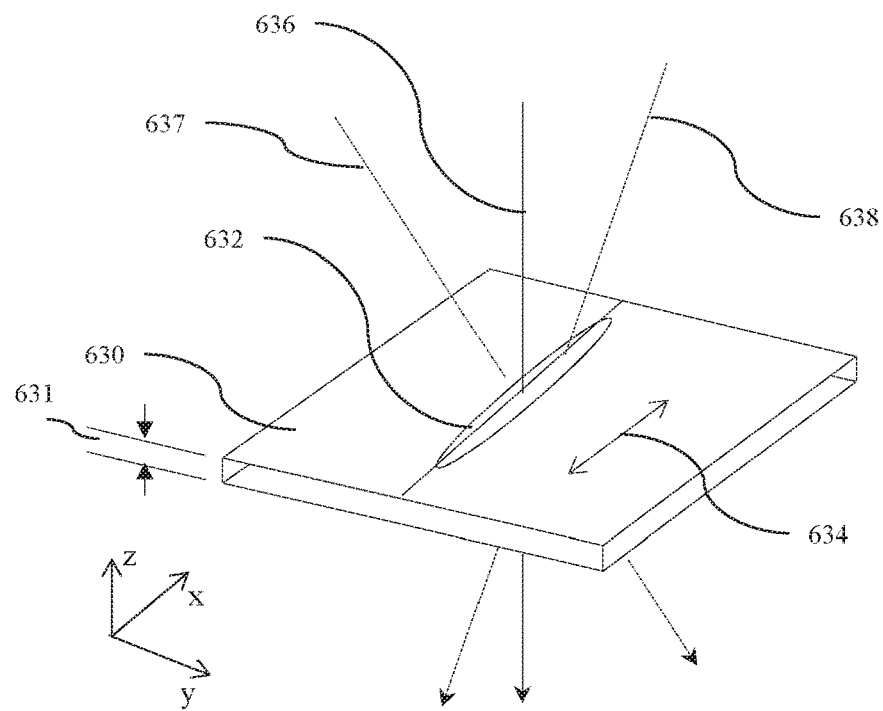
FIG. 23A is a schematic diagram illustrating in perspective view illumination of a retarder layer by off-axis light, in accordance with the present disclosure.

FIG. 23A is a schematic diagram illustrating in perspective view illumination of a retarder layer by off-axis light. Correction retarder 630 may comprise birefringent material, represented by refractive index ellipsoid 632 with slow axis direction 634 at 0 degrees to the x-axis, and have a thickness 631. Normal light rays 636 propagate so that the path length in the material is the same as the thickness 631. Light rays 637 are in the y-z plane have an increased path length, however the birefringence of the material is substantially the same as the rays 636. By way of comparison light rays 638 that are in the x-z plane have an increased path length in the birefringent material and further the birefringence is different to the normal ray 636.

The retardance of the retarder 630 is thus dependent on the angle of incidence of the respective ray, and also the plane of incidence, that is rays 638 in the x-z will have a retardance different from the normal rays 636 and the rays 637 in the y-z plane.

The interaction of polarized light with the retarder 630 will now be described. To distinguish from the first and second polarization components during operation in a directional backlight, the following explanation will refer to third and fourth polarization components.

Figure 23B:
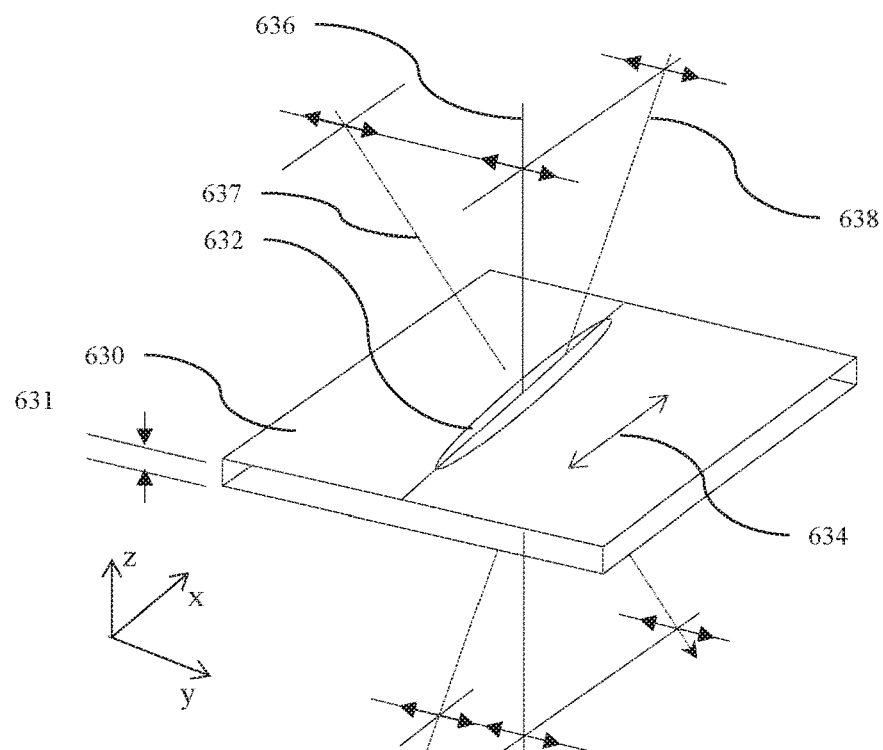
FIG. 23B is a schematic diagram illustrating in perspective view illumination of a retarder layer by off-axis light of a first linear polarization state at 0 degrees, in accordance with the present disclosure.
Figure 23C:
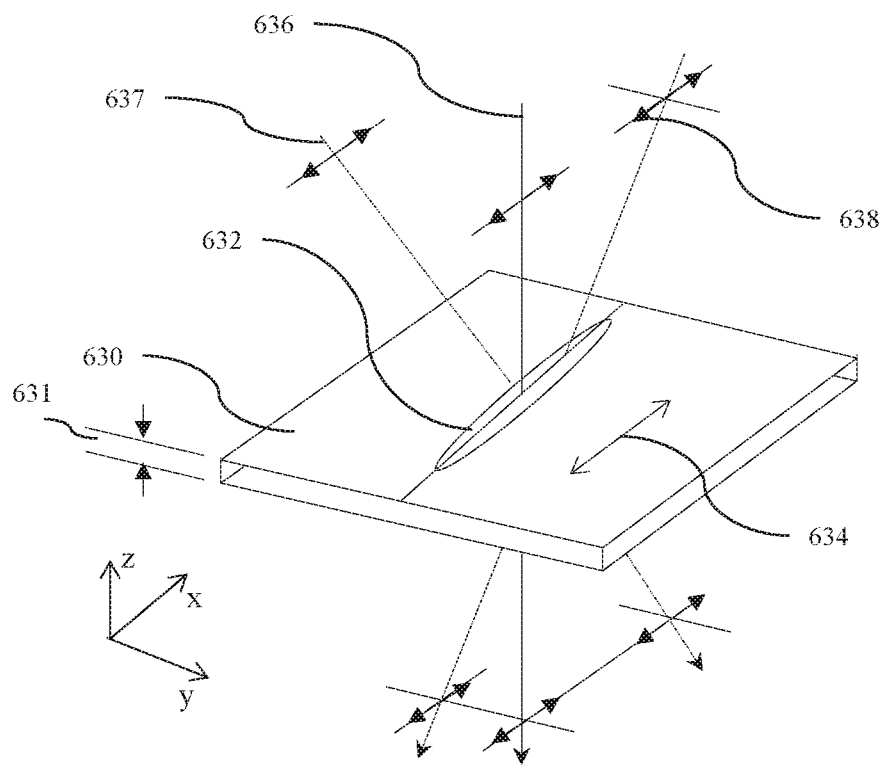
FIG. 23C is a schematic diagram illustrating in perspective view illumination of a retarder layer by off-axis light of a first linear polarization state at 90 degrees, in accordance with the present disclosure.

FIG. 23B is a schematic diagram illustrating in perspective view illumination of a retarder layer by off-axis light of a third linear polarization state at 90 degrees to the x-axis and FIG. 23C is a schematic diagram illustrating in perspective view illumination of a retarder layer by off-axis light of a fourth linear polarization state at 0 degrees to the x-axis. In such arrangements, the incident linear polarization states are aligned to the optical axes of the birefringent material, represented by ellipse 632. Consequently, no phase difference between the third and fourth orthogonal polarization components is provided, and there is no resultant change of the polarization state of the linearly polarized input for each ray 636, 637, 638.

Figure 23D:
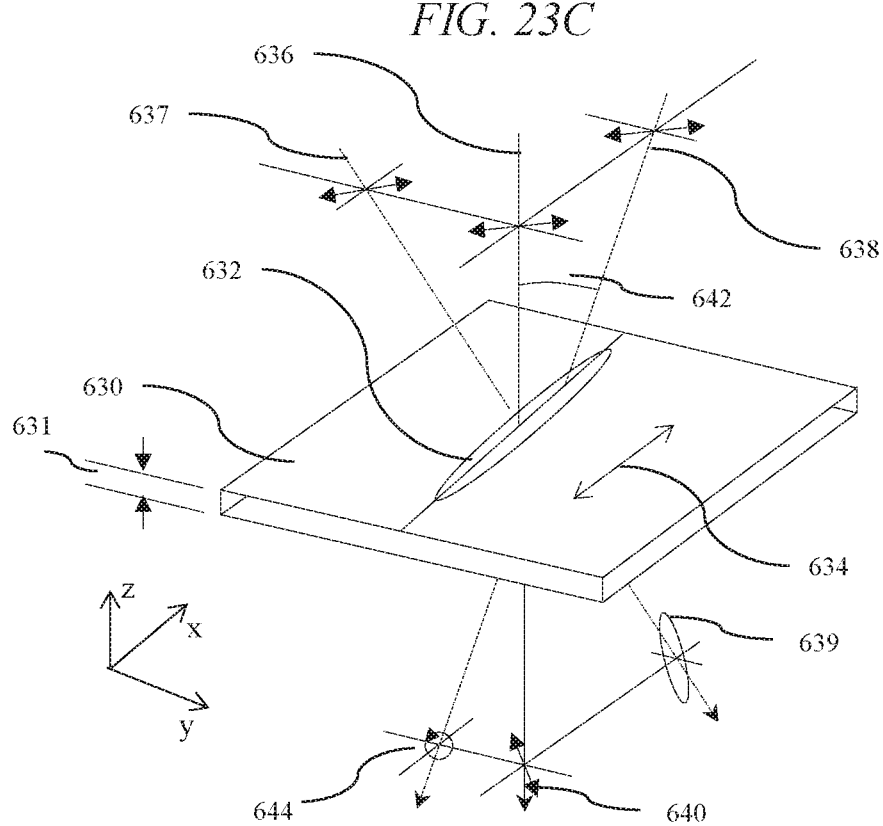
FIG. 23D is a schematic diagram illustrating in perspective view illumination of a retarder layer by off-axis light of a first linear polarization state at 45 degrees, in accordance with the present disclosure.

FIG. 23D is a schematic diagram illustrating in perspective view illumination of a retarder 630 layer by off-axis light of a linear polarization state at 45 degrees. The linear polarization state may be resolved into third and fourth polarization components that are respectively orthogonal and parallel to slow axis 634 direction. The retarder thickness 631 and material retardance represented by refractive index ellipsoid 632 may provide a net effect of relatively shifting the phase of the third and fourth polarization components incident thereon in a normal direction represented by ray 636 by half a wavelength, for a design wavelength. The design wavelength may for example be in the range of 500 to 550 nm.

At the design wavelength and for light propagating normally along ray 636 then the output polarization may be rotated by 90 degrees to a linear polarization state 640 at −45 degrees. Light propagating along ray 637 may see a phase difference that is similar but not identical to the phase difference along ray 637 due to the change in thickness, and thus an elliptical polarization state 639 may be output which may have a major axis similar to the linear polarization axis of the output light for ray 636.

By way of contrast, the phase difference for the incident linear polarization state along ray 638 may be significantly different, in particular a lower phase difference may be provided. Such phase difference may provide an output polarization state 644 that is substantially circular at a given inclination angle 642.

The behavior of polarized light in off-axis propagation in directional displays comprising correction retarders 630 will now be described with further reference to FIGS. 21B and 22B.

In FIG. 21B, polarized light with the second polarization component 627 that is propagating in a substantially normal direction may be provided along ray 512 by the waveguide 1 with a −45 degrees linear polarization state. At the correction retarder 630, the polarization is rotated to +45 degrees and reflected by the reflective polarizer 207. On a second pass through the correction retarder 630, the polarization is rotated to −45 degrees, and then rotated by the rear reflector to the orthogonal polarization state of +45 degrees. The polarization state is rotated for a third time by the correction retarder 630 to −45 degrees and is transmitted through the correction retarder.

In comparison to the arrangement of FIG. 15B the correction retarder 630 does not provide significantly different performance for light rays 512 propagating in the normal direction.

Light rays 512 in FIG. 22B propagate in a similar manner, with the adjustment retarder providing additional rotation of polarized light between 45 degrees and 0 degrees to provide alignment to a rear reflector at an angle of 0 degrees.

The propagation of off-axis light rays 514 in directional backlights comprising correction retarder 630 will now be described.

In FIG. 21B, linearly polarized light from the waveguide 1 for the second polarization component has a polarization direction incident onto the reflective polarizer 207 of +45 degrees. This polarization is incident onto the correction retarder. As described in FIG. 23D, a circular polarization state may be incident on the facet 303 of the rear reflector, for example a right handed circular polarization. As there is no double reflection from facet 305, then a linear polarization state at 45 degrees would not undergo a 90 degrees rotation. However, the incident circular polarization state undergoes a phase shift on reflection, and a left handed polarization state is reflected. Such a state passes through the correction retarder 630 and is converted to +45 degrees linear polarization state, which is aligned with the first polarization component 625 and thus transmitted through the reflective polarizer 207.

In a similar manner, the off-axis light rays 514 of FIG. 22B are recirculated in a directional backlight with an adjustment retarder 205 providing alignment of the recirculated light to the reflective polarizer 207 transmission direction with the first polarization component.

Advantageously, the polarization recirculation efficiency is increased at angles away from the normal direction, in the x-z plane, that is the vertical direction of operation of a landscape display. As will be described below, increased efficiency for higher viewing angles can provide improved luminance, reduced color shifts with direction, and reduced susceptibility to damage.

In the present embodiments, slow axis typically refers to the orientation orthogonal to the normal direction in which linearly polarized light propagating substantially normal to the retarder has an electric vector direction parallel to the slow axis travels at the slowest speed. The slow axis direction is the direction of this light with the highest refractive index at the design wavelength.

For positive dielectric anisotropy uniaxial birefringent materials the slow axis direction is the extraordinary axis of the birefringent material. The ordinary axes in such materials are typically parallel to the normal direction, and orthogonal to the normal direction and the slow axis.

The terms half a wavelength and quarter a wavelength refer to the operation of a retarder for a design wavelength $\lambda_0$ that may typically be between 500 nm and 570 nm. The retarder provides a phase shift between two perpendicular polarization components of the light wave incident thereon and is characterized by the amount of relative phase, r, that it imparts on the two polarization components, which is related to the birefringence $\Delta n$ and the thickness d of the retarder by $$\Gamma = 2 \cdot \pi \cdot \Delta n \cdot d / \lambda_0 \qquad \text{eqn.1}$$

For a half wave retarder, the relationship between d, $\Delta n$, and $\lambda_0$ is chosen so that the phase shift between polarization components is $\Gamma=\pi$. For a quarter wave retarder, the relationship between d, $\Delta n$, and $\lambda_0$ is chosen so that the phase shift between polarization components is $\Gamma=\pi/2$.

The term half wave retarder herein typically refers to light propagating normal to the retarder and normal to the spatial light modulator. As shown in FIG. 23D the action of the retarder 630 may provide a half wave retardation for light ray 636 that is normal to the retarder, and quarter wave retardation for light ray 638 that is inclined in the x-z plane by angle 642.

Various arrangements of retarder location will now be described.

Figure 24A:
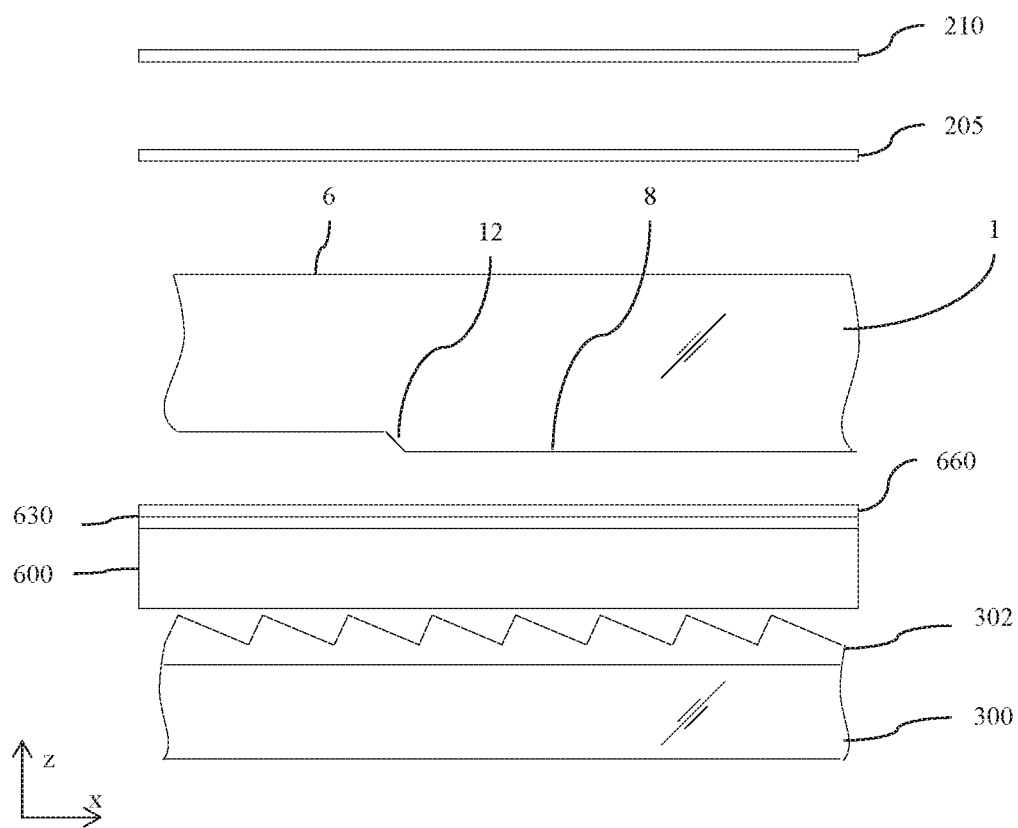
FIG. 24A is a schematic diagram illustrating in side view a directional display comprising a retarder layer between a waveguide and rear reflector, in accordance with the present disclosure.

FIG. 24A is a schematic diagram illustrating in side view a directional display comprising a retarder layer 630 and a protection layer 600 arranged between a waveguide 1 and rear reflector 300.

Protection layer 600 may for example have a similar hardness to microstructure 302. A further planar layer 660 may be added over the retarder layer for example with similar hardness to waveguide 1. In an illustrative embodiment, layer 600 may comprise a glass substrate and layer 660 may comprise an acrylic diffuser surface.

Advantageously damage of microstructure 302 and waveguide 1 may be reduced. Further a separation may be introduced between the waveguide 1 and the rear reflector 300 to advantageously reduce the contrast of Moiré between the two surfaces.

Figure 24B:
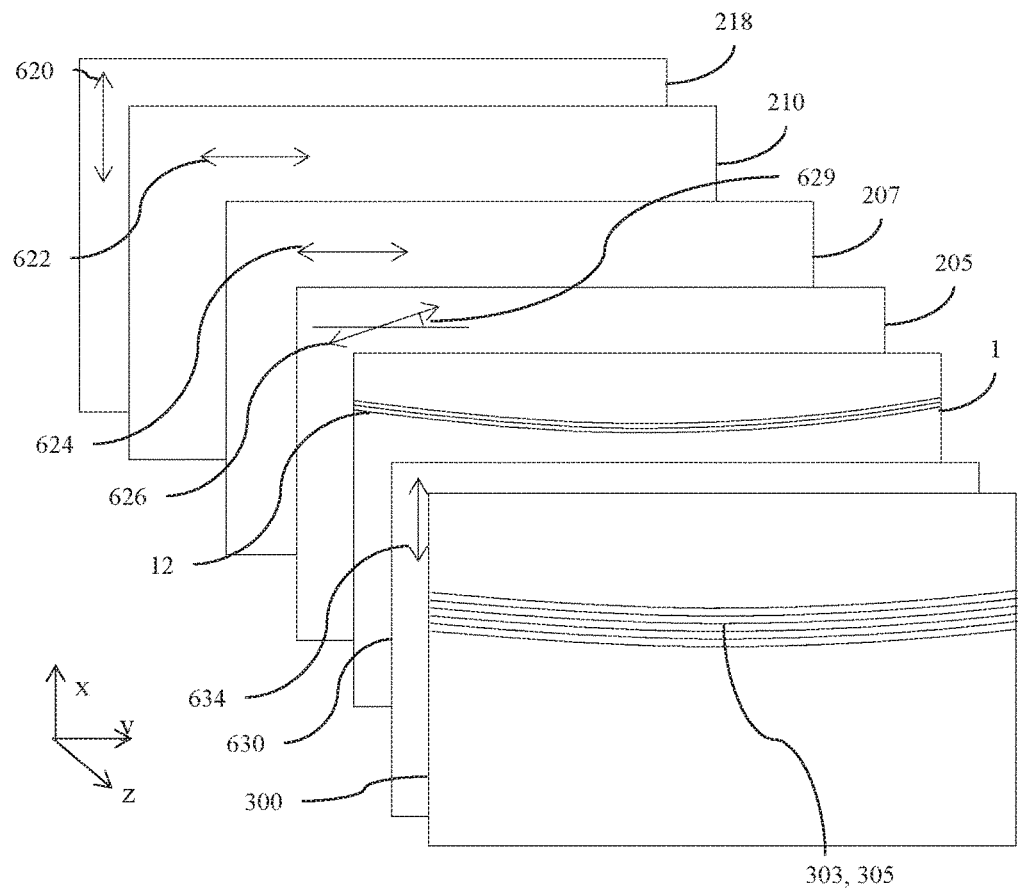
FIG. 24B is a schematic diagram illustrating in perspective front view a stack of polarization management components of a directional display apparatus comprising an in plane switching mode liquid crystal spatial light modulator wherein a retarder layer is provided between a waveguide and rear reflector, in accordance with the present disclosure.
Figure 24C:
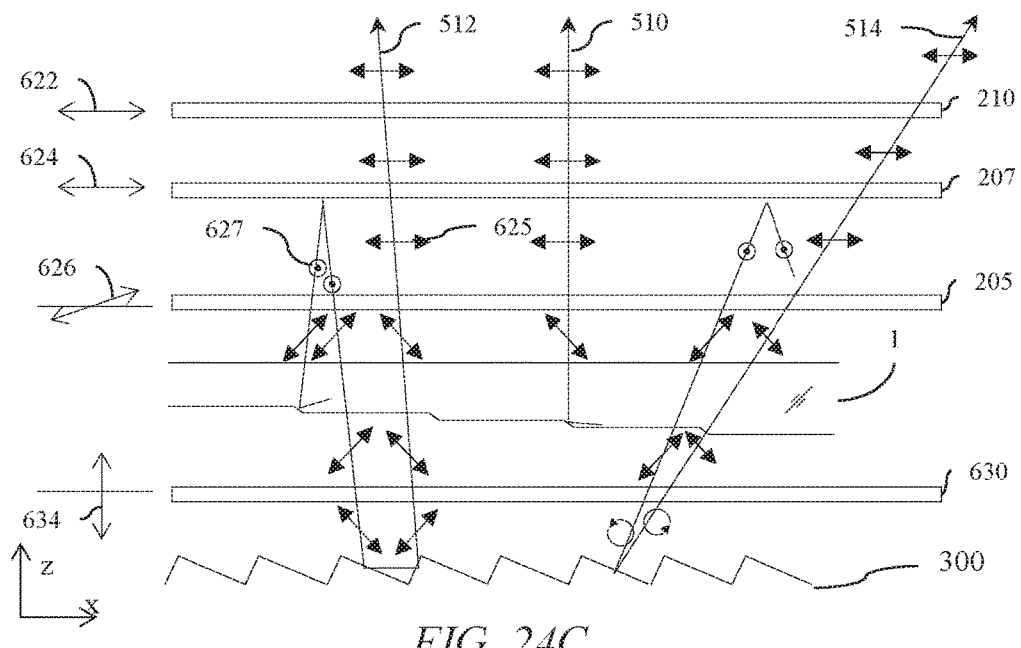
FIG. 24C is a schematic diagram illustrating in side view recirculated polarized light propagation in the directional display of FIG. 24B, in accordance with the present disclosure.

FIG. 24B is a schematic diagram illustrating in perspective front view a stack of polarization management components of a directional display apparatus comprising an in plane switching mode liquid crystal spatial light modulator wherein a correction retarder 630 is disposed between the waveguide 1 and rear reflector 300. FIG. 24C is a schematic diagram illustrating in side view recirculated polarized light propagation in the directional display of FIG. 24B.

The operation of the polarization recirculation system with respect to the first and second polarization components 625, 627 is similar to that as shown in FIG. 22B.

Advantageously the correction retarder 630 may be arranged within the structure with low cost and complexity.

The pairs of reflective corner facets 303, 305 may be curved and have optical power in the predetermined direction to achieve window imaging by the rear reflector that is substantially similar to the window imaging by the waveguide for example. The optical power may be positive or negative, to provide control of viewing window distance for light reflected from the rear reflector 300. Alternatively the pairs of reflective corner facet 303, 305 may be straight so that no optical power is provided by the rear reflector. Thus the pairs of reflective corner facets extend in a predetermined direction which in these embodiments is generally in the lateral direction, but encompasses curved facets that provide optical power in the predetermined direction.

Different window planes may be provided for light directly from the waveguide 1 and for light that is incident on the rear reflector. Advantageously improved lateral viewing freedom may be provided as described in U.S. Patent Publ. No. 2017-0339398, filed May 18, 2017 and incorporated by reference herein in its entirety.

The angle of incident polarized light may be substantially at 45 degrees to the predetermined direction. The tilt of curved facets may be small in comparison to the tilt of the incident polarization; small changes in recirculation efficiency may occur in the lateral direction as the tilt of the facets with respect to the lateral direction changes. Advantageously the correction retarder may provide reduced roll-off in efficiency of recirculation as light is collected from single reflections from just one of the reflective facets 303, 305.

The advantages provided by the correction retarder 630 will now be described in further detail.

Figure 25:
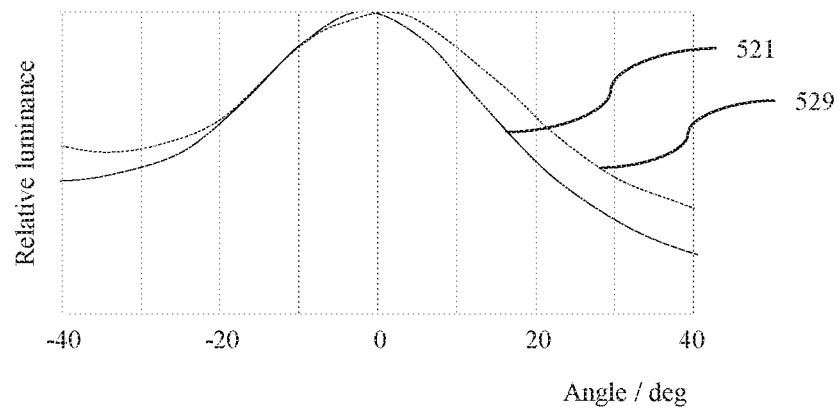
FIG. 25 is a schematic graph illustrating the variation in luminance in a vertical direction for a directional display comprising the optical stack of FIGS. 24A-B, in accordance with the present disclosure.
Figure 26:
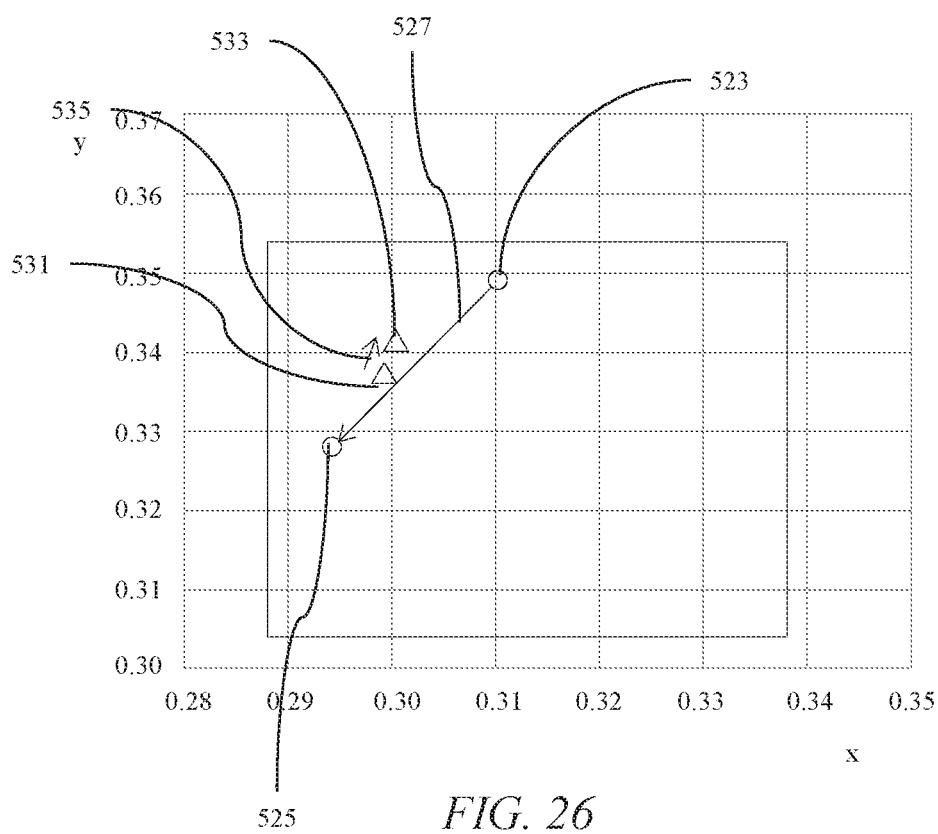
FIG. 26 is a schematic graph illustrating the variation in color in a vertical direction for a directional display comprising the optical stack of FIGS. 24A-B, in accordance with the present disclosure.

FIG. 25 is a schematic graph illustrating the variation in luminance in a vertical direction for a directional display comprising the optical stack of FIGS. 24A-B and FIG. 26 is a schematic graph illustrating the variation in color in a vertical direction for a directional display comprising the optical stack of FIGS. 24A-B.

In comparison to the illumination properties as described in FIGS. 17-18, advantageously increased luminance is provided by profile 529 in the vertical direction. Further color change with viewing angle (illustrated by points 531, 535 and color shift 535) is substantially reduced.

It would be desirable to reduce visibility of damage to optical components within a directional backlight. Referring to FIGS. 19-20, the increase in luminance of high angle rays provides reduced contrast of damage defects 601, 605. Advantageously lifetime and reliability of the backlight can be improved.

It would be desirable to provide further tuning of color and luminance by providing correction retarders 630 as plural retarders.

Figure 27:
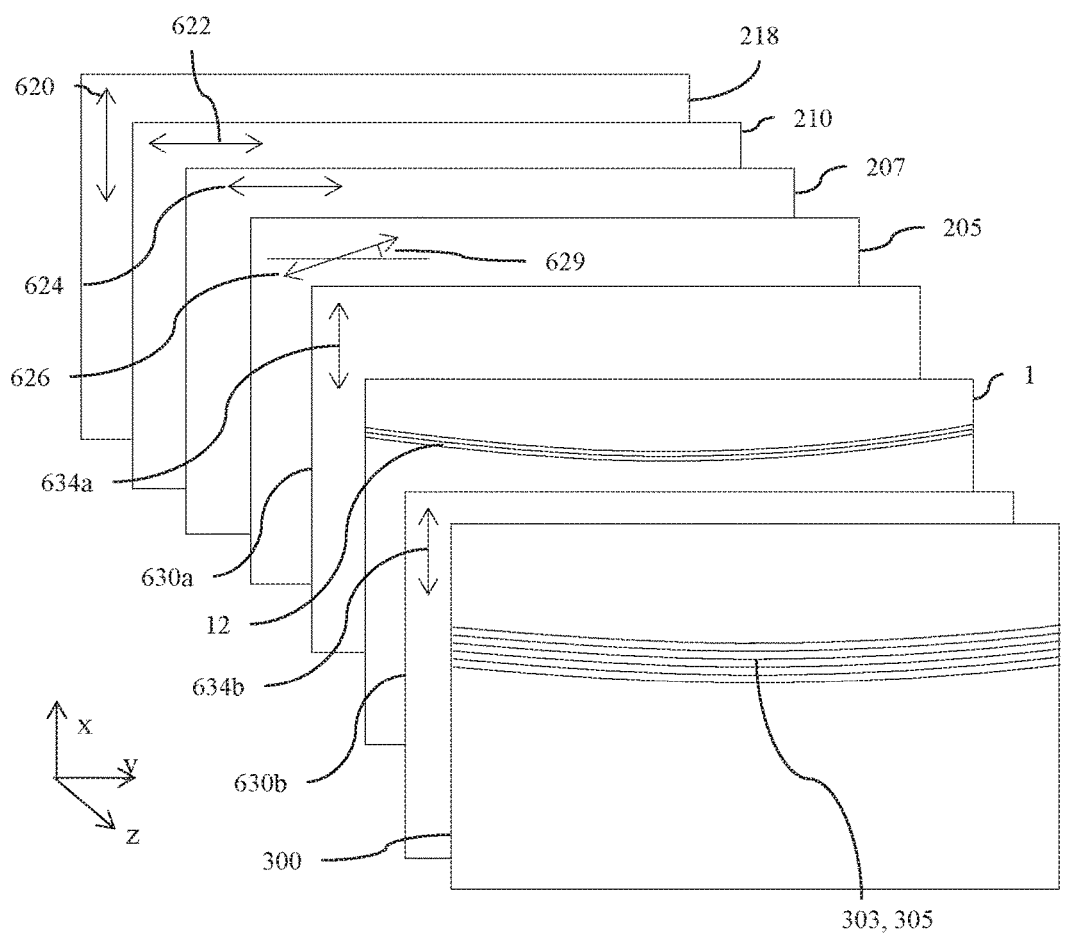
FIG. 27 is a schematic diagram illustrating in perspective front view a directional display comprising plural correction retarder layers, in accordance with the present disclosure.
Figure 28:
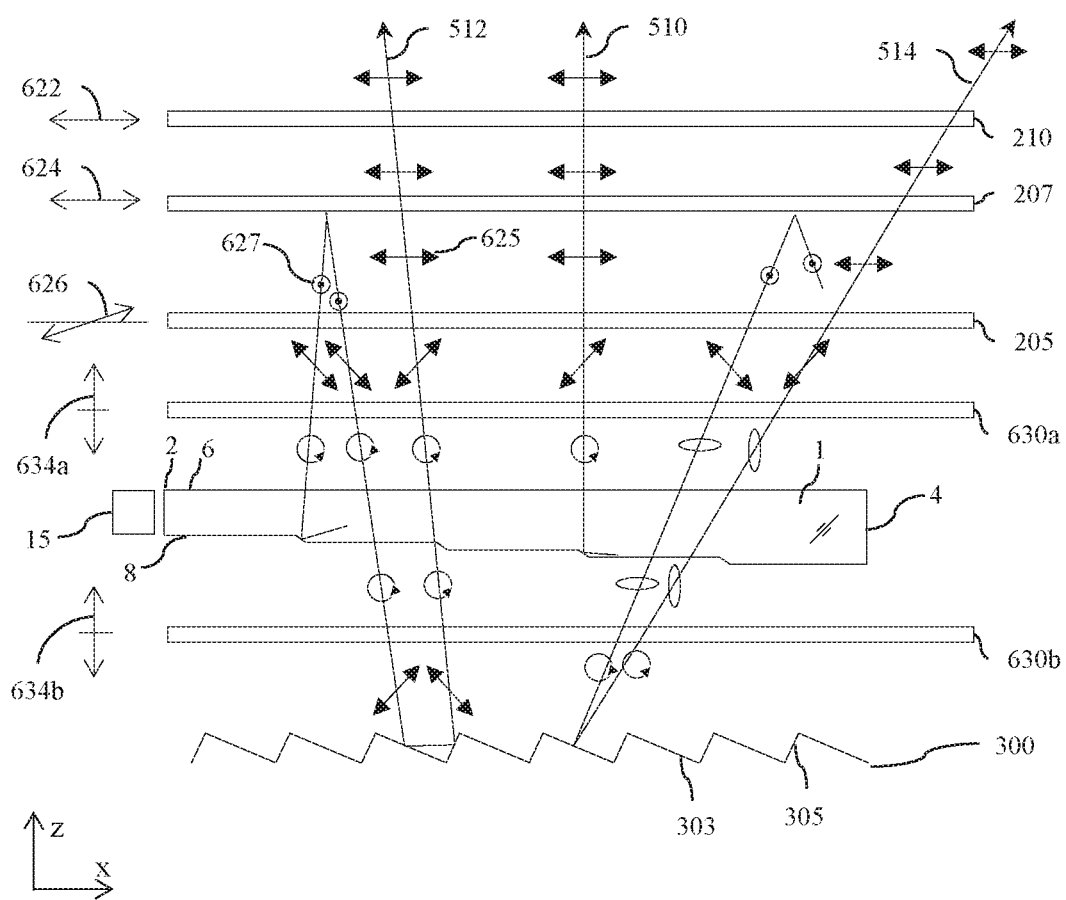
FIG. 28 is a schematic diagram illustrating in side view a stack of polarization management components of a directional display apparatus comprising an in plane switching mode liquid crystal spatial light modulator and plural correction retarders, in accordance with the present disclosure.

FIG. 27 is a schematic diagram illustrating in perspective front view a directional display comprising plural correction retarder layers and FIG. 28 is a schematic diagram illustrating in side view a stack of polarization management components of a directional display apparatus comprising an in plane switching mode liquid crystal spatial light modulator and plural correction retarders. Thus the one or more correction retarders is plural correction retarders. The plural correction retarders include a correction retarder disposed between the waveguide and the rear reflector and a correction retarder disposed between the reflective polarizer and the waveguide.

The operation is similar to the arrangement of FIG. 22B. However the single correction retarder 630 is replaced by plural correction retarders 630a, 630b that may for example by quarter waveplates with respective slow axes directions 634a, 634b of 90 degrees. Between the two retarders for ray 512, the first polarization component 625 may have a left hand circular polarization state, and the second polarization component 627 may have a right hand circular polarization state for example. For ray 514, elliptical polarization states may be provided between the retarders 630a, 630b. In combination the retarders 630a, 630b may achieve similar polarization modification to the retarder 630 in FIG. 22B.

Advantageously the plural correction retarders 630*a*, 630*b* may provide multiple layers on which to provide diffusing surfaces. Further the plural correction retarders may be arranged with modified angles, thickness and birefringence so that in combination increased efficiency of polarization recirculation is achieved in comparison to a single sheet correction retarder 630.

Also incorporated by reference herein in its entirety is U.S. Patent Publ. No. 2017-0139114, filed Nov. 10, 2016.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A directional display device comprising:
    a waveguide comprising first and second, opposed guide surfaces for guiding light along the waveguide and an input surface extending between the first and second guide surfaces;
    an array of light sources disposed at different input positions along the input surface of the waveguide and arranged to input light into the waveguide,
    the waveguide further comprising a reflective end for reflecting the input light from the light sources back along the waveguide, the second guide surface being arranged to deflect the reflected input light through the first guide surface as output light, and the waveguide being arranged to image the light sources in a lateral direction so that the output light from the light sources is directed into respective optical windows in output directions that are distributed in dependence on the input positions of the light sources;
    a transmissive spatial light modulator arranged to receive the output light and arranged to modulate a first polarization component of the output light having a first polarization state;
    a reflective polarizer disposed between the first guide surface of the waveguide and the spatial light modulator and arranged to transmit the first polarization component and to reflect a second polarization component of the output light having a second polarization state orthogonal to the first polarization state as rejected light; and
    a rear reflector disposed behind the second guide surface arranged to reflect the rejected light for supply back to the spatial light modulator, the rear reflector comprising a linear array of pairs of reflective corner facets extending in a predetermined direction perpendicular to the normal to spatial light modulator so that the rear reflector converts the polarization state of the rejected light that has a double reflection from a pair of corner facets into an orthogonal polarization state;
    one or more correction retarders comprising birefringent material disposed between the reflective polarizer and the rear reflector, the one or more correction retarders being arranged to provide a net effect of relatively shifting the phase of the first and second polarization components incident thereon in a direction normal to the spatial light modulator by half a wavelength, the birefringent material of the one or more correction retarders having a slow axis extending in a direction perpendicular to the predetermined direction, wherein one of the one or more correction retarders is arranged to receive light from the waveguide at said output directions and having polarization states as transmitted by the waveguide.

2. A directional display device according to claim 1, wherein the one or more correction retarders is a single correction retarder.

3. A directional display device according to claim 2, wherein the correction retarder is disposed between the waveguide and the rear reflector.

4. A directional display device according to claim 2, wherein the correction retarder is disposed between the reflective polarizer and the waveguide.

5. A directional display device according to claim 1, wherein the one or more correction retarders is plural correction retarders.

6. A directional display device according to claim 5, wherein the plural correction retarders include a correction retarder disposed between the waveguide and the rear reflector and a correction retarder disposed between the reflective polarizer and the waveguide.

7. A directional display device according to claim 1, further comprising an adjustment retarder disposed between the reflective polarizer and the rear reflector and arranged to adjust the polarization state of the second polarization component.

8. A directional display device according to claim 1, wherein the predetermined direction is the lateral direction.

9. A directional display device according to claim 1, wherein the second polarization component is linearly polarized on reflection at the rear reflector in a direction at an angle of 45° to the predetermined direction.

10. A directional display device according to claim 1, wherein the first guide surface is arranged to guide light by total internal reflection, and the second guide surface comprises light extraction features and intermediate regions between the light extraction features, the light extraction features being oriented to reflect light guided through the waveguide in directions allowing exit through the first guide surface as output light and the intermediate regions being arranged to direct light through the waveguide without extracting it.

11. A directional display device according to claim 10, wherein the extraction facets are curved and have positive optical power in the lateral direction between sides of the waveguide that extend between the first and second guide surfaces.

12. A directional display device according to claim 1, wherein the reflective end has positive optical power in the lateral direction extending between sides of the waveguide that extend between the first and second guide surfaces.

13. A directional display device according to claim 1, wherein the pairs of reflective corner facets are curved and have optical power in the predetermined direction.

14. A directional display device according to claim 1, wherein the input surface is an end of the waveguide opposite to the reflective end.

15. A directional display device according to claim 1, wherein the input surface is a surface of a side of the waveguide extending away from the reflective end.

16. A directional display apparatus comprising:
a directional display device according to claim 1; and
a control system arranged to control the light sources.

* * * * *